US011922495B1

(12) United States Patent
Hernandez et al.

(10) Patent No.: US 11,922,495 B1
(45) Date of Patent: Mar. 5, 2024

(54) AUTOMATICALLY DETERMINING ADVERSE ACTION REASON CODES

(71) Applicant: Block, Inc., San Francisco, CA (US)

(72) Inventors: Juan Hernandez, Oakland, CA (US); Jianye Xu, Alameda, CA (US); Wensi Xu, San Francisco, CA (US); Ihsan Kabir, Oakland, CA (US)

(73) Assignee: BLOCK, INC., Oakland, CA (US)

( * ) Notice: Subject to any disclaimer, the term of this patent is extended or adjusted under 35 U.S.C. 154(b) by 168 days.

(21) Appl. No.: 17/557,806

(22) Filed: Dec. 21, 2021

(51) Int. Cl.
| | |
|---|---|
| *G06Q 40/03* | (2023.01) |
| *G06F 18/214* | (2023.01) |
| *G06Q 20/32* | (2012.01) |
| *G06Q 20/40* | (2012.01) |

(52) U.S. Cl.
CPC .......... *G06Q 40/03* (2023.01); *G06F 18/214* (2023.01); *G06Q 20/3276* (2013.01); *G06Q 20/4016* (2013.01); *G06Q 20/407* (2013.01)

(58) Field of Classification Search
None
See application file for complete search history.

(56) References Cited

U.S. PATENT DOCUMENTS

| | | | | |
|---|---|---|---|---|
| 10,692,140 B1 * | 6/2020 | Kim | ....................... | G06Q 20/405 |
| 2013/0132358 A1 * | 5/2013 | Nikankin | ............... | G06Q 40/02 |
| | | | | 707/706 |
| 2021/0295427 A1 * | 9/2021 | Shiu | ......................... | G06N 5/04 |
| 2022/0122171 A1 * | 4/2022 | Hubard | .................. | G06Q 40/03 |
| 2022/0414763 A1 * | 12/2022 | Singla | .................... | G06Q 40/03 |

OTHER PUBLICATIONS

Min Li, Amy Mickel & Stanley Taylor (2018) "Should This Loan be Approved or Denied?": A Large Dataset with Class Assignment Guidelines, Journal of Statistics Education, 26:1, 55-66, DOI: 10.1080/10691898.2018.1434342 (Year: 2018).*

* cited by examiner

*Primary Examiner* — Gregory S Cunningham, II
(74) *Attorney, Agent, or Firm* — Mattingly & Malur, PC

(57) ABSTRACT

Techniques described herein are directed to an intelligent lending platform in which a payment service may receive respective lending queries from users, analyze the queries using a machine-learned model and, if the queries are denied, output respective signals indicating that the respective queries are denied and the reasons for each respective decline. In some instances, the described techniques analyze data associated with each respective denied query to determine high-level reasons for the decline and may present these reasons in a manner that is both understandable to and actionable by the respective user. That is, the techniques may automatically identify the most significant reasons why a particular lending query was denied and may automatically output these reasons to a user in a manner that the user is able to easily comprehend and act upon to increase the chance of receiving an approval upon a subsequent lending query.

20 Claims, 17 Drawing Sheets

US 11,922,495 B1

AUTOMATICALLY DETERMINING ADVERSE ACTION REASON CODES

TECHNICAL FIELD

Buyers are able to use mobile applications to borrow funds to purchase items. In "buy now pay later" (BNPL) transactions, buyers purchase items (e.g., goods or services) and then pay for those items over a series of periodic payments.

BRIEF DESCRIPTION OF THE DRAWINGS

Features of the present disclosure, its nature and various advantages, will be more apparent upon consideration of the following detailed description, taken in conjunction with the accompanying drawings.

In the figures, the left-most digit(s) of a reference number identifies the figure in which the reference number first appears. The use of the same reference numbers in different figures indicates similar or identical items or features. The drawings are not to scale.

DETAILED DESCRIPTION

Figure 1:
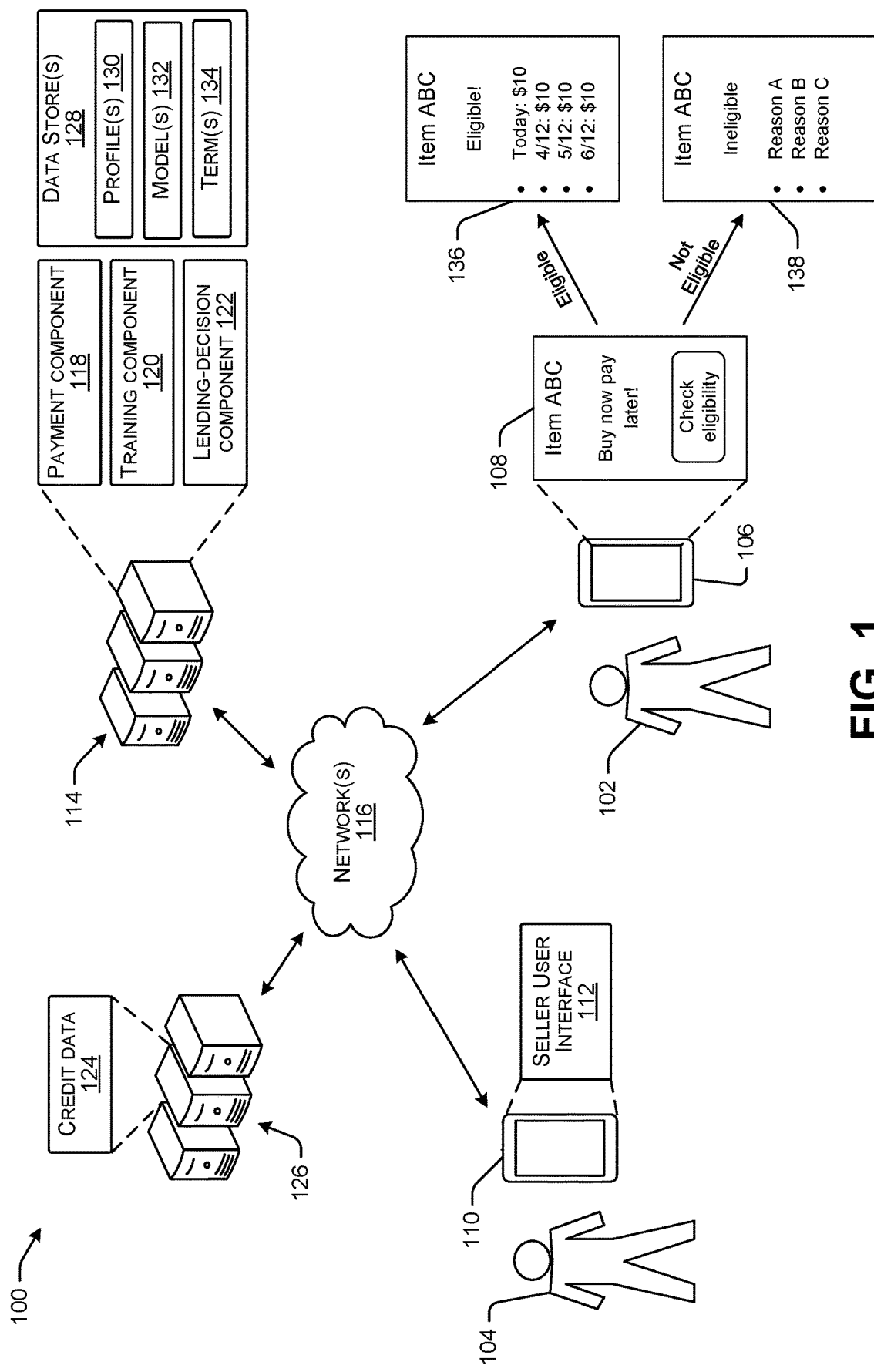
FIG. 1 is an example environment in which a user may submit a lending query to a payment service, which may determine, using the machine-learning techniques described herein, whether or not to enable the user to purchase an item and pay for the item over multiple installments, according to an embodiment of the present subject matter.

Techniques described herein are directed to an intelligent lending platform in which a payment service may receive respective lending queries from users, analyze the queries using a machine-learned model and, if the queries are denied, output respective signals indicating that the respective queries are denied the reasons for each respective decline. Further, the intelligent lending platform can generate actionable recommendations, via machine learning mechanisms, which when implemented can change a status (e.g., denied to approved or the like) of a specific lending query or future lending queries. Generally, in conventional lending technology, a lender may assess factors surrounding a proposed transaction before making a decision regarding whether to extend funds via a loan, credit, advance, or the like to a buyer. If funds are not extended, the lender may provide the buyer with one or more reasons, known as "adverse action reasons," indicating why the decision was made. These decisions, however, are generic (i.e., applicable to multiple users), superficial, and can be overly technical and, thus, are generally unhelpful to buyers in terms of understanding why such decision are made and how buyers can increase the likelihood that future transactions are approved. Techniques described herein relate to analyzing data associated with each respective denied query to determine one or more high-level reasons for the decline and presenting these reasons in a manner that is both understandable to and actionable by the respective user. That is, techniques described herein may, using machine-learned models, automatically identify the most significant reason(s) why a particular lending query was denied and may automatically output these reason(s) to a user in a manner that the user is able to easily comprehend and act upon to increase the chance of receiving an approval upon a subsequent lending query. As such, techniques described herein offer customized or personalized reasoning for lending decisions, which can be based on previous interactions or transactions of users of the payment service. Techniques described herein can monitor interaction data of users in real-time to determine whether subsequent lending queries should be accepted, and on what terms, or denied. In some examples, subsequent lending decisions can be determined based on interaction data indicating actions taken on actionable recommendations that cause modifications to risk metrics used in lending decisions described herein. In some examples, lending decisions and associated context can be provided to the intelligent lending platform for modifying or improving machine trained models, as described herein.

There are various forms of lending availed to buyers. In some instances, a lending query relates to a request for the payment service to extend funds—via a loan, credit, advance, etc.—to the user for allowing the user to purchase an item and to pay for the item over multiple installments according to a predefined schedule or terms (e.g., to re-pay the payment service). As used herein, techniques reference "buy now pay later" (BNPL) forms of lending. However, techniques described herein can be similarly applicable to any other form of lending to enable buyers to acquire items including but not limited to physical items, digital items, services, subscriptions, cryptocurrency assets, securities, or the like.

To provide an example, a user (e.g., a buyer) may operate a user device to request to acquire an item from a seller via an ecommerce webpage or an application, such as a payment application operating on the user device. In another example, the user may visit the same or a different seller at a brick-and-mortar location of the seller. The seller may operate a seller device, at the brick-and-mortar location, which can have a seller application executing thereon to enable the seller to take payment from the user to enable the user to acquire an item from the seller. In either instance, the user or the seller may request a loan from a payment service for acquiring the item. That is, in at least one example, the user or the seller may request, for example, that the user be allowed to purchase the item by paying for a portion of the item at a current time and thereafter paying the remainder of a balance over time and in installments. Stated otherwise, it is to be appreciated that the described techniques for initiating and consummating BNPL loans may occur at a seller having any sort of presence, whether brick-and-mortar, online, or a combination thereof.

In response to receive this lending query, the payment service may analyze data associated with the lending query to determine whether to approve the request. For instance, the payment service may input data into a machine-learned model, which may be configured to make a determination regarding whether to approve or deny the lending query. In addition, the machine-learned model can output a risk score associated with the lending query, with the risk score indicative of a level of a risk that the loan, if extended, will not be repaid or repaid in a timely manner. If the machine-learned model outputs a risk score that does not qualify for a loan, the payment service may be configured to analyze data associated with the lending query to determine how much each of multiple factors contributed to this decision (i.e., denial). The payment service may then be configured to group individual factors into related groups and determine which of the groups most contributed to the denial. The payment service may then output a respective reason for the denial for each of the "top-N" groups. For instance, the payment service may determine the three groups that most contributed to the denial and may output a reason (an "adverse action reason") associated with each of the groups to the user, such that the user can understand why the request was denied and how the user can subsequently interact with the payment service to receive a lending approval in the future.

In conventional machine-learning technology, machine-learned models are typically either accurate or explainable, but rarely both. That is, some traditional machine-learning techniques, such as linear models and simple decision trees, can generate decisions in a way that is readily understandable to a human user. That is, given that these techniques assume independence of each input feature when making a decision, a human user is able to analyze which input features were assigned the highest weight in the linear model and may determine that these features having the highest weights are most responsible for the generated decision. However, while these linear models and simple decision trees are understandable to a human user and may thus enable a human user to explain a decision generated by such a model, these linear models are not as accurate as other types of machine-learning techniques.

Other types of machine-learning techniques, however, are more accurate but much less explainable. For instance, techniques such as random forests, gradient boosting trees, and deep neural networks operate deeply with the feature data to generate respective decisions. Thus, these models often generate very accurate decisions, but the reasons for these decisions are extremely difficult to explain to a human user, given that the reasons for the decisions are nested deep with the models.

Given the above dichotomy, in conventional lending technologies, lending providers may find themselves needing to decide between using relatively simple but less accurate machine-learning techniques to generate lending decisions or using more accurate but less explainable techniques. Complicating this decision further is the fact that regulatory requirements often require that lenders provide denied prospective lendees with the reasons why a requested loan was denied—known as adverse action reasons, as described above.

To address these and other shortcomings of the existing technology, described herein, therefore, are technologically-based systems to enable lending decisions in a manner that is both accurate and explainable. Thus, the techniques introduced herein allow for a lender to make very accurate lending decisions while still generating and presenting adverse action reasons to the denied loan applicant. Further, the techniques automatically generate high-level, non-technical reasons for the denial, such that the denied loan applicant is able to easily understand why the request was denied and the actions that they should take in order to find success in future lending requests.

To achieve both accuracy and explainability, a payment service may train a relatively rich and complex machine-learned model using feature data associated with multiple previously denied lending queries. For instance, the payment service may input data associated with the previously denied lending queries as training data to the model. This data may comprise internal data stored at the payment service, such as a payment history of the user using the payment service, as well as external data stored at third-party services, such as credit agencies and the like. In some instances, each of these features associated with a previously denied lending query comprises a value of a risk metric as well as an indication of whether the feature increased or decreased the risk metric. For instance, each previously denied lending query may be associated with a signal such as a repayment history of the user, a number of credit inquiries at the user account within a defined amount of time, a current balance managed at the payment service, transaction details associated with the lending query, or any other signal associated with lending decisions. In addition, each of these input signals may be associated with an indication of whether the signal increases or decreases the risk metric. For instance, a low balance (e.g., a balance that does not satisfy a balance threshold) may be associated with an indication of increased risk, while a high balance (e.g., a balance that satisfies a balance threshold) may be associated with an indication of decreased risk. In another example, a history of untimely payments may be associated with an indication of increased risk, while a history of timely payments may be associated with an indication of decreased risk. Of course, while a few examples are provided, it is to be appreciated that any other traditional credit or lending signals may be used.

After the model is trained using the previously denied lending queries, and potentially previously approved lending queries, the payment service may use the model to make decisions regarding subsequent lending queries. For instance, envision that a user requests to receive a BNPL loan for an item offered by a seller. In response, the payment service may receive the lending query and aggregate data associated with the requested transaction and the corresponding user. For instance, the payment service may retrieve internal data associated with the user associated with the request, as well as external data associated with the user (e.g., as stored at a credit agency). The payment service may obtain this data in any manner, such as by accessing local data stores at the payment service, calling one or more APIs to access the data from a third party, or the like.

Upon aggregating the internal or external data, the payment service may input this data into the machine-learned model, which may output a risk score associated with the proposed loan. As described above, the risk score can indicate the likelihood that a loan, if extended, will not be repaid or repaid in a timely manner. The payment service may compare this risk score to risk score criteria to determine whether to approve the loan request. For instance, the payment service may compare the risk score to a risk score threshold and, if the risk score is greater than the threshold, may approve the loan. The payment service may then generate and send approval data for presentation, for example via the payment application or the seller application. This approval data may indicate that the lending query has been approved and may define a payment schedule for the user to pay for the acquired item.

If, however, the risk score is less than the risk score threshold, then the payment service may determine that the loan is to be denied. In addition, the payment service may determine actionable, explainable reasons why the lending request was denied. To do so, the payment service may generate, for each of the multiple signals that contributed to the risk score, a significance score indicating a respective significance of the signal to the risk score. For instance, the payment service may calculate a Shapley-additive-explanation (SHAP) value for each respective signal in the risk score. As will be appreciated, a SHAP value indicates a contribution of a respective feature in a total score, which in some instances may comprise the risk score or may form the basis for the risk score. Thus, signals associated with relatively high SHAP values may contribute more to the calculated risk score than signals associated with relatively low SHAP values.

The payment service may group these signals according to their respective characteristics. For instance, the payment service may be configured to group similar situated signals together, such as those signals that relate to the user's payment history, signals that relate to positive activities on the payment application, signals that relate to a balance at the payment application, and so forth. After grouping similar input signals into respective signal groups, the payment service may then sum the respective significance score, such as SHAP values, to generate respective group significance scores. For instance, in one example, envision that the payment service inputs 100 signals into the trained model and, thus, assigns 100 SHAP values to each of these respective signals. After grouping these 100 signals into ten groups, the payment service may sum the SHAP values of the signals in these groups to generate 10 group-significance scores (or 10 group SHAP values).

After generating the group-significance scores, the payment service may identify the top "N" group-significance scores, such as the top three group scores. After identifying these top three group-significance scores, representing the groups that most impacted the decision of the model to deny the lending query, the payment service may determine whether each respective group is associated with increased risk or decreased risk. For instance, the payment service may generate, for each group, a partial-dependence (PD) plot that indicates whether the risk increases or decreases with a greater score of the respective group. After making this determination for each of the top three (or other amount of) groups, the payment service may generate adverse action data comprising understandable, actionable reasons why the lending query was denied. The payment service may then send this adverse action data for presentation on the payment application of the user device or the seller application of the seller device, or to another device at a later time. Because the payment service may automatically perform the techniques in response to receiving a request for loan, the payment service may generate and send this adverse action data in real-time or in near-real-time to the receiving of the lending query. That is, while traditional lending requests often take days or weeks to act upon as the lending institutions perform credit checks and the like, the techniques described herein enable a payment service to receive a request for a BNPL or other type of loan, automatically make a determination regarding the loan, and send an indication of an approval of denial (along with high-level reasons for the denial) upon the user or seller requesting the loan. Of course, while this example describes presenting any adverse action data in real-time or near-real-time, in other instances the payment service may send this adverse action data at a later time.

For instance, envision that the payment service determines, from the group SHAP value scores, that the top three reasons for the denial of the lending query are, in order, related to a low amount of activities by the user using the payment application, a high amount of unfavorable activities by the user using the payment application, and a low balance of the user at the payment application. In addition, envision that the partial-dependence (PD) plots generated by the payment service indicates that a low amount of activities by the user using the payment application increases the risk, that a high amount of unfavorable activities by the user using the payment application increases the risk, and that a low balance increases the risk. Thus, the payment service may generate adverse action data for presentation to the user indicating these reasons in an understandable and actionable way. For instance, the adverse action data may indicate, to the, the user, that the lending query was denied because the user has engaged in too few activities on the application, too many unfavorable activities, and has too low of a balance. Thus, the user may receive the top reasons indicating why they were denied, with these reasons being grouped at a high level (due to the summing of the SHAP values) and indicating which direction these reasons affected the risk score (due to the partial dependence). Because the user is presented with the top reasons, and in a way that is readily understandable to the user rather than overly technical, the user may begin to perform activities that are likely to increase their chances of receiving approval of subsequent lending queries. For instance, in this example, the user may begin to use the payment application more often to make payments (addressing the first reason), may avoid using the payment application for failed transactions (addressing the second reason), and may increase their balance on the payment application (addressing the third reason).

In addition to providing the user with these understandable high-level reasons for the lending decision, the payment service may also generate (e.g., via machine-learning mechanisms) and provide explicit suggestions to the user in order to increase the chances of success for subsequent lending queries of the user. For instance, the payment service may generate recommendation data that is determined, in part, from the adverse action data. In some instances, the payment service may generate the suggestions or "recommendation data" by identifying actions that, if taken by the user, would address the identified top-n reasons for the denial. For instance, if the largest reason for the denial is that a balance of the user at the payment application is too low, the payment service may generate a recommendation to address this issue, namely suggesting that the user increase a balance at the payment application. In addition, or in the alternative, the payment service may utilize machine-learning mechanisms to generate the recommendation data. For instance, the payment service may train and utilize a machine-learned model that receives, as input, the top-N adverse action data and outputs which actions are likely to increase a chance of approval for subsequent lending queries. This model may be trained on previous loan denials and subsequent loan approvals, such that the model "learns" over time which actions taken by a user increase the likelihood of receiving favorable lending decisions.

For instance, the payment service may recommend, to the user, that the user increase a balance on the payment application, acquire additional items to increase the amount of activities by the user with the payment service or via the payment application, or the like. In some instances, the actionable recommendations generated by the payment service, when implemented, can change a status of a specific lending query or future lending queries.

In some instances, the payment service may send the recommendation data with the adverse action data. For instance, the recommendation data may be presented to the user along with, or in near-real-time with, the adverse action data indicating that that the lending query has been denied. By doing so, the user may be able to take immediate action to increase the chance that subsequent lending queries will be approved by the payment service. The payment service may then receive interaction data in response to the user engaging in additional activities with the payment application or the payment service. This interaction data can be indicative of the user performing one or more actions recommended by the payment service as part of declining an initial lending query, interactions or any type of general interaction with the payment service or another platform associated with the payment service. This interaction data may be used to update profile data associated with the user at the payment service (or third-party credit agencies or the like), which may increase the chance of subsequent lending queries being approved by the payment service. For instance, after the payment service sends an indication that a lending query has been denied, and after the payment service generates and outputs recommendation to the user, the payment service may store subsequent actions taken by the user as the interaction data. This stored interaction data may then be used by the payment service when determining whether or not to approve subsequent lending queries of the user.

In some instances, the payment service described herein provides peer-to-peer (P2P) payments, lending, banking, investing, and the like via a payment application, while also providing a seller application for use by sellers to settle transactions with buyers. Thus, the payment service may receive data associated with users (e.g., buyers and sellers) from both of these channels, thus enriching the interaction data used to update profile data associated with the respective users. For instance, the interaction data received and used by the payment service to update profile data of a user may be based on P2P payments made or received by the user, payments made or received by the user with use of the seller application, or the like.

In still other instances, the payment service may generate recommendations for enabling a current or future lending query to be approved. For instance, the payment service may generate recommendation data indicating that if the user were to bundle the requested purchase with one or more other items, then the payment service would approve the lending query. In some instances, the recommended items to be bundled may comprise items related to, or unrelated to, the item that the user is currently requesting to buy. In some instances, the recommended items may be items to purchase or items already purchased by the user. That is, in some instances, the payment service may recommend that the user bundle the current item with one or more previous transactions such that the risk score or other criteria associated with the combined proposed transaction satisfies the risk criteria or other criteria. As described above, the payment service may provide functionality to enable users to make P2P payments amongst one another, as well as POS functionality to allow sellers to settle transactions with buyers. Thus, the payment service may store rich data associated with a particular user, giving the payment service a unique vantage point into transactions performed by a user, which may enable the payment service to suggest different bundle combinations for a particular user. For instance, the payment service may suggest, to a user, that the user consider bundling items purchased across different sellers rather than only from a single seller.

In addition to approving lending queries in response to users requesting to acquire items, the payment service may also, in some instances, provide loans to users proactively and for use by the users in future purchases. For instance, the payment service may provide BNPL loans that the receiving users are able to use similar to gift cards. Thus, these loans may be associated with limits similar to gift cards, such as a limit on their amount, a limit on the time by which the loans are to be used, a limit the sellers or items for which they may be used, or the like.

In some instances, the payment service or sellers may selectively offer the BNPL loans described herein based on the context of a current transaction. For instance, the payment service or a seller device may determine whether to present an option to a user to request a BNPL loan for a particular transaction based on one or more of a preference of a particular buyer, other buyer data (e.g., past transaction history, etc.), data associated with the seller (e.g., a seller classification code (MCC) of the seller, etc.), the item(s) associated with the transaction, a total cost of the transaction, other details of the transaction (e.g., whether the transaction is occurring online or at a brick-and-mortar store, etc.), or the like. For instance, a BNPL loan may be offered for a portion of a transaction, such as for a larger item (e.g., an expresso machine being purchased by a buyer), but not for a smaller item of the transaction (e.g., a cup of coffee also included in the transaction). In another example, the BNPL loan option may be presented for transactions having a total cost that is greater than a threshold, but not for transactions that are less than the threshold. Of course, while a few examples are provided, it is to be appreciated that any other type of context may be used to determine whether or not to provide a BNPL loan option for a particular transaction. Further, while this and other examples describes the buyer entering the BNPL payment flow through a payment application, in other instances the buyer may enter this payment flow through a seller application at a seller location, through an online marketplace of seller profiles (e.g., presented via the payment application, a website, an instant application, etc.), at a website of the seller, through a buyer profile associated with the buyer (e.g., presented via the payment application), or the like. Further, in instances where the buyer uses the payment application to initiate a BNPL loan, the resulting flow for creating the BNPL loan may occur within the payment application or the request to initiate the BNPL loan may initiate a flow that occurs outside of the application.

Further, while the above examples describe offering a BNPL loan option to a buyer prior to completing a transaction, in other instances a BNPL loan may be extended post-purchase. For instance, if the buyer utilizes a payment application of the payment service, the application may provide the user an option to request a BNPL loan for a transaction (or portion of a transaction) after the purchase. In some examples, the payment service can issue a payment instrument that can be used for making payments that can subsequently be paid via one or more installments. In some instances, the payment service may effectively refund a portion of or the entire the purchase price and instead generate an installment schedule for paying for the item. In some instances, the payment service may advance payment for the purchase price and generate an installment schedule for re-payment for the item. In addition, or in the alternative, the application may enable the buyer to bundle previously purchased items and apply for a BNPL loan for these items. In some instances, the buyer may select items purchased from a single seller, while in other instances the buyer may select items purchased from different sellers.

In some instances, the payment application may include a feature that allows a buyer to repay a BNPL or other loan as a balance of the buyer increases. This may help reduce losses and, in some instances, the payments may be automatically reported by the payment processing service to one or more credit agencies. Thus, this option provides payment flexibility to the buyer, as well as an incentive to the buyer to continue to pay on the loan as their balance increases, given that this positive credit activity may be automatically reported to one or more credit agencies.

It should be noted that while "lending" and "loans" are referred to herein, techniques described herein can be applicable to any sort of request for funds to be provided, for example via a loan, credit, an advance, or other mechanism. That is, while techniques described herein reference "loans," techniques described herein are not so limited and can apply to any mechanism where funds are being provided to a user. Further, to the extent techniques described herein reference BNPL loans, techniques described herein can be applicable to any type of loan, or other mechanism, where funds are being provided to a user or an assessment of risk is being made. For instance, techniques described herein can be similarly applicable to determining whether to provide funds to a seller via a capital loan, determining whether to open an account for a user, determining whether to provision a payment instrument to a user, or the like.

FIG. 1 is an example environment 100 in which the described BNPL loan techniques may be implemented. FIG. 1 includes a buyer 102 and a seller 104. The buyer 102 can be an entity that purchases, leases, borrows, or otherwise acquires items from sellers, such as the seller 104 or an artist 104. The seller 104 can be an entity that sells, leases, gives, or otherwise provides items to buyers, such as the buyer 102.

"Item," as used herein, can be used to describe a good (e.g., a physical item, digital item, subscription, cryptocurrency asset, security, or the like) or a service.

In at least one example, the buyer 102 can interact with a buyer computing device 106, for example, via a buyer user interface 108. The buyer user interface 108 can enable the buyer 102 to access services of the service provider or otherwise interact with the service provider. In some examples, the buyer user interface 108 can be presented via an application, such as a payment application, a music streaming application, which can be provided by the service provider or which can be an otherwise dedicated application. In some examples, the application can be an instance or versioned instance of the application, which can be downloaded from an application store. In some examples, the buyer user interface 108 can be accessible via a web browser, a progressive web application, an instant application (e.g., a portion of an application that can correspond to a particular, discrete functionality (or functionalities) and that can be downloaded to provide a fast, lightweight user experience), or the like.

As described above, in some examples, the buyer user interface 108 can be presented via an application provided by the service provider. In such an example, such an application can be a hub for buyer interactions with the service provider. That is, the buyer 102 can access one or more services of the service provider via the application. In at least one example, the buyer 102 can perform peer-to-peer payments via the application. Further, in some examples, the application can enable the buyer 102 to engage in ecommerce transactions, cardless payment transactions online or at a physical point-of-sale, perform banking transactions, buy or sell assets (e.g., stocks, cryptocurrency, etc.), or the like. In some examples, the buyer 102 can access rewards, loyalty, invoices (e.g., paid/unpaid), receipts, orders (e.g., fulfilled/unfulfilled), account information (e.g., funds associated therewith), and the like. In at least one example, the buyer 102 can request a service via the buyer user interface 108. In some examples, such a request can be associated with a contract, a message, an appointment, or the like. Additional details associated with the application are provided below. Examples of graphical user interfaces (GUIs) that can be presented via the buyer user interface 108 are described below.

In at least one example, the seller 104 can interact with a seller computing device 110, for example, via a seller user interface 112. The seller user interface 112 can enable the seller 104 to access services of the service provider. In some examples, the seller user interface 112 can be presented via an application, such as a seller application, which can be provided by the service provider or which can be an otherwise dedicated application. In some examples, the application can be an instance or versioned instance of an application, which can be downloaded from an application store. In some examples, the seller user interface 112 can be associated with multiple user interfaces, which in some examples, can each correspond with individual of the services available via the service provider. For example, the seller 104 can access payment processing services via a payment processing user interface. In some examples, such individual services can be accessible via the same or different applications. In some examples, the seller user interface 112 can be accessible via a web browser, a progressive web application, an instant application, or the like. In examples where individual services are availed via individual user interfaces, each of the user interfaces can be presented via a web browser, a progressive web application, an instant application, or the like.

As described above, in some examples, the seller user interface 112 can be presented via an application provided by the service provider. In such an example, such an application can be a hub for seller interactions with the service provider. That is, the seller 104 can access one or more services of the service provider via the application. In at least one example, the buyer 102 can interact with the buyer user interface 108 or the seller 104 can interact with the seller user interface 112 via touch input, spoken input, or any other type of input. Examples of GUIs to facilitate such interactions are described below.

While a single buyer 102 and buyer computing device 106 are illustrated in FIG. 1, in practice, the environment 100 can comprise tens, hundreds, or thousands of buyers and buyer computing devices. Similarly, while a single seller 104 and seller computing device 110 are illustrated, in practice, the environment 100 can comprise tens, hundreds, or thousands of sellers and seller computing devices.

In at least one example, the environment 100 can include server computing device(s) 114, which can be in communication with the buyer computing device 106 or the seller computing device 110 via network(s) 116 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). In at least one example, the server computing device(s) 114 can be associated with the service provider or "payment service" described herein. In some examples, actions attributed to the service provider can be performed by the server computing device(s) 114. However, in other examples, actions attributed to the service provider can be performed by an agent of the service provider (e.g., an employee, an independent contractor, etc.). The payment service described herein may enable P2P transactions, payment processing, BNPL or other types of loans, or the like.

The server computing device(s) 114 can also be associated with data store(s) 128, which can store data including but not limited to profile(s) 130, one or more models 132 (e.g., machine-learned model(s)), and term(s) 134 of respective loans, such as BNPL loans. This data is described below with reference to operation of the server computing device(s) 114.

In at least one example, the server computing device(s) 114 can be associated with one or more APIs to facilitate communications between the buyer computing device 106, the seller computing device 110, components of the server computing device(s) 114, or one or more third-party server (s). In at least one example, the server computing device(s) 114 may also provide a payment component 118, a training component 120, and a lending-decision component 122. In at least one example, the payment component 118 can, among other things, process transactions for sellers associated with the service provider, perform P2P payments, facilitate BNPL and other loans, and the like. In at least one example, the payment component 118 can transmit requests (e.g., authorization, capture, settlement, etc.) to payment service server computing device(s) (which can be associated with the third-party server(s)) to facilitate transactions between sellers and buyers, such as the seller 104 and the buyer 102. The payment component 118 can communicate the successes or failures of the transactions to the seller computing device 110. In at least one example, the payment component 118 can generate or receive transaction data associated with transactions processed on behalf of the seller 104 (or other, different sellers as described below) that utilize the service provider for processing transactions. In at least one example, such transaction data can include payment data, which can be obtained from a reader device associated with the seller computing device 110 or otherwise provided to the service provider, user authentication data, purchase amount information, point-of-purchase information (e.g., item(s) purchased, date of purchase, time of purchase, parties to the transaction, etc.), etc. In some examples, the transaction data can be stored in the data store(s) 128. In other examples, the payment component 118 may facilitate a payment between a first user account and a second user account, with this payment being initiate by one of the users via the payment application.

While the payment component 118 may facilitate transactions between buyers and sellers or P2P payments between user accounts, the lending-decision component 122 may determine whether to extend credit to buyers upon request, such as whether to extend credit to enable the users to purchase items at a first time and pay for the item upon periodic installments. In some instances, the lending-decision component 122 makes these decisions with use of the one or more trained machine-learning models 132, which may be trained by the training component 120.

For example, the training component 120 may use a combination of one or more machine-learning techniques to train the one or more models 132. The model(s) 132 may utilize any one or more of linear models, simple decision trees, random forests, gradient boosting trees, deep neural networks, or the like. In some instances, the training component 120 may train the model(s) 132 using signals associated with previously denied lending queries or previously approved lending queries. For instance, each previously approved or denied lending query may be associated with an array of signals, such as signals associated with details of the transaction or details associated with the buyer associated with the transaction. For instance, these latter details may comprise a credit score the respective buyer, a balance of the buyer at the payment application, a history of credit by the user at the payment service, and so forth. Each signal may be associated with a value of a risk metric and with an indication of whether the risk metric increases or decreases a potential risk of the corresponding transaction. For instance, as discussed above and below, each signal may be associated with a SHAP value indicating the respective signal's significance to a particular lending decision, as well as data identified from a partial-dependence plot indicating whether the respective signal was associated with increased or decreased risk.

Upon receiving a lending query comprising a request for a loan, such as a BNPL loan, the lending-decision component 122 inputs data associated with the lending query into one of the model(s) 132. For instance, FIG. 1 illustrates, in the buyer user interface 108, that the example buyer 102 is requesting to pay for "item ABC" in installments using a BNPL loan. Upon receiving this lending query, the lending-decision component 122 may retrieve data associated with this request at least one of locally (e.g., from the data store(s) 128) or from one or more external data sources and may input this data into the trained model 132. For instance, the lending-decision component 122 may acquire profile data 130 associated with the buyer 102, as well as credit data 124 associated with the buyer 102 and maintained by one or more third-party servers 126.

The buyer profile data 130 may include any sort of data associated with respective buyers, such as the buyer 102. For instance, such buyer data can include, but is not limited to, buyer information (e.g., name, phone number, address, banking information, etc.), buyer preferences (e.g., learned or buyer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), loan information associated with the buyer (e.g., previous loans made to the buyer, previous defaults on said loans, etc.), invoice information associated with the buyer (e.g., invoices received, paid, incentives associated therewith, etc.), estimate information associated with the buyer (e.g., estimates requested, estimates received, estimates accepted, estimates converted into invoices, etc.), workflow information associated with the buyer (e.g., workflows in progress, workflows completed, etc.), risk information associated with the buyer (e.g., indications of risk, instances of fraud, declines, chargebacks, etc.), appointments information (e.g., previous appointments, upcoming (scheduled) appointments, timing of appointments, lengths of appointments, etc.), payroll information (e.g., employers, payroll frequency, payroll amounts, etc.), reservations information (e.g., previous reservations, upcoming (scheduled) reservations, reservation duration, interactions associated with such reservations, etc.), buyer service information, etc.

The credit data 124 meanwhile, may comprise any sort of similar or different information maintained by a third party, such as a credit-rating agency. In some instances, the credit data 124 comprises a credit rating of the buyer 102, a repayment history of the buyer, indications of current or past lines of credit of the buyer 102, or the like.

Regardless of the exact nature of the data, the lending-decision component 122 may input at least one of the buyer profile data 130 or the credit data 124 into the trained model, which may be configured to calculate a risk score associated with the lending query, which can indicate the likelihood that the loan, if extended, will not be repaid or repaid in a timely manner. Upon receiving the risk score, the lending-decision component 122 may compare the risk score to one or more risk criteria, such as a risk score threshold, to determine whether to approve the requested loan. Upon determining to approve the loan, the lending-decision component 122 may generate approval data and may send this approval data for presentation on the application executing on the buyer device 106. If the buyer 102 accepts the loan, then the lending-decision component 122 may effectuate the purchase and the loan, storing term(s) 134 associated with the loan at the data store(s) 128. These term(s) 134 may comprise repayment terms, such as a repayment schedule, a payment instrument for charging the buyer 102 for the installment payments, and the like.

FIG. 1, for instance, illustrates that the lending-decision component 122 may generate and present another buyer interface 136 indicating the terms of the BNPL loan in this example. For instance, in the illustrated example, the lending-decision component 122 has approved the installment loan and will charge the user $10 for the item at the point-of-sale (e.g., "today"), as well as $10 for each of three proceeding months. Upon receiving acceptance of the loan from the buyer 102, the lending-decision component 122 may effectuate the purchase transaction and the loan.

If, however, the risk score does not satisfy the criteria (e.g., because the risk score is less than the risk score threshold), then the lending-decision component 122 may generate adverse action data indicating that the lending query has been denied and indicating one or more reasons for the denial. For instance, FIG. 1 illustrates that the lending-decision component 122 may generate another buyer interface 138 indicating that the requested BNPL loan has been denied and including a top three reasons why (Reasons A, B, C). As introduced above, these reasons may comprise high-level, understandable, and actionable reasons for the buyer 102.

In order to generate these reasons, the lending-decision component 122 may generate, for each of the multiple signals that contributed to the risk score, a significance score indicating a respective significance of the signal to the risk score for the example BNPL lending query. For instance, the payment service may calculate a Shapley-additive-explanation (SHAP) value for each respective signal in the risk score. As will be appreciated, a SHAP value indicates a contribution of a respective feature in a total score. Thus, signals associated with relatively high SHAP values may be contribute more greatly to the calculated risk score than signals associated with relatively low SHAP values.

After calculating these SHAP values, the lending-decision component 122 may group these signals according to their respective characteristics. For instance, the lending-decision component 122 may group similar signals together, such as signals that relate to the payment history of the buyer 102, signals that relate to positive activities on the payment application by the buyer 102, signals that relate to a balance of the buyer 102 at the payment application, and so forth. After grouping similar input signals into respective signal groups, the lending-decision component 122 may then sum the respective significance score, such as SHAP values, to generate respective group significance scores. For instance, the lending-decision component 122 may input a number "M" signals into the model 132 and, thus, assigns M number of SHAP values to each of these respective M signals. The lending-decision component 122 may then group these M number of signals into "X" number of groups, where X is less than or equal to M. After grouping these M number of signals into the X number of groups, the lending-decision component 122 may sum the SHAP values of the signals in these groups to generate X number of group-significance scores (or X number of group SHAP values).

After generating the group-significance scores, the lending-decision component 122 may identify the "top-N" group-significance scores, such as the top three group scores. After identifying these top three group scores, representing the groups that most impacted the decision of the model 132 to deny the lending query, the lending-decision component 122 may determine whether each respective group is associated with increased risk or decreased risk. For instance, the lending-decision component 122 may generate, for each group, a partial-dependence (PD) plot that indicates whether a risk of non-payment increases or decreases with a greater score of the respective group. After making this determination for each of the top three (or other amount of) groups, the lending-decision component 122 may generate adverse action data comprising understandable, actionable reasons why the lending query was denied. The lending-decision component 122 may then send this adverse action data for presentation on the buyer interface 138 or to another device at a later time. That is, the lending-decision component 122 may generate and send this adverse action data in real-time or in near-real-time to the receiving of the lending query, or may send this adverse action data at a later time.

For instance, envision that the lending-decision component 122 determines, from the group SHAP value scores, that the top three reasons for the denial of the lending query are, in order, related to a low amount of activities by the buyer 102 using the payment application, a high amount of unfavorable activities by the buyer 102 using the payment application, and a low balance of the buyer 102 at the payment application. In addition, envision that the partial-dependence (PD) plots generated by the lending-decision component 122 indicates that a low amount of activities by the user using the payment application increases the risk, that a high amount of unfavorable activities by the user using the payment application increases the risk, and that a low balance increases the risk. Thus, the lending-decision component 122 may generate adverse action data for presentation to the buyer 102 indicating these reasons in an understandable and actionable way. For instance, the adverse action data may indicate, to the, the buyer 102, that the lending query was denied because the buyer 102 engaged in too few activities on the application, has engaged in too many unfavorable activities, and has too low of a balance. Thus, the buyer 102 may receive the top reasons indicating why they were denied, with these reasons being grouped at a high level (due to the summing of the SHAP values) and indicating which direction these reasons affected the risk score (due to the partial dependence). Because the user is presented with the top reasons, and in a way that is readily understandable to the buyer 102 rather than overly technical, the buyer 102 may begin to perform activities that are likely to increase their chances of receiving approval of subsequent lending queries. Additionally or alternatively, the buyer 102 can submit additional or alternative data to dispute or supplement data to which the lending-decision component 122 already has access. For instance, the buyer can grant, to the payment service, access to data that was not previously available to the payment service, can submit additional information (e.g., receipts) to the payment service via an API or otherwise, or the like.

In addition to providing the user with these understandable high-level reasons for the lending decision, the lending-decision component 122 may also provide actionable suggestions to the user, which when applied, to increase the chances of success for subsequent lending queries of the user. For instance, the lending-decision component 122 may generate recommendation data that is determined, in part, from the adverse action data. For instance, the lending-decision component 122 may recommend, to the user, that the user increase a balance on the payment application, acquire additional items to increase the amount of activities by the user with the payment service or via the payment application, or the like.

While the above example describes the BNPL lending query as originating from the buyer device 106, it is to be appreciated that these lending queries may additionally or alternatively originate from the seller device 110. In addition, while the profile data 130 is described with reference to the buyer 102, this profile data 130 may additionally or alternatively represent data associated with the seller 104 or other sellers. Seller profile data can include, for instance, any data associated with sellers. For instance, a seller profile can store, or otherwise be associated with, information about a seller (e.g., name of the seller, geographic location of the seller, operating hours of the seller, employee information, etc.), a seller category classification (MCC), item(s) offered for sale by the seller, hardware (e.g., device type) used by the seller, transaction data associated with the seller (e.g., transactions conducted by the seller, payment data associated with the transactions, items associated with the transactions, descriptions of items associated with the transactions, itemized or total spends of each of the transactions, parties to the transactions, dates, times, or locations associated with the transactions, etc.), invoice information associated with the seller (e.g., invoices sent, paid, incentives associated therewith, etc.), estimate information associated with the seller (e.g., estimates sent, estimates converted into invoices, etc.), workflow information associated with the seller (e.g., workflows in progress, workflows completed, etc.), loan information associated with the seller (e.g., previous loans made to the seller, previous defaults on said loans, etc.), risk information associated with the seller (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations information (e.g., previous reservations, upcoming (scheduled) reservations, interactions associated with such reservations, etc.), inventory information, buyer service information, etc. The seller profile can securely store bank account information as provided by the seller. Further, the seller profile can store payment information associated with a payment instrument linked to an account of the seller that is maintained by the service provider. Further, both buyer and seller profile data can include information indicative of a potential risk of nonpayment if credit is extended to the respective seller or buyer. For instance, this information may include a purchase history of the user, a balance of the buyer at the payment application, a length of time that a user has utilized the payment application, whether the user has activated a physical card associated with the service provider, a purchase history of the user, a number of payments previously made by the user, a frequency of the payments, historical inflows or outflows to a balance of the user on the payment application, previous unfavorable activities associated with the user (e.g., P2P transactions with flagged buyers, declines, chargebacks, etc.), a length of credit history, or the like.

Figure 2A:
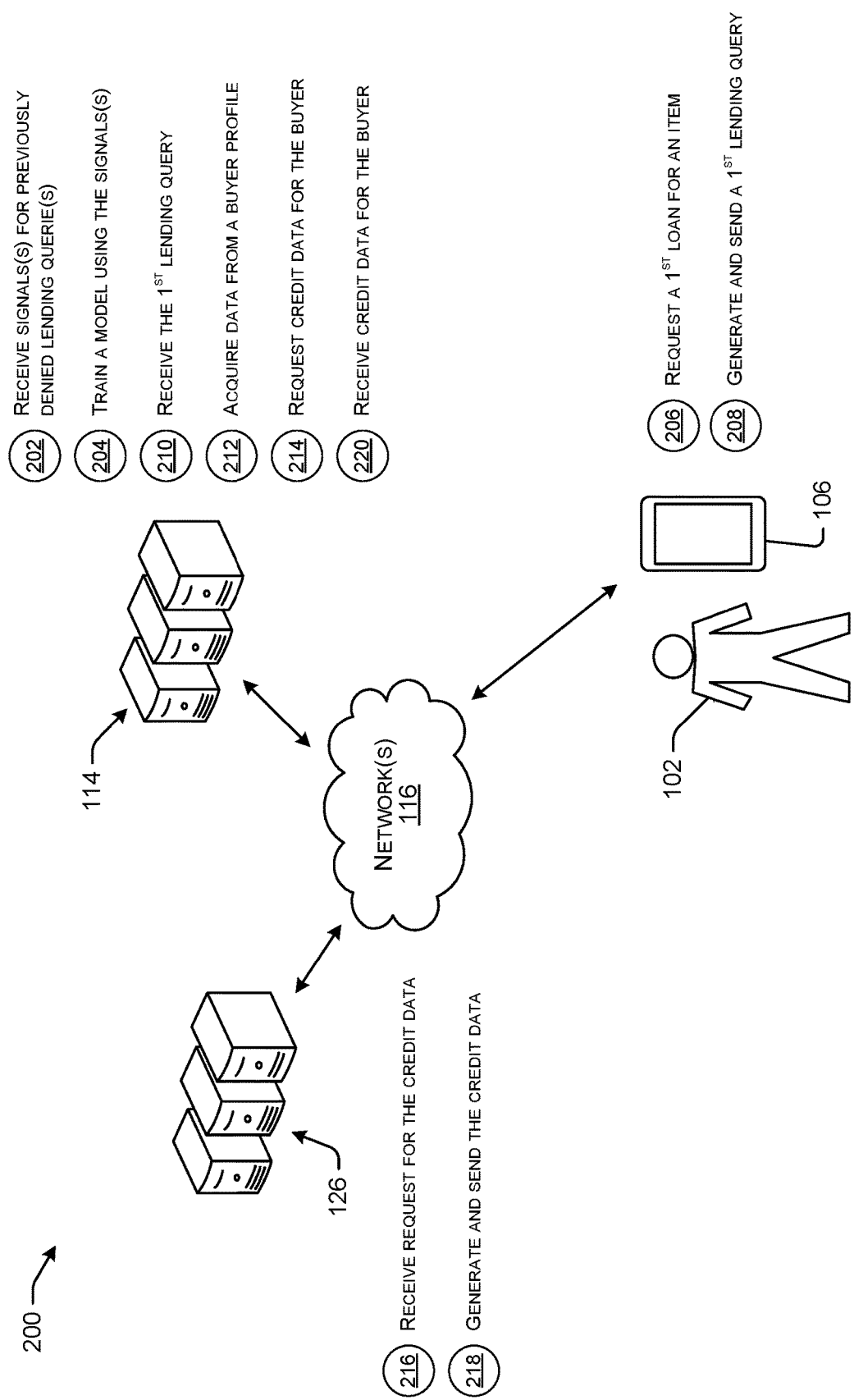
FIGS. 2A-2C is a sequence of operations for initially determining that a user is ineligible to purchase a first item and pay for the first item over multiple installments before becoming eligible to do so for a second item based on subsequent interactions between the user and the payment service, according to an embodiment of the present subject matter.
Figure 2B:
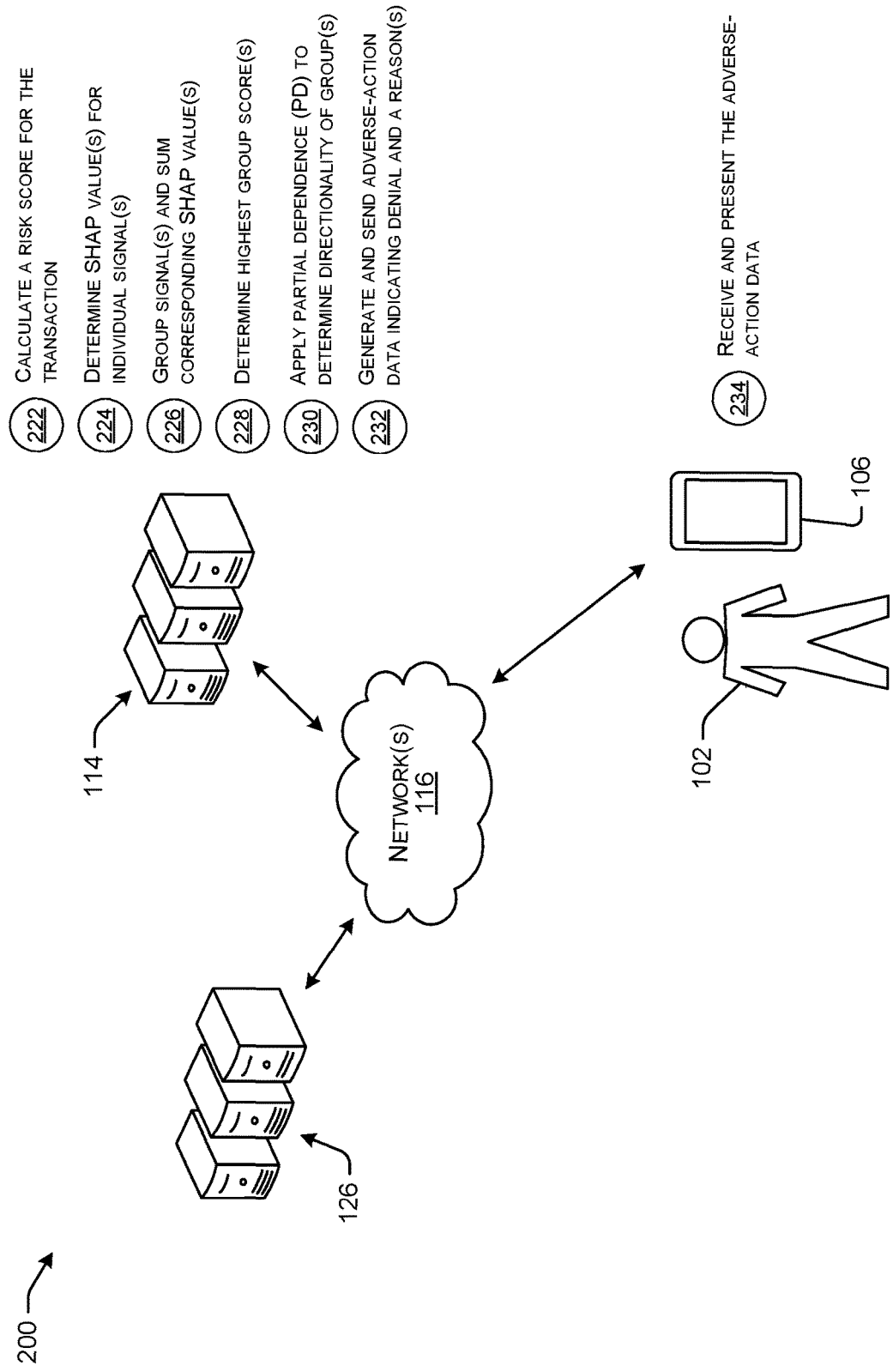
Figure 2C:
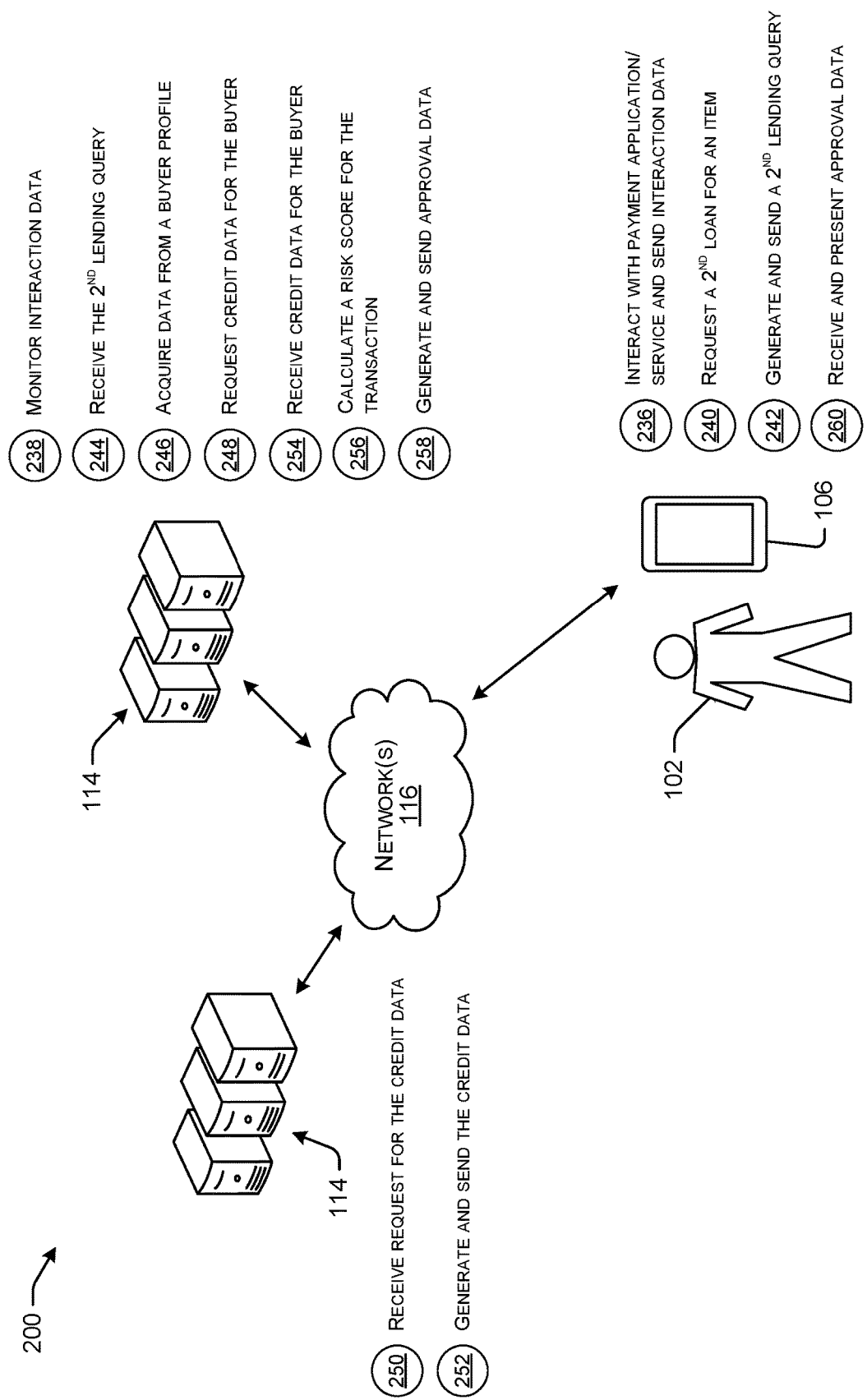

FIGS. 2A-2C collectively are a sequence of operations 200 for initially determining that a user is ineligible to purchase a first item and pay for the first item over multiple installments before becoming eligible to do so for a second item based on subsequent interactions between the user and the payment service. While this sequence of operations 200 is described with reference to the architecture and components of FIG. 1, it is to be appreciated that these operations may occur in other architectures and via other components.

At an operation 202, the service provider may receive signals associated with previously denied lending queries. For instance, the service provider may access, from a data store(s), input signals associated with those lending requests that the service provider or another service provider has previously denied. These signals may comprise data associated with the requests that are internal to the service provider (e.g., buyer profile data at the service provider) or data that is external to the service provider (e.g., credit data from a third-party credit agency). At an operation 204, the service provider may train a model using the signals. For instance, the service provider may train the model using one or a combination of a machine-learning techniques, such as linear models, simple decision trees, random forests, gradient boosting trees, deep neural networks, or the like. By training the model, the model may now be configured to receive input signals associated with new lending queries and generate, as output, an indication that a lending query is approved or an indication that the lending query is denied and one or more reasons for the denial.

At an operation 206, a buyer may request a first loan for a first item, such as a BNPL loan. For instance, the buyer of FIG. 1 may use a payment application to request a loan as part of a checkout flow for the first item. Or, in another example, the seller of FIG. 1 may use the seller application operating on the seller device to issue the request for the loan for the first item on behalf of the buyer. In either instance, at an operation 208, the payment application of the buyer device or the seller application of the seller device generates and sends, to the service provider, a first lending query. This lending query may comprise details regarding the first item, information identifying the buyer, information identifying the seller, or the like.

At an operation 210, the service provider receives the first lending query and, at an operation 212, acquires data from a buyer profile associated with the buyer. That is, the service provider may use information from the lending query to identify the buyer and identify the buyer profile from the data store(s) of the service provider. As described above, this information in the buyer profile may indicate a purchase history of the user at the service provider or using the payment application, a balance of the buyer at the payment application, a length of time that a user has utilized the payment application, whether the user has activated a physical card associated with the service provider, a purchase history of the user, a number of payments previously made by the user, a frequency of the payments, historical inflows or outflows to a balance of the user on the payment application, previous unfavorable activities associated with the user (e.g., P2P transactions with flagged buyers, declines, chargebacks, etc.), a distance of travel to the seller, a history of delinquent account(s), a length of credit history, or the like.

At an operation 214, the service provider also requests credit data associated with the buyer from a third-party service, such as a credit agency. At an operation 216, the third-party service receives the credit request and, at an operation 218, generates the credit data for the buyer and sends this credit data to the service provider. The service provider receives this credit at an operation 220 and, thus, now has both data internal to the service provider and data external to the service provider. This internal and external data may comprise any of the data described above. For instance, the internal data may comprise details from a profile of the user at the payment service, while the external data may comprise credit data or any other data maintained by a third party that is external to the payment service. Of course, operations 222 and beyond can be performed without having accessed internal data or external data. That is, one or more of operations 212-220 may be optional.

FIG. 2B continues the illustration and includes, at an operation 222, the service provider calculating a risk score for the lending query. This operation may comprise inputting the internal and external data, in the form of individual input signals, to the trained model described above, and receiving, as output from the model, a risk score. In this example, the risk score does not satisfy the risk criteria of the service provider and, thus, the service provider determines to deny the lending query as well as the primary reasons for the denial. Thus, at an operation 224, the service provider generates SHAP values for individual input signals associated with the lending query. That is, the service provider analyzes the risk score to determine which input signals were most responsible for the generated risk score using SHAP values to represent these respective significances.

At an operation 226, the service provider groups these signals into higher-level groups and sums the SHAP values of the signals of each group. For instance, the service provider may assign each signal to one of multiple groups, such as a group relating to favorable activities on the payment application, a group relating to unfavorable activities on the payment application, a group relating to a balance of the buyer on the payment application a group relating to a length of credit history of the buyer, a group relating to an amount of delinquent accounts of the buyer, a group relating to an amount of credit lines of the buyer, or the like. Of course, while a few example groups are described, it is to be appreciated that the service provider may utilize any other similar or different groups.

At an operation 228, the service provider determines which one or more groups are associated with a highest group-SHAP-value score. Then, at an operation 230, the service provider applies partial-dependence (PD) techniques to each group to determine whether the signals of the corresponding are associated with increased or decreased risk. For instance, the service provider may determine whether risk increases with more or less of a particular group, such as increasing in risk with increased delinquent accounts, decreasing in risk with an increased balance of the buyer at the payment application, and so forth.

At an operation 232, the service provider then generates and sends adverse action data to the buyer or seller device based on groups having the highest group-SHAP-value scores. In some instances, the adverse action data is generated using the partial dependence techniques by, for example, forming the sentences of the respective adverse action reasons using the results of the partial-dependence (PD) techniques. For instance, envision that the service provider has grouped the signals according to their categories and summed the SHAP values for these categories, and that the group having the highest cumulative SHAP-value-score relates to "unfavorable credit activity." Thereafter, the service provider may use partial dependence to determine that an increase in signals of this group results in an increase in risk, the service provider may generate an adverse action reason indicating that one of the primary reasons for the denial was because "your unfavorable credit activity was too high" (rather than too low). In some instances, the service provider may be pre-configured with a reason corresponding to each category. For instance, the service provider may be configured, for each higher-level category, with a sentence to output when that category is determined to be one of the top-n reasons for denial. In some instances, some categories are associated with a sentence of "Your <category name> was too high", while other categories are associated with a sentence of "Your <category name> was too low".

At an operation 234, the buyer device receives and presents the adverse action data. As described above, the adverse action data presents, to the buyer, the primary reasons for the denial in a way that is understandable to and actionable by the buyer. Thus, the service provider is able to both automatically make a decision regarding the lending query, as well as present, to the buyer, reasons for the denial that are understandable and that enable the buyer to perform actions that may increase the likelihood of approval for subsequent lending queries of the buyer. In some instances, the service provider may generate, in addition to the reason(s) for denial, suggestions by identifying actions that, if taken by the user, would address the reasons for the denial. For instance, if the largest reason for the denial is that a balance of the user at the payment application is too low, the service provider may generate a suggestion to address this issue, namely suggesting that the user increase a balance at the payment application. In addition, or in the alternative, the service provider may utilize machine-learning mechanisms to generate these suggestions. For instance, the service provider may train and utilize a machine-learned model that receives, as input, the reason(s) for denial and outputs which actions are likely to increase a chance of approval for subsequent lending queries. This model may be trained on previous loan denials and subsequent loan approvals, such that the model "learns" over time which actions taken by a user increase the likelihood of receiving favorable lending decisions.

In some instances, this adverse action data is presented on the payment application in near-real-time or real-time after the user requested the loan using the payment application. In other instances, the adverse action data may be sent via an SM text message, a link to a webpage including the adverse action data, an email, or the like.

FIG. 2C continues the illustration and includes, at an operation 236, the buyer interacting with the payment application on the buyer device or with the payment service generally. That is, in some examples, this operation may represent the buyer performing actions that are based on the adverse action reasons provided by the service provider above. For instance, in response to receiving these adverse action reasons, the buyer may perform actions such as increasing their balance in the payment application, decreasing the number of delinquent credit accounts, increasing the amount of favorable credit activities, and so forth. In some examples, this operation may represent the buyer performing actions generally—without regard to the adverse action reasons—using the payment service.

At an operation 238, the service provider monitors the interaction data over time. In at least one example, the service provider receives and stores this interaction data. In some examples, the service provider can receive or monitor the interaction data in real-time or near-real-time. In at least one example, the service provider may update the buyer profile in response to the interactions and associated interaction data. Further, in some instances, subsequent lending decisions can be determined at least in part based on the interaction data that indicates one or more actions taken with respect to recommendations provided to the user. These recommendations, which in some examples can be actionable, may cause modifications to risk metrics used in lending decisions. In addition, lending decisions and associated context can be used to modify or improve machine trained models in some instances.

At an operation 240, a buyer may request a second loan for a second item. For instance, the buyer may use the payment application to request a loan for the second item at a time or purchase of the second item, after purchase of the second item, prior to payment for the second item, or at any other time. Further, in some instances this request may be part of a request for a loan for a bundle of items.

At an operation 242, the payment application of the buyer device or the seller application of the seller device generates and sends, to the service provider, a second lending query. Again, this lending query may comprise details regarding the second item, information identifying the buyer, information identifying the seller, or the like.

At an operation 244, the service provider receives the second lending query and, at an operation 246, acquires data from a buyer profile associated with the buyer. That is, the service provider may use information from the second lending query to identify the buyer and identify the buyer profile from the data store(s) of the service provider. As described above, this information in the buyer profile may indicate a purchase history of the user at the service provider or using the payment application, a balance of the buyer at the payment application, or the like. Also as described above, this buyer profile may be updated based on the interactions of the buyer between the denial of the lending query and the receipt of the second lending query at the service provider.

At an operation 248, the service provider may again request credit data associated with the buyer from a third-party service, such as a credit agency. At an operation 250, the third-party service receives the credit request and, at an operation 252, generates the credit data for the buyer and sends this credit data to the service provider. The service provider receives this credit data at an operation 254 and, thus, now has both data internal to the service provider and data external to the service provider. While FIG. 2C illustrates the service provider requesting and receiving the credit data, it is to be appreciated that the service provider may refrain from doing so in some instances. At an operation 256, the service provider calculates a risk score for the second lending query. This operation may comprise inputting the internal and external data, in the form of individual input signals, to the trained model described above, and receiving, as output from the model, a risk score. Again, however, in other examples the service provider may calculate the risk score using internal data and without using the external data, such as the credit data associated with the buyer. In this example, the risk score satisfies the risk criteria and thus, at an operation 258, the service provider may generate and send approval data indicating that the second lending query has been approved. This approval data may comprise proposed terms of the loan, such as dates and amounts of the proposed installment payments. In some examples, the terms of the loan may be based on the risk score or adverse action reasons associated with the first lending query.

At an operation 260, the buyer device (or the seller device in other examples) receives and presents the approval data. Upon acceptance of the loan terms by the buyer, the service provider may effectuate the purchase of the second item and the corresponding loan. For instance, the service provider may provide funds for payment of the second item (or multiple items in some instances) and may set up the agreed-upon repayment for the loan. In one example, the service provider may then send invoices to the user as the individual installments for the loan come due. In other examples, the service provider can automatically withdraw funds from a stored balance of a user when individual installments for the loan come due (e.g., automatic repayment). In some examples, the service provider can withhold funds from incoming funds, for example, from P2P payments, payroll deposits, or the like to satisfy each of the installments. Further, as the user pays each installment, the service provider may update information associated with the loan. When the user completes the payment, the service provider may update the information to indicate that the loan has been paid in full.

Figure 3A:
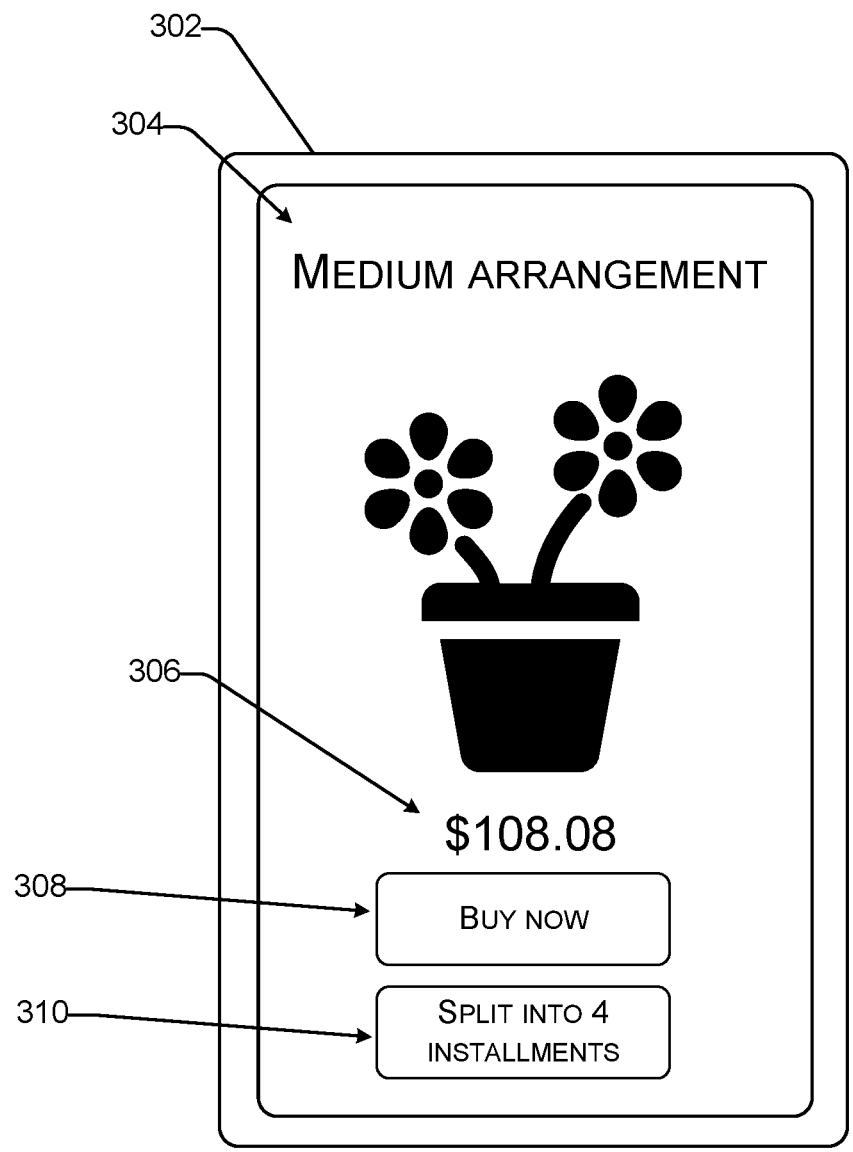
FIG. 3A is an example graphical user interface (GUI) presented in response to a user requesting to acquire an item, according to an embodiment of the present subject matter.

FIG. 3A is an example graphical user interface (GUI) 302 that a seller website or application may present in response to a user requesting to acquire an example item, here an arrangement of flowers. As illustrated, the GUI 302 includes details 304 regarding the item, as well as indication of a price 306 of the item. The GUI 302 also includes, in this example, an icon 308 that, when selected, enables the user to pay for the item by paying for the item in full. In addition, the GUI 302 includes an icon 308 that, when selected, enables the user to request to pay for the item in multiple installments. In this example, the icon 308 indicates that the user is able to split payment for the item into four installments, although in other instances any other number of installments may be utilized. In at least one example, an interaction with the icon 310 can trigger the lending query request process described above with reference to FIGS. 2A-2C.

It is to be appreciated that while FIG. 3A illustrates one example entry point to requesting and obtaining a BNPL loan, a user may request and acquire a BNPL loan in other ways. For example, a buyer can initiate a BNPL request via a payment application, a seller application at a seller location, through an online marketplace of seller profiles (e.g., presented via the payment application, a website, an instant application, etc.), at a website of the seller, through a buyer profile associated with the buyer (e.g., presented via the payment application), or the like. Further, in instances where the buyer uses the payment application to initiate a BNPL loan, the resulting flow for creating the BNPL loan may occur within the payment application or the request to initiate the BNPL loan may initiate a flow that occurs outside of the application.

As described above, in some instances, the payment service or sellers may selectively offer BNPL loans based on the context of a current transaction. For instance, the payment service or a seller device may determine whether to present an option to a user to request a BNPL loan for a particular transaction based on one or more of a preference of a particular buyer, other buyer data (e.g., past transaction history, etc.), data associated with the seller (e.g., a seller classification code (MCC) of the seller, etc.), the item(s) associated with the transaction, a total cost of the transaction, other details of the transaction (e.g., whether the transaction is occurring online or at a brick-and-mortar store, etc.), or the like. For instance, a BNPL loan may be offered for a portion of a transaction, such as for a larger item (e.g., an expresso machine being purchased by a buyer), but not for a smaller item of the transaction (e.g., a cup of coffee also included in the transaction). In another example, the BNPL loan option may be presented for transactions having a total cost that is greater than a threshold, but not for transactions that are less than the threshold. Of course, while a few examples are provided, it is to be appreciated that any other type of context may be used to determine whether or not to provide a BNPL loan option for a particular transaction.

Further, while the above examples describe offering a BNPL loan option to a buyer prior to completing a transaction, as shown in FIG. 3A, in other instances a BNPL loan may be extended post-purchase. For instance, if the buyer utilizes a payment application of the payment service, the application may provide the user an option to request a BNPL loan for a transaction (or portion of a transaction) after the purchase. In some examples, the payment service can issue a payment instrument that can be used for making payments that can subsequently be paid via one or more installments. In some instances, the payment service may effectively refund a portion of or the entire the purchase price and instead generate an installment schedule for paying for the item. In some instances, the payment service may advance payment for the purchase price and generate an installment schedule for re-payment for the item. In some examples, the application may enable the buyer to bundle previously purchased items and apply for a BNPL loan for these items. In some instances, the buyer may select items purchased from a single seller, while in other instances the buyer may select items purchased from different sellers.

Figure 3B:
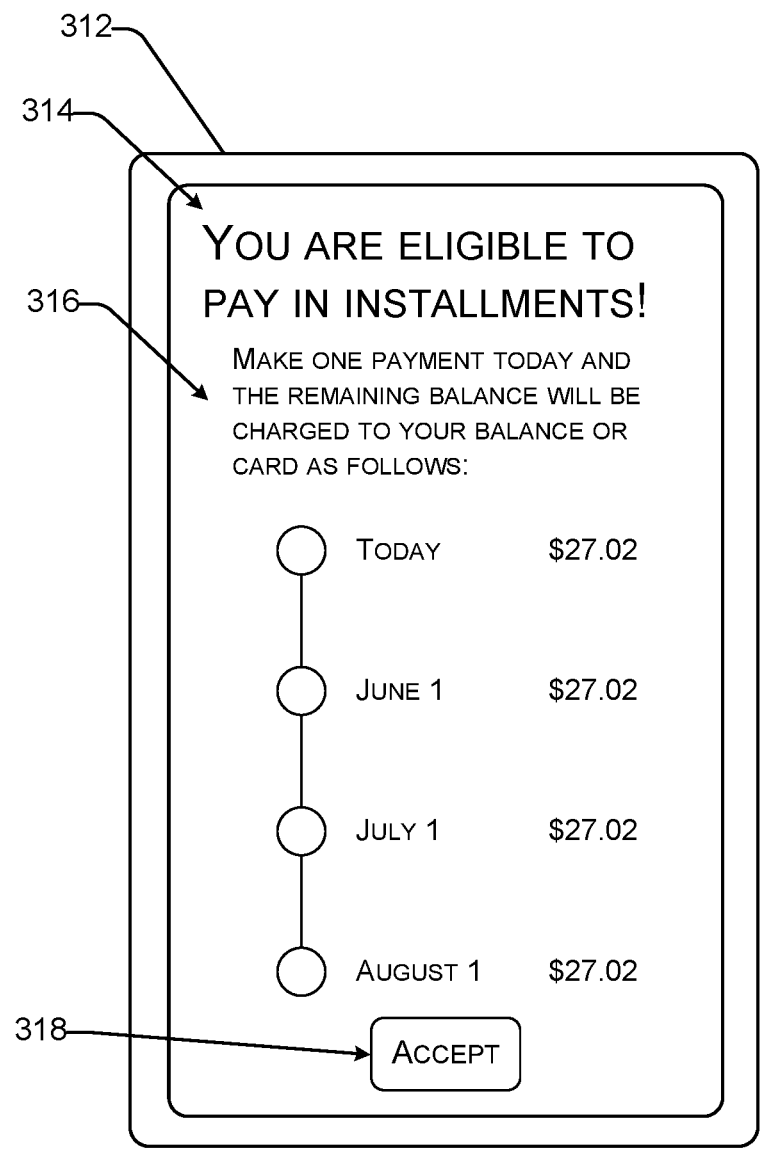
FIG. 3B is an example GUI presented after the user requests to pay for the item illustrated in FIG. 3A over multiple installments, according to an embodiment of the present subject matter.

FIG. 3B is an example GUI 312 that the seller website or application may present in response to the user selecting the icon 310 and being approved for a BNPL loan. Here, the GUI 312 indicates that the user is eligible to acquire an item and pay for the item over multiple installments. In some instances, the service provider described above may send data for presenting this GUI 312 on the buyer device 106 or the seller device 110. As illustrated, the GUI 312 includes an indication 314 that the buyer has been approved for a BNPL loan ("You are eligible to pay in installments!") in response to a lending query requested by the buyer with regards to a particular item. In addition, the GUI 312 includes an indication 316 that the buyer is to make a first payment at the point-of-sale (e.g., "today") and is thereafter to pay a certain installment thereafter according to the defined schedule. The GUI 312 also includes an icon 318 that is selectable by the buyer to accept the terms of the loan. As described above, these terms may be generated based on profile data associated with the seller, profile data associated with the buyer, or the like. In some instances, machine-learning techniques may be used to receive this profile data (and data associated with the transaction) to generate the terms of the loan. As described above, in some examples, the terms of the loan can be based on risk scores or other context data.

Figure 4A:
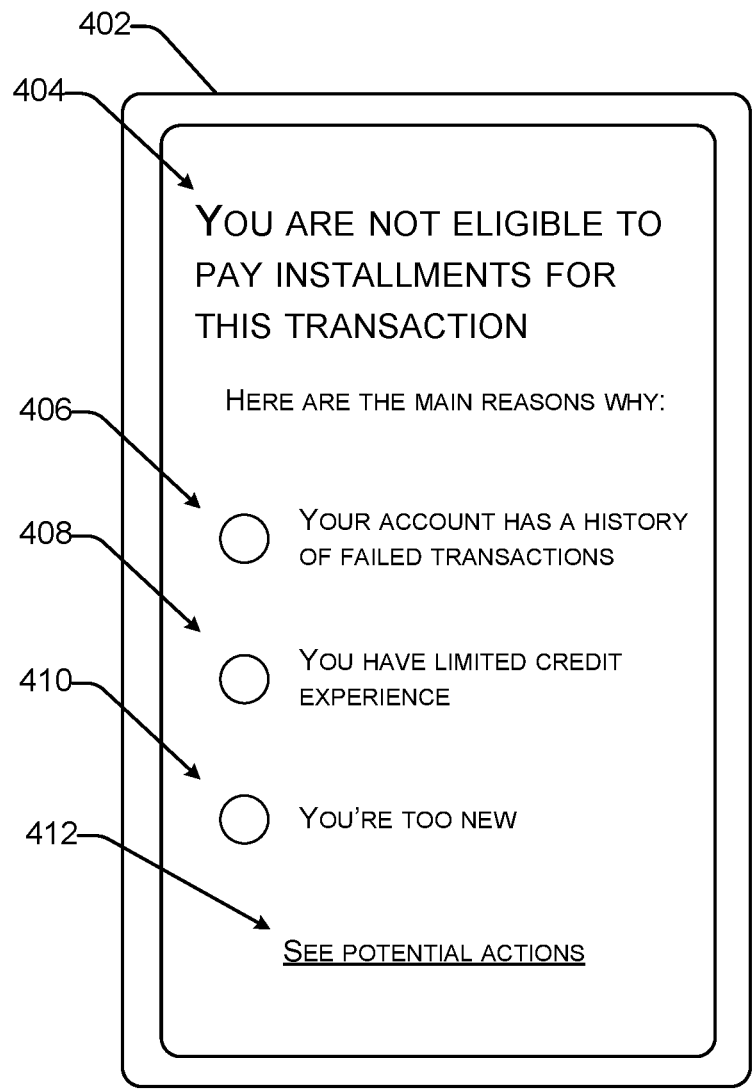
FIG. 4A is an example GUI indicating that a user is ineligible for acquiring an item and paying for the item over multiple installments, according to an embodiment of the present subject matter.

FIG. 4A is an example GUI 402 indicating that a user is ineligible for acquiring an item by paying for the item over multiple installments. In some instances, the service provider described above may send data for presenting this GUI 402 on the buyer device 106 or the seller device 110. As illustrated, the GUI 402 includes an indication 404 that the buyer has not been approved for the BNPL loan ("You are not eligible to pay installments for this transaction"), which the service provider may have determined via use of the machine-learned model described above. In addition, the GUI 402 includes reasons for the denial (e.g., adverse action reasons), determined using the techniques described above, that are both understandable and actionable. For instance, the GUI 402 may include a first reason 406 indicating that the buyer has a history of failed transactions, a second reason 408 indicating that the buyer has limited credit experience, and a third reason 410 indicating that the buyer is too new to the payment application. Of course, while a few example reasons are given, it is to be appreciated that any other types of reasons may be determined, and that any other number of reasons may be given. In each instance, however, the service provider may determine the reason by calculating significance values (e.g., SHAP values), grouping the signals and summing the significance values, selecting the group(s) having the highest group-significance value(s), applying partial-dependence plots to the selected groups, and generating the adverse action data, as described above. In addition, in the illustrated example the GUI 402 includes a link 412 or other UI element that is selectable to allow the user to view one or more potential actions that the user may take in order to increase a likelihood that subsequent lending queries will be approved.

Figure 4B:
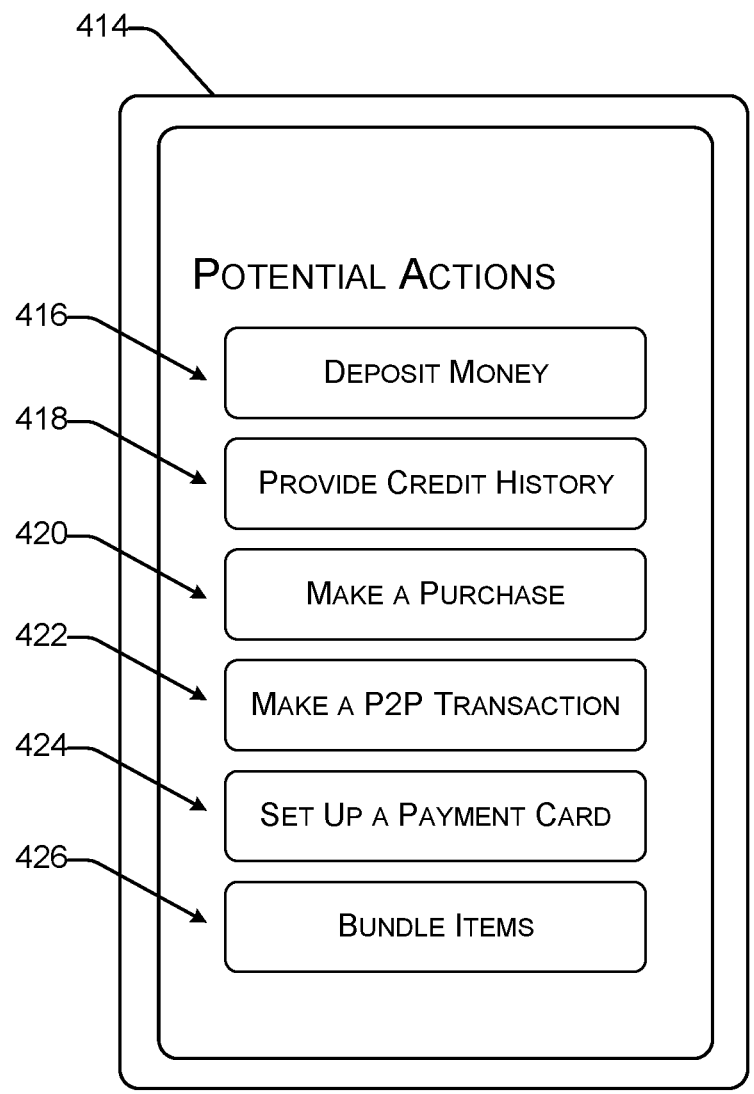
FIG. 4B is an example GUI presented to perform one or more actions to increase a likelihood that subsequent lending queries will be approved, according to an embodiment of the present subject matter.

FIG. 4B is an example GUI 414 that may be presented in response to the user selecting the link 412 in the GUI 402. As illustrated, the GUI 414 may include multiple potential icons that, when selected, allow the user to perform a corresponding action that is likely to increase the probability that a future lending query of the user will be approved. For instance, the GUI 414 includes a first icon 416 ("Deposit Money") that, when selected allows the user to deposit money into an account of the user or set up a periodic direct deposit. A second icon 418 ("Provide Credit History"), meanwhile, allows the user to upload a credit history of the user, provide a link to a credit history of the user, or the like. In addition, the example GUI 414 includes a third icon 420 ("Make a Purchase") and a fourth icon 422 ("Make a P2P transaction") that allows the user to purchase an item without a loan or allows the user to send or request to receive payment via a P2P transaction, respectively. The GUI 414 may also include a fifth icon 424 ("Set up a Payment Card") that allows a user to request to receive a physical card associated with an account of the user, and a sixth icon 426 ("Bundle Items") that allows the user to request to bundle items together and thereafter request that a BNPL loan be provided to the user for the bundled items. It is to be appreciated that while the example GUI 414 provides several example icons, other icons associated with different actions may additionally or alternatively be included as part of the GUI 414.

The GUIs described above with reference to FIGS. 3 and 4 are described as including icons, UI elements, and the like. A UI element can be text, an image, an icon, a picture, a control, or any other element that can be used by a user to interact with the user interface. To the extent "icon" is used in reference to FIGS. 3 and 4, any other UI element can be used in association with or as an alternative to such an icon. In some examples, as described above, a user interface element can be associated with an actuation mechanism such that the user interface element is selectable or otherwise interactable. As described above, the GUIs are provided for illustration and can be associated with additional or alternative data, which can be presented in additional or alternative configurations. That is, the GUIs illustrated in FIGS. 3 and 4 should not be construed as limiting.

FIGS. 5A-B and 6A-B are flowcharts showing example methods involving techniques as described herein. The methods illustrated in these figures may be described with reference to components of FIG. 1 for convenience and ease of understanding. However, the methods illustrated in these figures are not limited to being performed using components described in FIG. 1, and such components are not limited to performing the methods illustrated in FIGS. 5A-B and 6A-B.

The methods 500 and 600 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data objects, and the like that perform particular functions or implement particular abstract data types. The order in which the operations are described is not intended to be construed as a limitation, and any number of the described blocks can be combined in any order or in parallel to implement the processes. In some embodiments, one or more blocks of the process can be omitted entirely. Moreover, the methods 500 and 600 can be combined in whole or in part with each other or with other methods.

The method 500 includes, at an operation 502, determining, by a training component of one or more computing devices of a payment service, signals associated with previously denied lending queries, wherein each signal is associated with a value of a risk metric and an indication of whether the signal increases or decreases a risk metric. Such signals can be associated with individual users or a plurality of users associated with the payment service. Additional details associated with operation 502 are described above with reference to operation 202 of FIG. 2A.

The method 500 also includes, at an operation 504, training, by the training component and using the signals, a model to generate output signals for new lending queries, wherein each respective output signal indicates (i) that a new lending query is approved or (ii) that the new lending query is denied and a respective reason why the new lending query is denied. Additional details associated with operation 504 are described above with reference to operation 204 of FIG. 2A

The method 500 also includes, at an operation 506, receiving a new lending query. In some instances, the lending query comprises a request to obtain funds for acquiring each item of multiple items in a current cart of the user, while in other instances the lending query comprises a request to obtain funds for acquiring a subset (e.g., one) of items of multiple items in the cart of the user. For instance, if the cart currently includes an expresso machine and a cup of coffee, the request may comprise a request for funds for acquiring the expresso machine but not the cup of coffee. In that example, the user may pay for the cup of coffee entirely as part of the transaction while receiving a loan for the cost of the expresso machine. As described above with reference to the lending query received at the operation 210 of FIG. 2A, this new lending query may be received from a payment application or web browser operating on a buyer device, a seller application or web browser operating on a seller device, or the like. In some instances, receiving the lending query comprises at least one of receiving the lending query from an ecommerce website of the seller, a profile of the seller, a profile of the user, in response to a scan of a quick-response (QR) code presented, for example, in association with a payment UI, an ecommerce website, a profile of a buyer or seller, or the like, or in response to a tap of a buyer-facing UI that can be presented via a seller device. Further, the lending query may be for an item that the user is attempting to purchase, an item that the user previously purchased, for a bundle of items offered by the same or different sellers, or the like.

The method further includes, at an operation 508, determining a context associated with the lending query. This context may comprise any sort of information associated with the lending query or the underlying transaction associated with the lending query. For instance, the context may comprise a preference associated with the user, a preference associated with the seller, a merchant classification code (MCC) of the seller, one or more items available at the seller, one or more items in a cart of the user, a total cost of a transaction between the user and the seller, whether the transaction is occurring online at a physical establishment of the seller, or the like. In some instances, the payment service may use the context to determine whether or not to approve or decline the lending query. For instance, the payment service may decline (or approve) the lending query if the cost is too high (or too low), if the transaction is occurring online (or at a physical establishment), or the like. In addition, or in the alternative, the context may be input to the model described below such that the model utilizes the context in addition to other data associated with the lending query to determine whether to approve or decline the lending query.

The method 500 also includes, at an operation 510, applying, at a first time and by a lending-decision component of the one or more computing devices, the model to the lending query. An operation 512 represents determining whether the lending query is approved. If approved, then the method 500 includes, at an operation 514, generating and sending approval data to the buyer or seller device. In some instances, the approval may indicate that the approved loan is associated with a time restriction, such that the user may need to accept the loan or utilizes funds of the loan with a predefined amount of time in order for the payment service to provide the loan. Example details of the operations 510-514 are described above with reference to the operations 256 and 258 of FIG. 2C. Further, in some instances an indication of a decision to approve the lending query is provided to the training component described above for updating the model.

If denied, then the method 500 includes, at an operation 516, sending, by the lending-decision component and to the buyer or seller device, an indication that the lending query is denied and at least one reason for declining the lending query. In some instances, the reason comprises at least one of a low balance of the user at the payment application, a low number of payment activities at the payment application, a short history using the payment application, or a short history of credit using the payment application. While this example describes sending an indication that the lending query is denied, in other instances the payment service may approve the loan but generate updated terms, such as different repayment options than initially presented to the user. For instance, the payment service may conditionally approve the lending query subject to the user accepting more stringent lending terms.

Figure 5A:
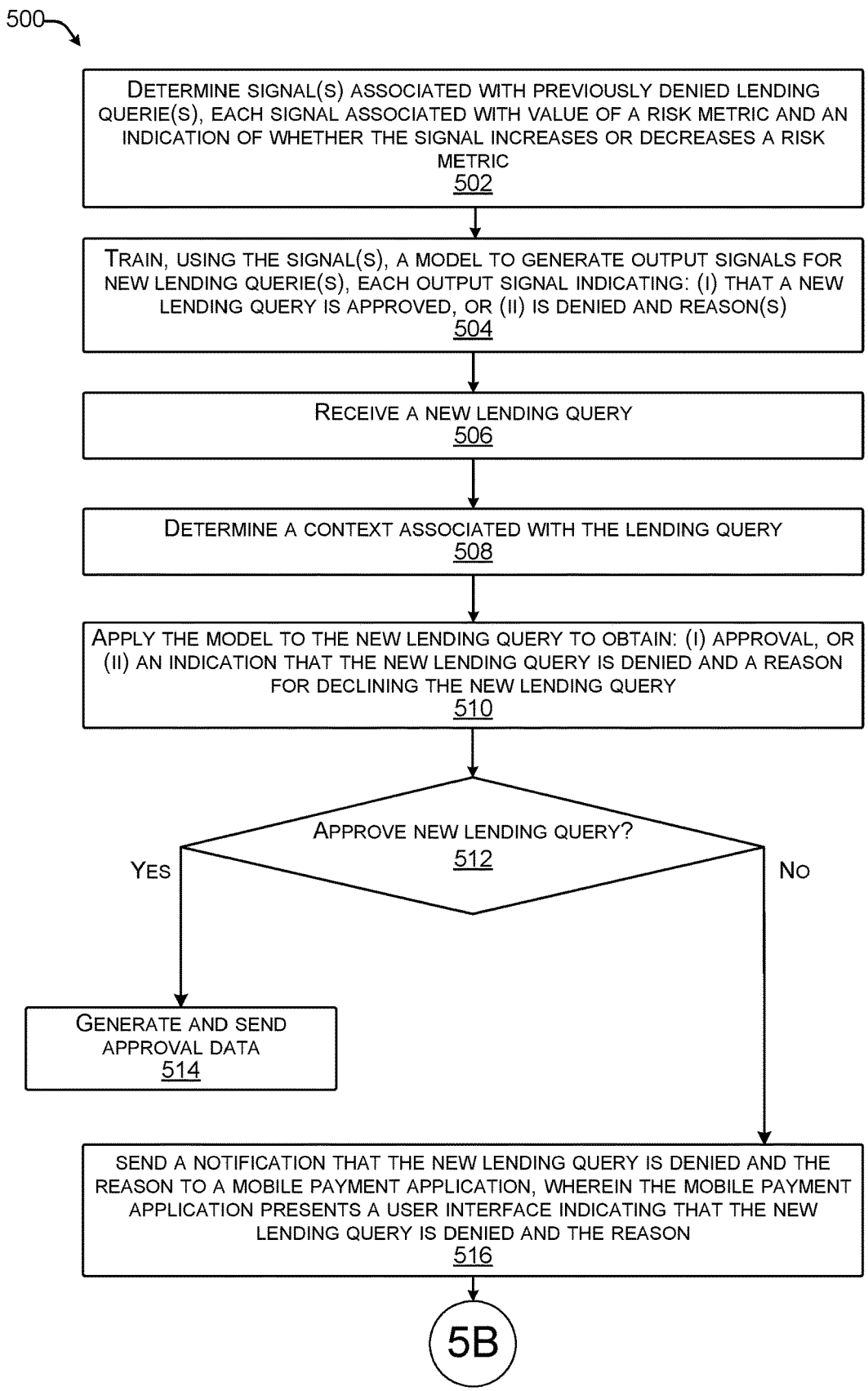
FIGS. 5A-5B is a process for determining to deny a lending query using a trained model and presenting, to the user, one or more reasons why the lending query was denied, according to an embodiment of the present subject matter.
Figure 5B:
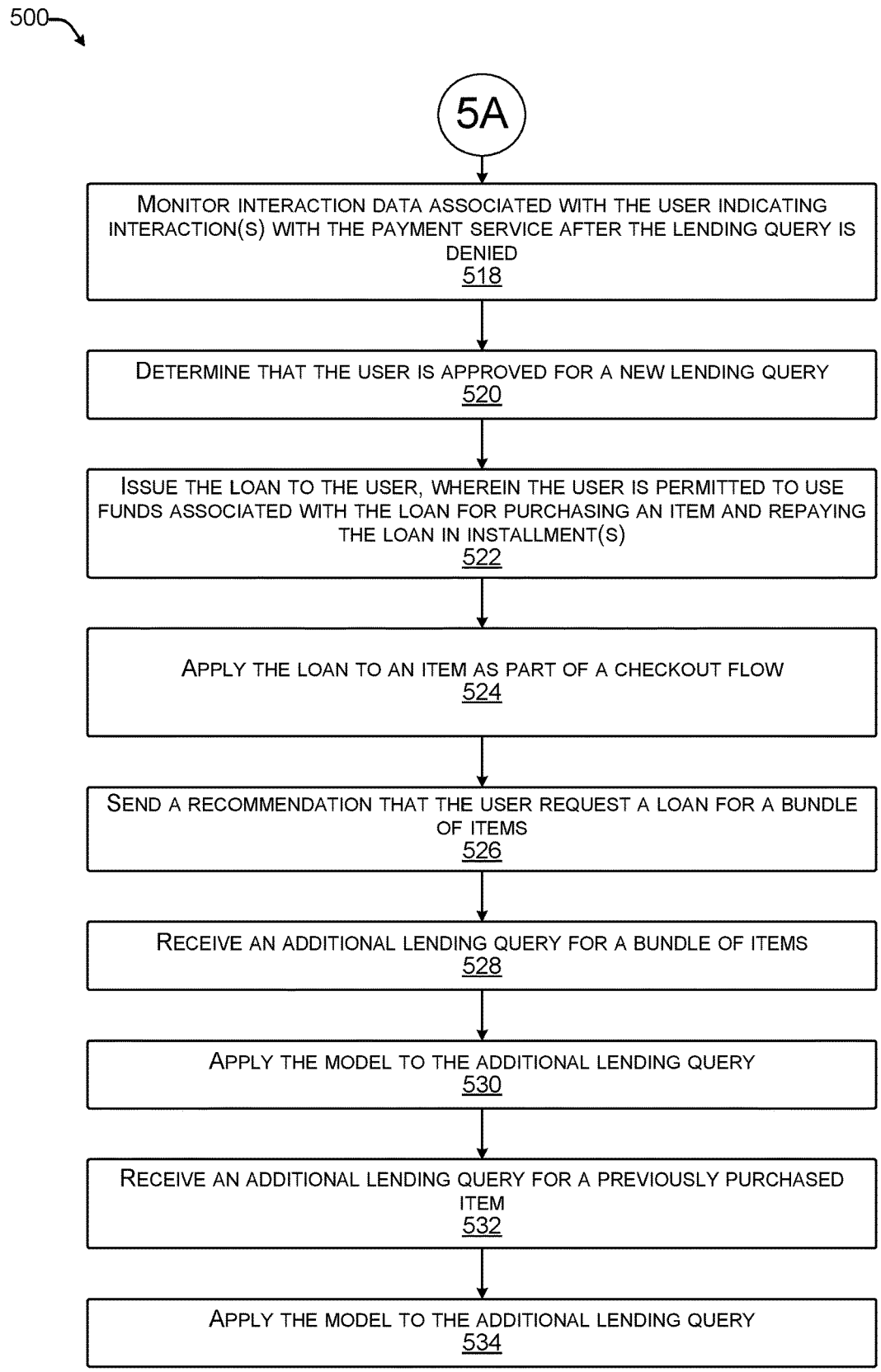

FIG. 5B continues the illustration of the method 500 and includes, at an operation 518, monitoring, by the lending-decision component, interaction data associated with the user, wherein the interaction data indicates one or more interactions with the payment service after the lending query is denied. In some instances, the interaction data indicates at least one of that the user has increased a balance of the user at the payment application or that the user has conducted additional payment activities using the payment application. In some instances, subsequent lending decisions can be determined based on interaction data indicating actions taken on actionable recommendations that cause modifications to risk metrics used in lending decisions. For example, lending decisions and associated context can be used to modify or improve machine trained models in some instances.

The method 500 also includes, at an operation 520 and in response to receiving the interaction data, determining, at a second time and by the lending-decision component, that the user is approved for a loan from the payment service. In some instances, the payment service may send, for presentation on the user device, a recommendation that the user request a loan for a bundle of multiple items, wherein the recommendation specifies the bundle of multiple items and may generate terms for the loan in response to receiving a request from the user for the loan. That is, in some instances, the payment service may identify the bundle of items to recommend to the user for requesting a BNPL loan, while in other instances the user may specify the bundle of items.

The method 500 also includes at an operation 522 and in response to receiving an indication that the user opts to apply the loan to a purchase for an item during a checkout flow associated with the item, issuing the loan to the user, wherein the user is permitted to use funds associated with the loan for purchasing the item and repaying the loan in one or more installments. Upon the payment service approving the loan, the payment service may generate the terms of the loan and provide the funds for the loan to an account of the user or an account of the seller that is offering the item(s) being acquired by the user. At an operation 524, the user receives the funds for the loan and utilizes the funds during a checkout flow with a seller.

An operation 526 represents the payment service sending a recommendation that a user request a loan for a bundle of items, such as a bundle of items offered by one seller or multiple different sellers. In some instances, the payment service may analyze a transaction history of the user to identify previously purchased items and may recommend that the user bundle these items into a single BNPL loan, while in other instances the payment service may recommend items for purchase by the user and may recommend that the user request a loan for this bundle of items. An operation 528 represents the payment service receiving an additional lending query, with this lending query comprising a request to obtain funds for purchasing a bundle of multiple items offered by one or more sellers. In some instances, this additional lending query may be received in response to the recommendation of the operation 526, while in other instances this additional lending query may be received without the payment service having provided the recommendation. In one example, the request may comprise a request from a user to bundle items being offered by multiple different sellers into a single BNPL loan issued by the payment service. An operation 530 comprises applying the model described above to the additional lending query for determining whether or not to approve or decline the lending query. As described above, if the lending query is approved, then the payment service may send an indication of the approval to a device of the user and may generate terms of the loan and issue funds associated with the loan. If the lending query is denied, the payment service may send an indication of the decline and adverse-action data indicating one or more reasons for the decline to the device of the user.

An operation 532 represents the payment service receiving an additional lending query, with this lending query comprising a request to obtain funds for an item previously purchased by the user. An operation 534 comprises applying the model described above to the additional lending query for determining whether or not to approve or decline the lending query for the previously purchased item. As described above, if the lending query is approved, then the payment service may send an indication of the approval to a device of the user and may generate terms of the loan and issue funds associated with the loan. If the lending query is denied, the payment service may send an indication of the decline and adverse-action data indicating one or more reasons for the decline to the device of the user.

FIG. 6 is the example method 600, which may comprise operations for performing the operation 508 of applying the model to the lending query to obtain: (i) an indication of approval of the lending query, or (ii) an indication that that the lending query is denied and a respective reason why the lending query is denied.

The method 600 includes, at an operation 602, inputting data associated with the lending query into the model to receive, as output of the model, a risk score associated with the lending query.

The method 600 includes, at an operation 604, determining whether the risk scores satisfies one or more risk criteria. If so, then the operation 512 represents generating the approval data. If not, however, then an operation 606 represents calculating, for each signal of multiple signals associated with the data, a significance score indicating a significance of the respective signal in the risk score. In some instances, the calculating comprises calculating a Shapley-additive-explanation (SHAP) value for each respective signal in the risk score.

The method also includes, at an operation 608, grouping the multiple signals into respective signal groups, including at least a first group associated with the first reason for decline and a second group associated with a second reason for decline.

Figure 6A:
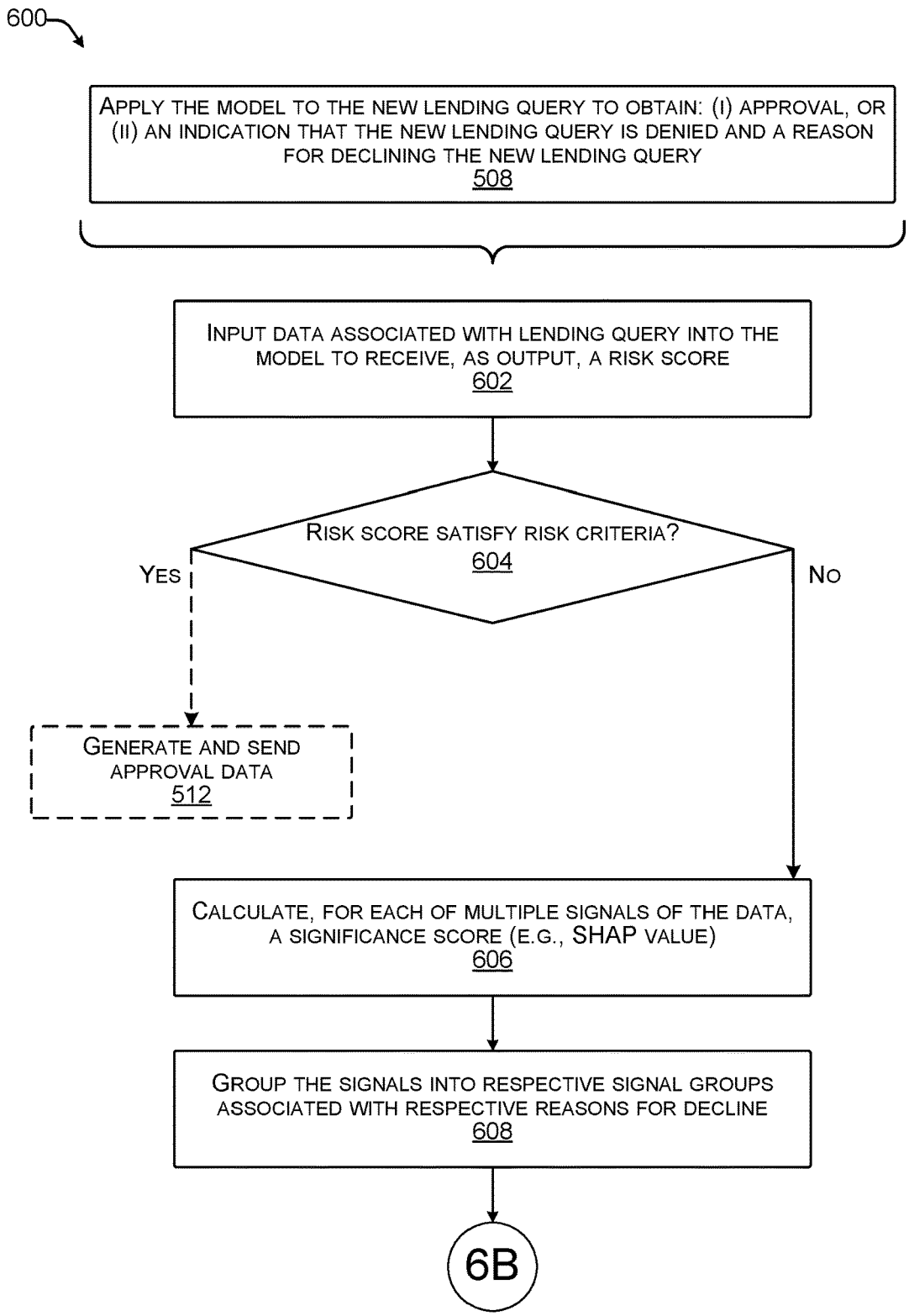
FIGS. 6A-6B is an example process for applying a trained model to data associated with a proposed transaction for determining one or more reasons for denying a lending query associated with a user, according to an embodiment of the present subject matter.
Figure 6B:
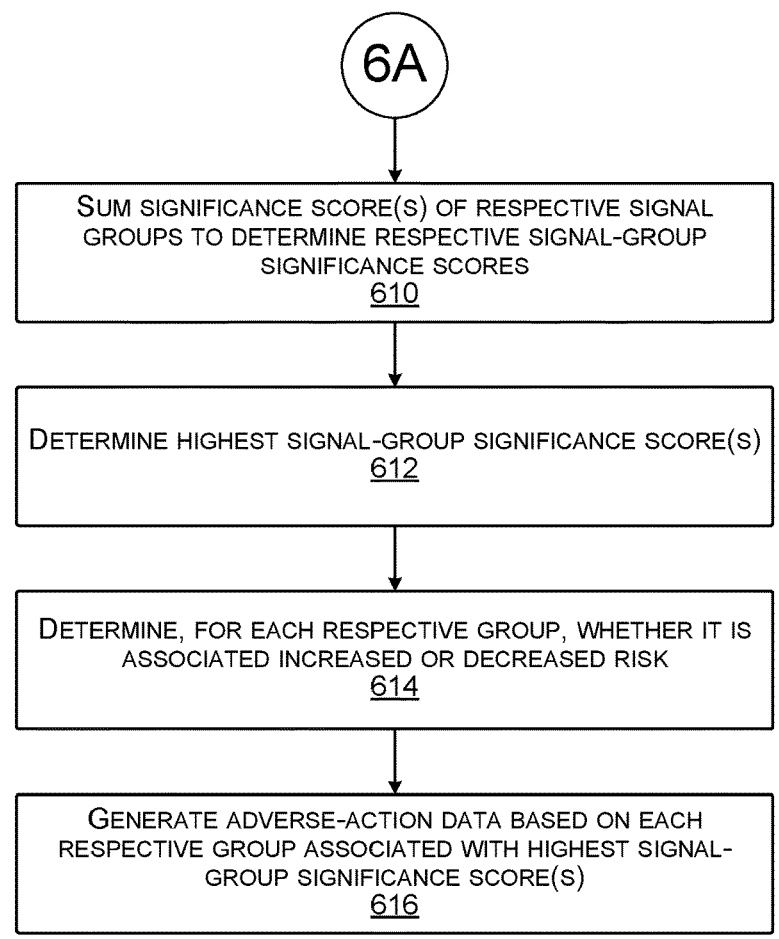

FIG. 6B continues the illustration of the method 600 and includes, at an operation 610, summing respective significance scores of signals of the respective groups to determine respective group significance scores.

The method 600 also includes, at an operation 612 determining one or more highest group significance scores for selection and, at an operation 614, determining whether each respective selected group is associated with increased risk or decreased risk. Finally, an operation 616 represents generating adverse action data indicating that the lending query is denied based at least in part on each respective signal group associated with the highest signal-group-significance score(s). in addition, the lending query and an indication of the decision to decline the lending query may be provided to the training component described above for updating the model.

Figure 7:
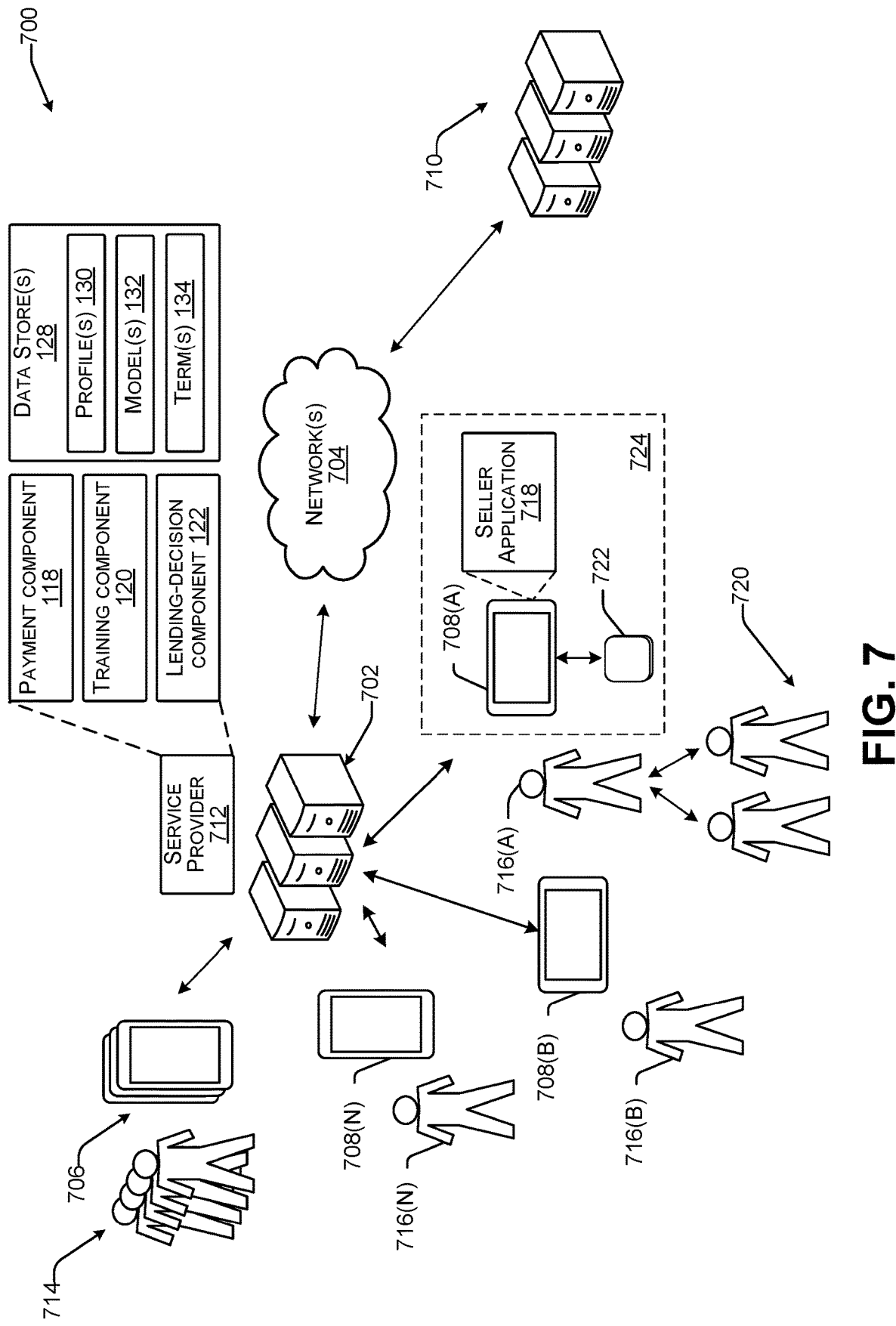
FIG. 7 is an example seller ecosystem for facilitating, among other things, techniques described herein, according to an embodiment of the present subject matter.

FIG. 7 is an example environment 700. The environment 700 includes server(s) 702 that can communicate over a network 704 with user devices 706 (which, in some examples can be seller devices 708 (individually, 708(A)-708(N))) or server(s) 710 associated with third-party service provider(s). The server(s) 702 can be associated with a service provider that can provide one or more services for the benefit of users 714, as described below. Actions attributed to the service provider can be performed by the server(s) 702.

The environment 700 can include a plurality of user devices 706, as described above. Each one of the plurality of user devices 706 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 714. The users 714 can be referred to as buyers, customer, sellers, merchants, borrowers, employees, employers, payors, payees, couriers and so on. The users 714 can interact with the user devices 706 via user interfaces presented via the user devices 706. In at least one example, a user interface can be presented via a web browser, or the like. In other examples, a user interface can be presented via an application, such as a payment application or desktop application, which can be provided by the service provider or which can be an otherwise dedicated application. In some examples, individual of the user devices 706 can have an instance or versioned instance of an application, which can be downloaded from an application store, for example, which can present the user interface(s) described herein. In at least one example, a user 714 can interact with the user interface via touch input, spoken input, or any other type of input.

As described above, in at least one example, the users 714 can include sellers 716 (individually, 716(A)-716(N)). In an example, the sellers 716 can operate respective seller devices 708, which can be user devices 706 configured for use by sellers 716. For the purpose of this discussion, a "seller" can be any entity that offers items (e.g., goods or services) for purchase or other means of acquisition (e.g., rent, borrow, barter, etc.). The sellers 716 can offer items for purchase or other means of acquisition via brick-and-mortar stores, mobile stores (e.g., pop-up shops, food trucks, etc.), online stores, combinations of the foregoing, and so forth. In some examples, at least some of the sellers 716 can be associated with a same entity but can have different seller locations or can have franchise/franchisee relationships. In additional or alternative examples, the sellers 716 can be different sellers. That is, in at least one example, the seller 716(A) is a different seller than the seller 716(B) or the seller 716(C).

For the purpose of this discussion, "different sellers" can refer to two or more unrelated sellers. "Different sellers" therefore can refer to two or more sellers that are different legal entities (e.g., natural persons or corporate persons) that do not share accounting, employees, branding, etc. "Different sellers," as used herein, have different names, employer identification numbers (EIN)s, lines of business (in some examples), inventories (or at least portions thereof), or the like. Thus, the use of the term "different sellers" does not refer to a seller with various seller locations or franchise/franchisee relationships. Such sellers—with various seller locations or franchise/franchisee relationships—can be referred to as sellers having different seller locations or different commerce channels.

Each seller device 708 can have an instance of a seller application 718 stored thereon. The seller application 718 can configure the seller device 708 as a POS terminal, which enables the seller 716(A) to interact with one or more buyers 720. As described above, the users 714 can include buyers, such as the buyers 720 shown as interacting with the seller 716(A). For the purpose of this discussion, a "buyer" can be any entity that acquires items from sellers. While only two buyers 720 are illustrated in FIG. 7, any number of buyers 720 can interact with the sellers 716. Further, while FIG. 7 illustrates the buyers 720 interacting with the seller 716(A), the buyers 720 can interact with any of the sellers 716.

In at least one example, interactions between the buyers 720 and the sellers 716 that involve the exchange of funds (from the buyers 720) for items (from the sellers 716) can be referred to as "transactions." In at least one example, the seller application 718 can determine transaction data associated with the POS transactions. Transaction data can include payment information, which can be obtained from a reader device 722 associated with the seller device 708(A), user authentication data, purchase amount information, point-of-purchase information (e.g., item(s) purchased, date of purchase, time of purchase, etc.), etc. The seller application 718 can send transaction data to the server(s) 702 such that the server(s) 702 can track transactions of the buyers 720, sellers 716, or any of the users 714 over time. Furthermore, the seller application 718 can present a UI to enable the seller 716(A) to interact with the seller application 718 or the service provider via the seller application 718.

In at least one example, the seller device 708(A) can be a special-purpose computing device configured as a POS terminal (via the execution of the seller application 718). In at least one example, the POS terminal may be connected to a reader device 722, which is capable of accepting a variety of payment instruments, such as credit cards, debit cards, gift cards, short-range communication based payment instruments, and the like, as described below. In at least one example, the reader device 722 can plug in to a port in the seller device 708(A), such as a microphone port, a headphone port, an audio-jack, a data port, or other suitable port. In additional or alternative examples, the reader device 722 can be coupled to the seller device 708(A) via another wired or wireless connection, such as via a Bluetooth®, BLE, and so on. Additional details are described below with reference to FIG. 7. In some examples, the reader device 722 can read information from alternative payment instruments including, but not limited to, wristbands and the like.

In some examples, the reader device 722 may physically interact with payment instruments such as magnetic stripe payment cards, EMV payment cards, or short-range communication (e.g., near field communication (NFC), radio frequency identification (RF ID), Bluetooth®, Bluetooth® low energy (BLE), etc.) payment instruments (e.g., cards or devices configured for tapping). The POS terminal may provide a rich user interface, communicate with the reader device 722, and communicate with the server(s) 702, which can provide, among other services, a payment processing service. The server(s) 702 associated with the service provider can communicate with server(s) 710, as described below. In this manner, the POS terminal and reader device 722 may collectively process transaction(s) between the sellers 716 and buyers 720. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 722 of the POS system 724 are shown as separate devices, in additional or alternative examples, the POS terminal and the reader device 722 can be part of a single device. In some examples, the reader device 722 can have a display integrated therein for presenting information to the buyers 720. In additional or alternative examples, the POS terminal can have a display integrated therein for presenting information to the buyers 720. POS systems, such as the POS system 724, may be mobile, such that POS terminals and reader devices may process transactions in disparate locations across the world. POS systems can be used for processing card-present transactions and card-not-present (CNP) transactions, as described below.

A card-present transaction is a transaction where both a buyer 720 and his or her payment instrument are physically present at the time of the transaction. Card-present transactions may be processed by swipes, dips, taps, or any other interaction between a physical payment instrument (e.g., a card), or otherwise present payment instrument, and a reader device 722 whereby the reader device 722 is able to obtain payment data from the payment instrument. A swipe is a card-present transaction where a buyer 720 slides a card, or other payment instrument, having a magnetic strip through a reader device 722 that captures payment data contained in the magnetic strip. A dip is a card-present transaction where a buyer 720 inserts a payment instrument having an embedded microchip (i.e., chip) into a reader device 722 first. The dipped payment instrument remains in the payment reader until the reader device 722 prompts the buyer 720 to remove the card, or other payment instrument. While the payment instrument is in the reader device 722, the microchip can create a one-time code which is sent from the POS system 724 to the server(s) 710 (which can be associated with third-party service providers that provide payment services, including but not limited to, an acquirer bank, an issuer, or a card payment network (e.g., Mastercard®, VISA®, etc.)) to be matched with an identical one-time code. A tap is a card-present transaction where a buyer 720 may tap or hover his or her payment instrument (e.g., card, electronic device such as a smart phone running a payment application, etc.) over a reader device 722 to complete a transaction via short-range communication (e.g., NFC, RFID, Bluetooth®, BLE, etc.). Short-range communication enables the payment instrument to exchange information with the reader device 722. A tap may also be called a contactless payment.

A CNP transaction is a transaction where a card, or other payment instrument, is not physically present at the POS such that payment data is required to be manually keyed in (e.g., by a seller, buyer, etc.), or payment data is required to be recalled from a card-on-file data store, to complete the transaction.

The POS system 724, the server(s) 702, or the server(s) 710 may exchange payment information and transaction data to determine whether transactions are authorized. For example, the POS system 724 may provide encrypted payment data, user authentication data, purchase amount information, point-of-purchase information, etc. (collectively, transaction data) to server(s) 702 over the network(s) 704. The server(s) 702 may send the transaction data to the server(s) 710. As described above, in at least one example, the server(s) 710 can be associated with third-party service providers that provide payment services, including but not limited to, an acquirer bank, an issuer, or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of sellers(s). An acquirer can be a registered member of a card association (e.g., Visa®, MasterCard®), and can be part of a card payment network. The acquirer (e.g., the server(s) 710 associated therewith) can send a fund transfer request to a server computing device of a card payment network (e.g., Mastercard®, VISA®, etc.) to determine whether the transaction is authorized or deficient. In at least one example, the service provider can serve as an acquirer and connect directly with the card payment network.

The card payment network (e.g., the server(s) 710 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 710 associated therewith) can make a determination as to whether the buyer has the capacity to absorb the relevant charge associated with the payment transaction. In at least one example, the service provider can serve as an issuer or can partner with an issuer. The transaction is either approved or rejected by the issuer or the card payment network (e.g., the server(s) 710 associated therewith), and a payment authorization message is communicated from the issuer to the POS device via a path opposite of that described above, or via an alternate path.

As described above, the server(s) 710, which can be associated with payment service provider(s), may determine whether the transaction is authorized based on the transaction data, as well as information relating to parties to the transaction (e.g., the buyer 720 or the seller 716(A)). The server(s) 710 may send an authorization notification over the network(s) 704 to the server(s) 702, which may send the authorization notification to the POS system 724 over the network(s) 704 to indicate whether the transaction is authorized. The server(s) 702 may also transmit additional information such as transaction identifiers to the POS system 724. In one example, the server(s) 702 may include a seller application or other functional components for communicating with the POS system 724 or the server(s) 710 to authorize or decline transactions.

Based on the authentication notification that is received by the POS system 724 from server(s) 702, the seller 716(A) may indicate to the buyer 720 whether the transaction has been approved. In some examples, approval may be indicated at the POS system 724, for example, at a display of the POS system 724. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 714 can access all of the services of the service provider. In other examples, the users 714 can have gradated access to the services, which can be based on risk tolerance, IDV outputs, subscriptions, and so on. In at least one example, access to such services can be availed to the sellers 716 via the seller application 718. In additional or alternative examples, each service can be associated with its own access point (e.g., application, web browser, etc.).

The service provider can offer payment processing services for processing payments on behalf of the sellers 716, as described above. For example, the service provider can provision payment processing software, payment processing hardware or payment processing services to sellers 716, as described above, to enable the sellers 716 to receive payments from the buyers 720 when conducting POS transactions with the buyers 720. For instance, the service provider can enable the sellers 716 to receive cash payments, payment card payments, or electronic payments from buyers 720 for POS transactions and the service provider can process transactions on behalf of the sellers 716.

As the service provider processes transactions on behalf of the sellers 716, the service provider can maintain accounts or balances for the sellers 716 in one or more ledgers. For example, the service provider can analyze transaction data received for a transaction to determine an amount of funds owed to a seller 716(A) for the transaction. In at least one example, such an amount can be a total purchase price less fees charged by the service provider for providing the payment processing services. Based on determining the amount of funds owed to the seller 716(A), the service provider can deposit funds into an account of the seller 716(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the seller 716(A) to a bank account of the seller 716(A) that is held at a bank or other financial institution (e.g., associated with the server(s) 710). Scheduled deposits can occur at a prearranged time after a POS transaction is funded, which can be a business day after the POS transaction occurred, or sooner or later. In some examples, the seller 716(A) can access funds prior to a scheduled deposit. For instance, the seller 716(A) may have access to same-day deposits (e.g., wherein the service provider deposits funds from the stored balance to a linked bank account of the seller on a same day as POS transaction, in some examples prior to the POS transaction being funded) or instant deposits (e.g., wherein the service provider deposits funds from the stored balance to a linked bank account of the seller on demand, such as responsive to a request). Further, in at least one example, the seller 716(A) can have a payment instrument that is linked to the stored balance that enables the seller to access the funds without first transferring the funds from the account managed by the service provider to the bank account of the seller 716(A).

In at least one example, the service provider may provide inventory management services. That is, the service provider may provide inventory tracking and reporting. Inventory management services may enable the seller 716(A) to access and manage a database storing data associated with a quantity of each item that the seller 716(A) has available (i.e., an inventory). Furthermore, in at least one example, the service provider can provide catalog management services to enable the seller 716(A) to maintain a catalog, which can be a database storing data associated with items that the seller 716(A) has available for acquisition (i.e., catalog management services). In at least one example, the catalog may include a plurality of data items and a data item of the plurality of data items may represent an item that the seller 716(A) has available for acquisition. The service provider can offer recommendations related to pricing of the items, placement of items on the catalog, and multi-party fulfilment of the inventory.

In at least one example, the service provider can provide business banking services, which allow the seller 716(A) to track deposits (from payment processing or other sources of funds) into an account of the seller 716(A), payroll payments from the account (e.g., payments to employees of the seller 716(A)), payments to other sellers (e.g., business-to-business) directly from the account or from a linked debit card, withdrawals made via scheduled deposit or instant deposit, etc. Furthermore, the business banking services can enable the seller 716(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the sellers 716 to visualize their cash flow to track their financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers or terms associated with such financing offers.

In at least one example, the service provider can provide financing services for offering or lending a loan to a borrower that is to be used for, in some instances, financing the borrower's short-term operational needs (e.g., a capital loan). For instance, a potential borrower that is a seller can obtain a capital loan via a capital loan product in order to finance various operational costs (e.g., rent, payroll, inventory, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally or alternatively, the service provider can offer a monthly repayment loan product, wherein a capital loan is repaid monthly, for instance, via a debit from a bank account linked to the payment processing service. The credit risk of the seller may be evaluated using risk models that take into account factors, such as payment volume, credit risk of similarly situated sellers, past transaction history, seasonality, credit history, and so on.

Additionally or alternatively, the service provider can provide financing services for offering or lending a loan to a borrower that is to be used for, in some instances, financing the borrower's consumer purchase (e.g., a consumer loan). In at least one example, a borrower can submit a request for a loan to enable the borrower to purchase an item from a seller, which can be one of the sellers 716. The service provider can generate the loan based at least in part on determining that the borrower purchased or intends to purchase the item from the seller. The loan can be associated with a balance based on an actual purchase price of the item and the borrower can repay the loan over time. In some examples, the borrower can repay the loan via installments, which can be paid via funds managed or maintained by the service provider (e.g., from payments owed to the seller from payments processed on behalf of the seller, funds transferred to the seller, etc.). The service provider can offer specific financial products, such as payment instruments, tied specifically to the loan products. For example, in one implementation, the server provider 712 associates capital to a seller or buyer's debit card, where the use of the debit card is defined by the terms of the loan. In some examples, the seller may only use the debit card for making specific purchases. In other examples, the "installment" associated with the loan product is credited directly via the payment instrument. The payment instrument is thus customized to the loan or the parties associated with the loan.

In some of these instances where the service provider 712 provides loans to users, the service provider 712 may be configured to offer BNPL loans as described above. For instance, the service provider 712 may be configured to offer BNPL loans and to automatically determine whether a user is eligible for such a BNPL loan in real-time or near-real-time in response to receiving a lending query from a user, as described above. In these instances, and as illustrated, the service provider 712 may include the payment component 118, the training component 120, and the lending-decision component 122, each of which may function as described above. In addition, the service provider 712 can include the data store(s) 128 that include the profile data 130, one or more models 132 (e.g., machine-learned models), and the terms of any loans previously offered or provided by the service provider 712.

The service provider can provide web-development services, which enable users 714 who are unfamiliar with HTML, XML, Javascript, CSS, or other web design tools to create and maintain professional and aesthetically pleasing websites. Some of these web page editing applications allow users to build a web page or modify a web page (e.g., change, add, or remove content associated with a web page). Further, in addition to websites, the web-development services can create and maintain other online omni-channel presences, such as social media posts for example. In some examples, the resulting web page(s) or other content items can be used for offering item(s) for sale via an online/e-commerce platform. That is, the resulting web page(s) or other content items can be associated with an online store or offering by the one or more of the sellers 716. In at least one example, the service provider can recommend or generate content items to supplement omni-channel presences of the sellers 716. That is, if a seller of the sellers 716 has a web page, the service provider—via the web-development or other services—can recommend or generate additional content items to be presented via other channel(s), such as social media, email, etc.

Furthermore, the service provider can provide payroll services to enable employers to pay employees for work performed on behalf of employers. In at least one example, the service provider can receive data that includes time worked by an employee (e.g., through imported timecards or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk or reliability analyses performed by the service provider.

Moreover, in at least one example, the service provider can provide employee management services for managing schedules of employees. Further, the service provider can provide appointment services for enabling users 714 to set schedules for scheduling appointments or users 714 to schedule appointments.

In some examples, the service provider can provide restaurant management services to enable users 714 to make or manage reservations, to monitor front-of-house or back-of-house operations, and so on. In such examples, the seller device(s) 708 or server(s) 702 can be configured to communicate with one or more other computing devices, which can be located in the front-of-house (e.g., POS device(s)) or back-of-house (e.g., kitchen display system(s) (KDS)). In at least one example, the service provider can provide order management services or fulfillment services to enable restaurants to manage open tickets, split tickets, and so on or manage fulfillment services. In some examples, such services can be associated with restaurant sellers, as described above. In additional or alternative examples, such services can be any type of seller.

In at least one example, the service provider can provide fulfilment services, which can use couriers for delivery, wherein couriers can travel between multiple locations to provide delivery services, photography services, etc. Couriers can be users 714 who can travel between locations to perform services for a requesting user 714 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 706.

In some examples, the service provider can provide omni-channel fulfillment services. For instance, if a buyer places an order with a seller and the seller cannot fulfill the order because one or more items are out of stock or otherwise unavailable, the service provider can leverage other sellers or sales channels that are part of the platform of the service provider to fulfill the buyer's order. That is, another seller can provide the one or more items to fulfill the order of the buyer. Furthermore, in some examples, another sales channel (e.g., online, brick-and-mortar, etc.) can be used to fulfill the order of the buyer.

In some examples, the service provider can enable conversational commerce via conversational commerce services, which can use one or more machine learning mechanisms to analyze messages exchanged between two or more users 714, voice inputs into a virtual assistant or the like, to determine intents of user(s) 714. In some examples, the service provider can utilize determined intents to automate buyer service, offer promotions, provide recommendations, or otherwise interact with buyers in real-time. In at least one example, the service provider can integrate products and services, and payment mechanisms into a communication platform (e.g., messaging, etc.) to enable buyers to make purchases, or otherwise transact, without having to call, email, or visit a web page or other channel of a seller. That is, conversational commerce alleviates the need for buyers to toggle back and forth between conversations and web pages to gather information and make purchases.

In at least one example, a user 714 may be new to the service provider such that the user 714 that has not registered (e.g., subscribed to receive access to one or more services offered by the service provider) with the service provider. The service provider can offer onboarding services for registering a potential user 714 with the service provider. In some examples, onboarding can involve presenting various questions, prompts, and the like to a potential user 714 to obtain information that can be used to generate a profile for the potential user 714. In at least one example, the service provider can provide limited or short-term access to its services prior to, or during, onboarding (e.g., a user of a peer-to-peer payment service can transfer or receive funds prior to being fully onboarded, a seller can process payments prior to being fully onboarded, etc.). In at least one example, responsive to the potential user 714 providing all necessary information, the potential user 714 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes or can be offered as a service, for instance to third-party service providers (e.g., associated with the server(s) 710). That is, the service provider can offer IDV services to verify the identity of users 714 seeking to use or using their services. Identity verification requires a buyer (or potential buyer) to provide information that is used by compliance departments to prove that the information is associated with an identity of a real person or entity. In at least one example, the service provider can perform services for determining whether identifying information provided by a user 714 accurately identifies the buyer (or potential buyer) (i.e., Is the buyer who they say they are?).

The service provider is capable of providing additional or alternative services and the services described above are offered as a sampling of services. In at least one example, the service provider can exchange data with the server(s) 710 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 702) or the server(s) 710 via the network(s) 704. In some examples, the seller device(s) 708 are not capable of connecting with the service provider (e.g., the server(s) 702) or the server(s) 710, due to a network connectivity issue, for example. In additional or alternative examples, the server(s) 702 are not capable of communicating with the server(s) 710 due to network connectivity issue, for example. In such examples, devices may operate in "offline" mode where at least some payment data is stored (e.g., on the seller device(s) 708) or the server(s) 702 until connectivity is restored and the payment data can be transmitted to the server(s) 702 or the server(s) 710 for processing.

In at least one example, the service provider can be associated with a hub, such as an order hub, an inventory hub, a fulfillment hub and so on, which can enable integration with one or more additional service providers (e.g., associated with the additional server(s) 710). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 706 that are in communication with one or more server computing devices 702 of the service provider. That is, techniques described herein are directed to a specific implementation—or, a practical application—of utilizing a distributed system of user devices 706 that are in communication with one or more server computing devices 702 of the service provider to perform a variety of services, as described above. The unconventional configuration of the distributed system described herein enables the server(s) 702 that are remotely-located from end-users (e.g., users 714) to intelligently offer services based on aggregated data associated with the end-users, such as the users 714 (e.g., data associated with multiple, different sellers or multiple, different buyers), in some examples, in real time or near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct seller accounts, e.g., accounts within the control of the service provider, and those outside of the control of the service provider, to track the business standing (payables, receivables, payroll, invoices, appointments, capital, etc.) of the sellers. The techniques herein provide a consolidated view of a seller's cash flow, predict needs, preemptively offer recommendations or services, such as capital, coupons, etc., or enable money movement between disparate accounts (seller's, another seller's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 714 and user devices 706. Furthermore, such features are changed dynamically based on the profiles of the users involved interacting with the GUIs. As such, techniques described herein are directed to improvements to computing systems.

Figure 8:
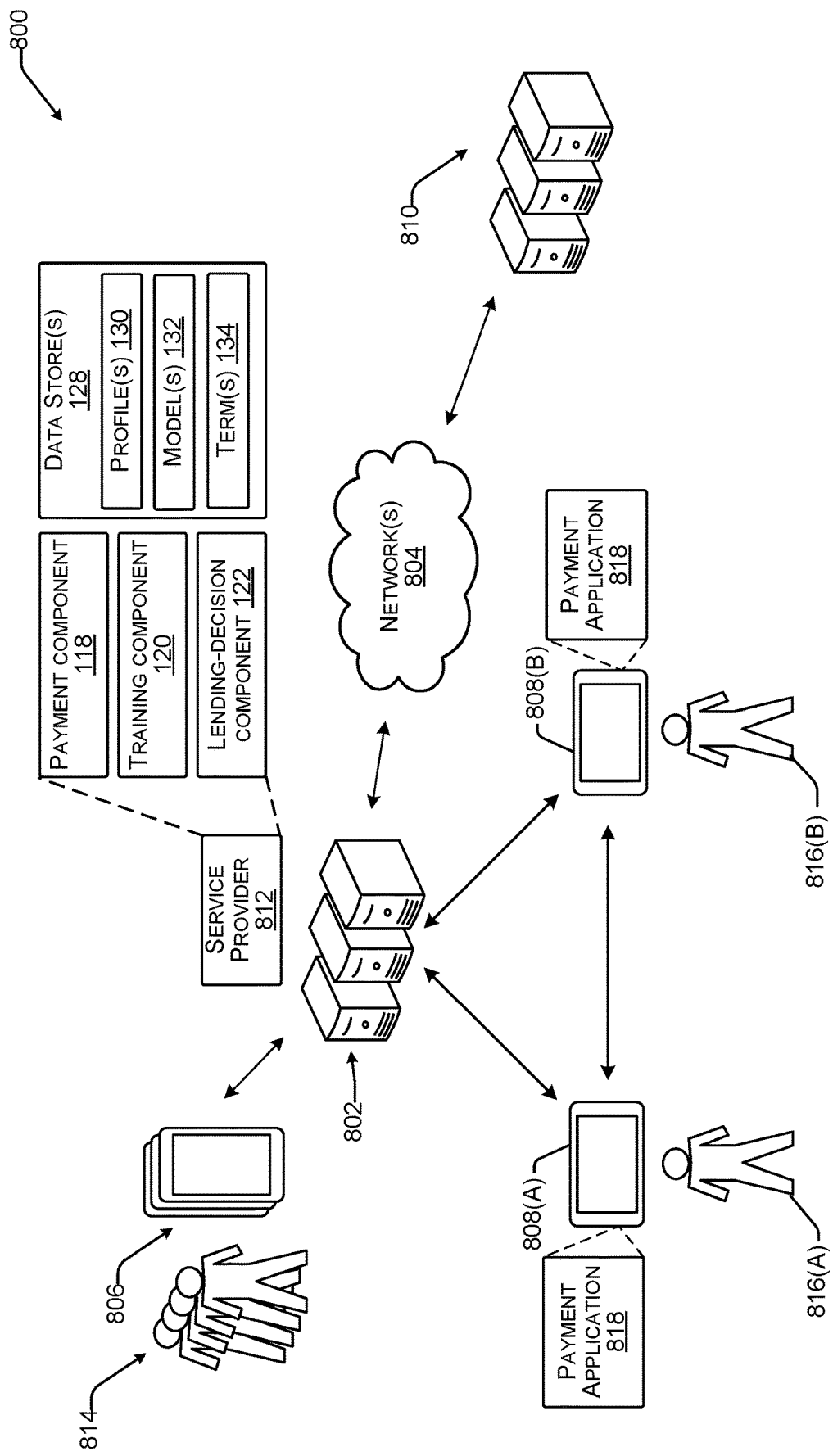
FIG. 8 is an example peer-to-peer payment-application ecosystem for facilitating, among other things, techniques described herein, according to an embodiment of the present subject matter.

FIG. 8 is an example environment 800. The environment 800 includes server(s) 802 that can communicate over a network 804 with user devices 806 (which, in some examples can be user devices 808 (individually, 808(A), 808(B)) or server(s) 810 associated with third-party service provider(s). The server(s) 802 can be associated with a service provider that can provide one or more services for the benefit of users 814, as described below. Actions attributed to the service provider can be performed by the server(s) 802.

In some examples, the service provider referenced in FIG. 7 can be the same or different than the service provider referenced in FIG. 8. For instance, the servers 802 may include a service provider 812, which may include the components of the service providers described above with reference to FIGS. 1 and 7. For instance, the service provider 812 may be configured to offer BNPL loans and to automatically determine whether a user is eligible for such a BNPL loan in real-time or near-real-time in response to receiving a lending query from a user, as described above. In these instances, and as illustrated, the service provider 812 may include the payment component 118, the training component 120, and the lending-decision component 122, each of which may function as described above. In addition, the service provider 812 can include the data store(s) 128 that include the profile data 130, one or more models 132 (e.g., machine-learned models), and the terms of any loans previously offered or provided by the service provider 812.

The environment 800 can include a plurality of user devices 806, as described above. Each one of the plurality of user devices 806 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 814. The users 814 can be referred to as buyers, buyers, sellers, sellers, borrowers, employees, employers, payors, payees, couriers and so on. The users 814 can interact with the user devices 806 via user interfaces presented via the user devices 806. In at least one example, a user interface can be presented via a web browser, or the like. In other examples, a user interface can be presented via an application, such as a payment application or desktop application, which can be provided by the service provider or which can be an otherwise dedicated application. In some examples, individual of the user devices 806 can have an instance or versioned instance of an application, which can be downloaded from an application store, for example, which can present the user interface(s) described herein. In at least one example, a user 814 can interact with the user interface via touch input, spoken input, or any other type of input.

In at least one example, the service provider can provide a peer-to-peer payment service that enables peer-to-peer payments between two or more users 814. Two users, user 816(A) and user 816(B) are illustrated in FIG. 8 as "peers" in a peer-to-peer payment. In at least one example, the service provider can communicate with instances of a payment application 818 (or other access point) installed on devices 806 configured for operation by users 814. In an example, an instance of the payment application 818 executing on a first device 808(A) operated by a payor (e.g., user 816(A)) can send a request to the service provider to transfer an asset (e.g., fiat currency, non-fiat currency, cryptocurrency, securities, gift cards, or related assets) from the payor to a payee (e.g., user 816(B)) via a peer-to-peer payment. In some examples, assets associated with an account of the payor are transferred to an account of the payee. In some examples, assets can be held at least temporarily in an account of the service provider prior to transferring the assets to the account of the payee. In addition, and as described in detail above, the payment application 818 may enable the users to initiate a BNPL loan for one or more items.

Figure 9:
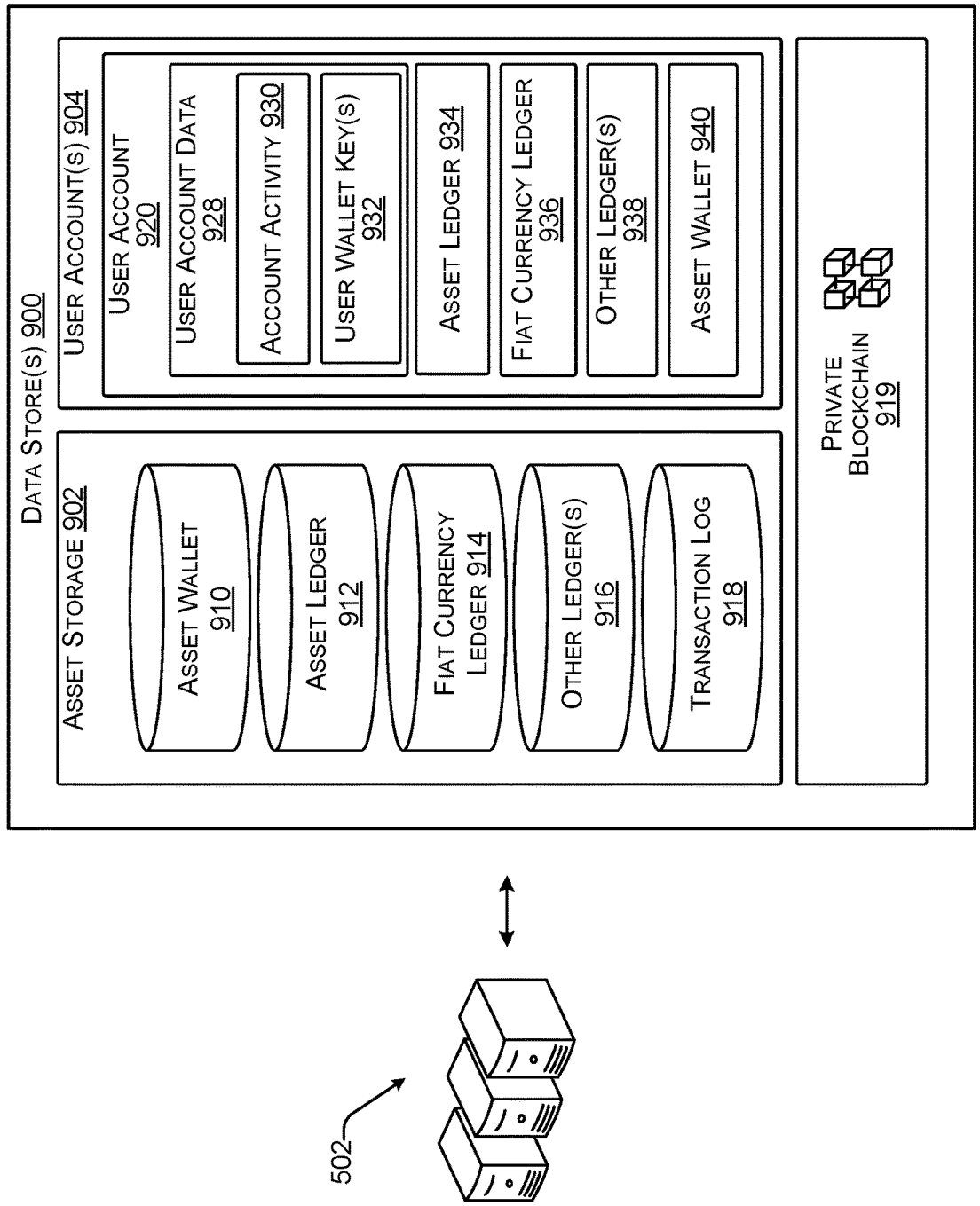
FIG. 9 is an example data store(s) that stores, among other things, a ledger(s) associated with one or more assets for facilitating, among other things, techniques described herein, according to an embodiment of the present subject matter.

In some examples, the service provider can utilize a ledger system to track transfers of assets between users 806. FIG. 9, below, provides additional details associated with such a ledger system. The ledger system can enable users 806 to own fractional shares of assets that are not conventionally available. For instance, a user can own a fraction of a Bitcoin or a stock. Additional details are described herein.

In at least one example, the service provider can facilitate transfers and can send notifications related thereto to instances of the payment application 818 executing on user device(s) of payee(s). As an example, the service provider can transfer assets from an account of user 816(A) to an account of the user 816(B) and can send a notification to the user device 808(B) of the user 816(B) for presentation via a user interface. The notification can indicate that a transfer is in process, a transfer is complete, or the like. In some examples, the service provider can send additional or alternative information to the instances of the payment application 818 (e.g., low balance to the payor, current balance to the payor or the payee, etc.). In some examples, the payor or payee can be identified automatically, e.g., based on context, proximity, prior transaction history, and so on. In other examples, the payee can send a request for funds to the payor prior to the payor initiating the transfer of funds. In some embodiments, the service provider funds the request to payee on behalf of the payor, to speed up the transfer process and compensate for any lags that may be attributed to the payor's financial network.

In some examples, the service provider can trigger the peer-to-peer payment process through identification of a "payment proxy" having a particular syntax. For example, the syntax can include a monetary currency indicator prefixing one or more alphanumeric characters (e.g., $Cash). The currency indicator operates as the tagging mechanism that indicates to the server(s) 802 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, or the like can be used to trigger or identify users of a peer-to-peer payment process.

In some examples, the peer-to-peer payment process can be initiated through instances of the payment application 818 executing on the user devices 806. In at least some embodiments, the peer-to-peer process can be implemented within a landing page associated with a user or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/$Cash.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, or any other types of messages. In some examples, the content provider can be the service provider as described with reference to FIG. 8 or a third-party service provider associated with the server(s) 810. In examples where the content provider is a third-party service provider, the server(s) 810 can be accessible via one or more APIs or other integrations. The forum can be employed by a content provider to enable users of the forum to interact with one another (e.g., through creating messages, posting comments, etc.). In some examples, "forum" may also refer to an application or webpage of an e-commerce or retail organization that offers products or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider referenced in FIG. 8. For instance, the service provider can offer messaging services that provides a communication service to users via a messaging application (e.g., chat or messaging capability).

The messaging application can include, for example, a text messaging application for communication between phones (e.g., conventional mobile telephones or smartphones), or a cross-platform instant messaging application for smartphones and phones that use the Internet for communication. The messaging application can be executed on a user device 806 (e.g., mobile device or conventional personal computer (PC)) based on instructions transmitted to and from the server(s) 802 (which, in such an example can be called a "messaging server"). In some instances, the messaging application can include a payment application with messaging capability that enables users of the payment application to communicate with one another. In such instances, the payment application can be executed on a user device 806 based on instructions transmitted to and from the server(s) 802 (e.g., the payment service discussed in this description or another payment service that supports payment transactions). In some examples, the messaging application can be provided by a third-party service provider associated with the server(s) 810. In examples where the messaging application is a third-party service provider, the server(s) 810 can be accessible via one or more APIs or other integrations.

As described above, the service provider can facilitate peer-to-peer transactions, which can enable users 806 to transfer fiat currency, non-fiat currency, cryptocurrency, securities, or other assets, or portions thereof, to other users 806. In at least one example, individual users can be associated with user accounts. Additional details associated with user accounts and the transfer of assets between users 806 are described below with reference to FIG. 9.

Furthermore, the service provider of FIG. 8 can enable users 806 to perform banking transactions via instances of the payment application 818. For example, users can configure direct deposits or other deposits for adding assets to their various ledgers/balances. Further, users 806 can configure bill pay, recurring payments, or the like using assets associated with their accounts. In addition to sending or receiving assets via peer-to-peer transactions, users 806 buy or sell assets via asset networks such as cryptocurrency networks, securities networks, or the like.

FIG. 9 is example data store(s) 900 that can be associated with the server(s) 802. In at least one example, the data store(s) 900 can store assets in an asset storage 902, as well as data in user account(s) 904, seller account(s) 906, or buyer account(s) 908. In at least one example, the asset storage 902 can be used to store assets managed by the service provider of FIG. 8. In at least one example, the asset storage 902 can be used to record whether individual of the assets are registered to users. For example, the asset storage 902 can include an asset wallet 910 for storing records of assets owned by the service provider of FIG. 8, such as cryptocurrency, securities, or the like, and communicating with one or more asset networks, such as cryptocurrency networks, securities networks, or the like. In some examples, the asset network can be a first-party network or a third-party network, such as a cryptocurrency exchange or the stock market. In examples where the asset network is a third-party network, the server(s) 810 can be associated therewith. In some examples, the asset wallet 910 can communication with the asset network via one or more components associated with the server(s) 802.

The asset wallet 910 can be associated with one or more addresses and can vary addresses used to acquire assets (e.g., from the asset network(s)) so that its holdings are represented under a variety of addresses on the asset network. In examples where the service provider of FIG. 8 has its own holdings of cryptocurrency (e.g., in the asset wallet 910), a user can acquire cryptocurrency directly from the service provider of FIG. 8. In some examples, the service provider of FIG. 8 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of asset network can be separate from any buyer-seller transaction or peer-to-peer transaction, and therefore not necessarily time-sensitive. This can enable batching transactions to reduce computational resources or costs. The service provider can provide the same or similar functionality for securities or other assets.

The asset storage 902 may contain ledgers that store records of assignments of assets to users 806. Specifically, the asset storage 902 may include asset ledger 910, fiat currency ledger 914, and other ledger(s) 916, which can be used to record transfers of assets between users 806 of the service provider or one or more third-parties (e.g., seller network(s), payment card network(s), ACH network(s), equities network(s), the asset network, securities networks, etc.). In doing so, the asset storage 902 can maintain a running balance of assets managed by the service provider of FIG. 8. The ledger(s) of the asset storage 902 can further indicate some of the running balance for each of the ledger(s) stored in the asset storage 902 is assigned or registered to one or more user account(s) 904.

In at least one example, the asset storage 902 can include transaction logs 918, which can include records of past transactions involving the service provider of FIG. 8. In at least one example, transaction data, as described herein, can be stored in association with the transaction logs 918.

In some examples, the data store(s) 900 can store a private blockchain 919. A private blockchain 919 can function to record sender addresses, recipient addresses, public keys, values of cryptocurrency transferred, or can be used to verify ownership of cryptocurrency tokens to be transferred. In some examples, the service provider of FIG. 8 can record transactions taking place within the service provider of FIG. 8 involving cryptocurrency until the number of transactions has exceeded a determined limit (e.g., number of transactions, storage space allocation, etc.). Based at least in part on determining that the limit has been reached, the service provider of FIG. 8 can publish the transactions in the private blockchain 919 to a public blockchain (e.g., associated with the asset network), where miners can verify the transactions and record the transactions to blocks on the public blockchain. In at least one example, the service provider of FIG. 8 can participate as miner(s) at least for its transactions to be posted to the public blockchain.

In at least one example, the data store(s) 900 can store or manage accounts, such as user account(s) 904, seller account(s) 906, or buyer account(s) 908. In at least one example, the user account(s) 904 may store records of user accounts associated with the users 806. In at least one example, the user account(s) 904 can include a user account 920, which can be associated with a user (of the users 806). Other user accounts of the user account(s) 904 can be similarly structured to the user account 920, according to some examples. In other examples, other user accounts may include more or less data or account information than that provided by the user account 920. In at least one example, the user account 920 can include user account data 928, which can include, but is not limited to, data associated with user identifying information (e.g., name, phone number, address, etc.), user identifier(s) (e.g., alphanumeric identifiers, etc.), user preferences (e.g., learned or user-specified), purchase history data (e.g., identifying one or more items purchased (and respective item information), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 928 can include account activity 930 and user wallet key(s) 932. The account activity 930 may include a transaction log for recording transactions associated with the user account 920. In some examples, the user wallet key(s) 932 can include a public-private key-pair and a respective address associated with the asset network or other asset networks. In some examples, the user wallet key(s) 9 3932 may include one or more key pairs, which can be unique to the asset network or other asset networks.

In addition to the user account data 928, the user account 920 can include ledger(s) for account(s) managed by the service provider of FIG. 8, for the user. For example, the user account 920 may include an asset ledger 934, a fiat currency ledger 936, or one or more other ledgers 938. The ledger(s) can indicate that a corresponding user utilizes the service provider of FIG. 8 to manage corresponding accounts (e.g., a cryptocurrency account, a securities account, a fiat currency account, etc.). It should be noted that in some examples, the ledger(s) can be logical ledger(s) and the data can be represented in a single database. In some examples, individual of the ledger(s), or portions thereof, can be maintained by the service provider of FIG. 8.

In some examples, the asset ledger 934 can store a balance for each of one or more cryptocurrencies (e.g., Bitcoin, Ethereum, Litecoin, etc.) registered to the user account 920. In at least one example, the asset ledger 934 can further record transactions of cryptocurrency assets associated with the user account 920. For example, the user account 920 can receive cryptocurrency from the asset network using the user wallet key(s) 932. In some examples, the user wallet key(s) 932 may be generated for the user upon request. User wallet key(s) 932 can be requested by the user in order to send, exchange, or otherwise control the balance of cryptocurrency held by the service provider of FIG. 8 (e.g., in the asset wallet 910) and registered to the user. In some examples, the user wallet key(s) 932 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider of FIG. 8 and the value is credited as a balance in asset ledger 934), by purchasing currency in the form associated with the account using currency in a different form (e.g., buying a value of cryptocurrency from the service provider of FIG. 8 using a value of fiat currency reflected in fiat currency ledger 206, and crediting the value of cryptocurrency in asset ledger 934), or by conducting a transaction with another user (buyer or seller) of the service provider of FIG. 8 wherein the account receives incoming currency (which can be in the form associated with the account or a different form, in which the incoming currency may be converted to the form associated with the account). In some examples, the user account data 928 can include preferences for maintaining balances of individual of the ledgers. For example, the service provider of FIG. 8 can automatically debit the fiat currency ledger 936 to increase the asset ledger 934, or another account associated with the user whenever the cryptocurrency balance (e.g., of the asset ledger 934) falls below a stated level (e.g., a threshold). Conversely, in some embodiments, the service provider of FIG. 8 can automatically credit the fiat currency ledger 936 to decrease the asset ledger 934 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party (e.g., associated with the third-party server(s)) unrelated to the service provider of FIG. 8 (i.e., an external account). In at least one example, the user can transfer all or a portion of a balance of the cryptocurrency stored in the third-party cryptocurrency wallet to the service provider of FIG. 8. Such a transaction can require the user to transfer an amount of the cryptocurrency in a message signed by user's private key to an address provided by the service provider of FIG. 8. In at least one example, the transaction can be sent to miners to bundle the transaction into a block of transactions and to verify the authenticity of the transactions in the block. Once a miner has verified the block, the block is written to a public, distributed blockchain where the service provider of FIG. 8 can then verify that the transaction has been confirmed and can credit the user's asset ledger 934 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a seller in store or online.

In some examples, a user can purchase cryptocurrency to fund their cryptocurrency account. In some examples, the user can purchase cryptocurrency through services offered by the service provider of FIG. 8. As described above, in some examples, the service provider of FIG. 8 can acquire cryptocurrency from a third-party source (e.g., associated with the third-party server(s) 118). In such examples, the asset wallet 910 can be associated with different addresses and can vary addresses used to acquire cryptocurrency so that its holdings are represented under a variety of addresses on a blockchain. When the service provider of FIG. 8 has their own holdings of cryptocurrency, users can acquire cryptocurrency directly from the service provider of FIG. 8. In some examples, the service provider of FIG. 8 can include logic for buying and selling cryptocurrency in order to maintain a desired level of cryptocurrency. The desired level can be based on a volume of transactions over a period, balances of collective user profiles cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from any buyer-seller transaction, and therefore not necessarily time-sensitive.

In examples where the service provider of FIG. 8 has its own cryptocurrency assets, cryptocurrency transferred in a transaction (e.g., data with address provided for receipt of transaction and a balance of cryptocurrency transferred in the transaction) can be stored in the asset wallet 910. In at least one example, the service provider of FIG. 8 can credit the asset ledger 934 of the user. Additionally, while the service provider of FIG. 8 recognizes that the user retains the value of the transferred cryptocurrency through crediting the asset ledger 934, any person that inspects the blockchain will see the cryptocurrency as having been transferred to the service provider of FIG. 8. In some examples, the asset wallet 910 can be associated with many different addresses.

In such examples, any person that inspects the blockchain may not easily associate all cryptocurrency stored in asset wallet 910 as belonging to the same entity. It is this presence of a private ledger that is used for real-time transactions and maintained by the service provider of FIG. 8, combined with updates to the public ledger at other times, that allows for extremely fast transactions using cryptocurrency to be achieved. In some examples, the "private ledger" can refer to the asset ledger 910, which in some examples, can utilize the private blockchain 919, as described herein. The "public ledger" can correspond to a public blockchain associated with the asset network.

In at least one example, a user's asset ledger 934, fiat currency ledger 936, or the like can be credited when conducting a transaction with another user (buyer or seller) wherein the user receives incoming currency. In some examples, a user can receive cryptocurrency in the form of payment for a transaction with another user. In at least one example, such cryptocurrency can be used to fund the asset ledger 934. In some examples, a user can receive fiat currency or another currency in the form of payment for a transaction with another user. In at least one example, at least a portion of such funds can be converted into cryptocurrency by the service provider of FIG. 8 and used to fund the asset ledger 934 of the user.

As addressed above, in some examples, users can also have other accounts maintained by the service provider of FIG. 8. For example, a user can also have an account in U.S. dollars, which can be tracked, for example, via the fiat currency ledger 936. Such an account can be funded by transferring money from a bank account at a third-party bank to an account maintained by the service provider of FIG. 8 as is conventionally known. In some examples, a user can receive fiat currency in the form of payment for a transaction with another user. In such examples, at least a portion of such funds can be used to fund the fiat currency ledger 936.

In some examples, a user can have one or more internal payment cards registered with the service provider of FIG. 8. Internal payment cards can be linked to one or more of the accounts associated with the user account 920. In some embodiments, options with respect to internal payment cards can be adjusted and managed using an application (e.g., the payment application 818).

In at least one example, as described above, each ledger can correspond to an account of the user that is managed by the service provider of FIG. 8. In at least one example, individual of the accounts can be associated with a wallet or a stored balance for use in payment transactions, peer-to-peer transactions, payroll payments, etc.

In at least one example, the user account 920 can be associated with an asset wallet 940. The asset wallet 940 of the user can be associated with account information that can be stored in the user account data 928 and, in some examples, can be associated with the user wallet key(s) 932. In at least one example, the asset wallet 940 can store data indicating an address provided for receipt of a cryptocurrency transaction. In at least one example, the balance of the asset wallet 940 can be based at least in part on a balance of the asset ledger 934. In at least one example, funds availed via the asset wallet 940 can be stored in the asset wallet 940 or the asset wallet 910. Funds availed via the asset wallet 910 can be tracked via the asset ledger 934. The asset wallet 940, however, can be associated with additional cryptocurrency funds.

In at least one example, when the service provider of FIG. 8 includes a private blockchain 919 for recording and validating cryptocurrency transactions, the asset wallet 940 can be used instead of, or in addition to, the asset ledger 934. For example, at least one example, a seller can provide the address of the asset wallet 940 for receiving payments. In an example where a buyer is paying in cryptocurrency and the buyer has their own cryptocurrency wallet account associated with the service provider of FIG. 8, the buyer can send a message signed by its private key including its wallet address (i.e., of the buyer) and identifying the cryptocurrency and value to be transferred to the seller's asset wallet 940. The service provider of FIG. 8 can complete the transaction by reducing the cryptocurrency balance in the buyer's cryptocurrency wallet and increasing the cryptocurrency balance in the seller's asset wallet 940. In addition to recording the transaction in the respective cryptocurrency wallets, the transaction can be recorded in the private blockchain 919 and the transaction can be confirmed. A user can perform a similar transaction with cryptocurrency in a peer-to-peer transaction as described above. In at least one example, the cryptocurrency wallet account 930 can be funded by a balance transfer from a third-party cryptocurrency wallet, as described above. Such a transaction can require a user to transfer an amount of cryptocurrency in a message signed by the user's private key to an address of the cryptocurrency wallet account 930. The transferred amount of cryptocurrency can then be within the cryptocurrency wallet account 930 for use in later transactions.

While the asset ledger 934 or asset wallet 940 are each described above with reference to cryptocurrency, the asset ledger 934 or asset wallet 940 can alternatively be used in association with securities. In some examples, different ledgers or wallets can be used for different types of assets. That is, in some examples, a user can have multiple asset ledgers or asset wallets for tracking cryptocurrency, securities, or the like.

It should be noted that user(s) having accounts managed by the service provider of FIG. 8 is an aspect of the technology disclosed that enables technical advantages of increased processing speed and improved security.

Figure 10:
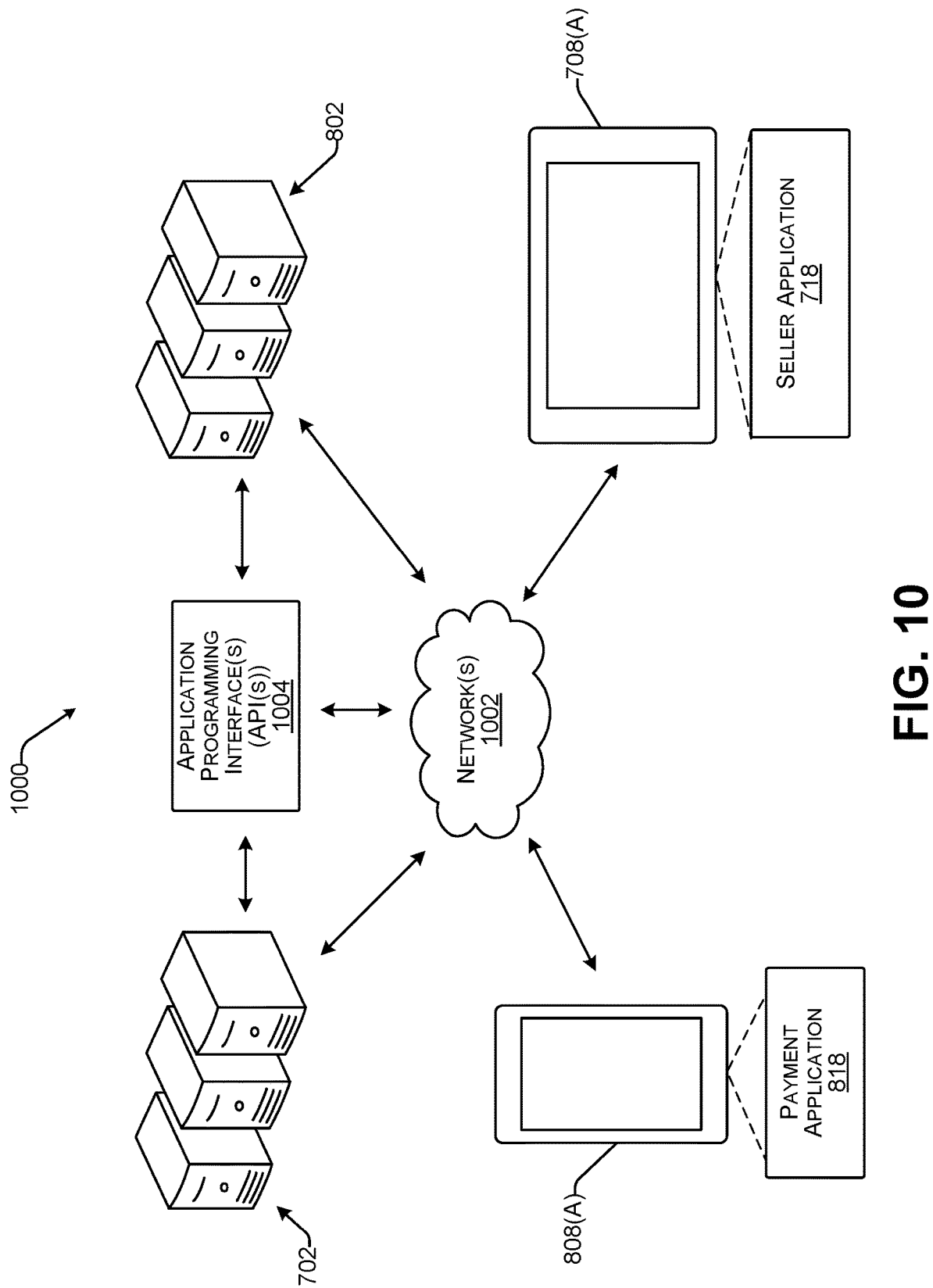
FIG. 10 is an example environment where the environments of FIGS. 7 and 8 can be integrated to enable payments at the point-of-sale using assets associated with user accounts in the peer-to-peer environment of FIG. 8, according to an embodiment of the present subject matter.

FIG. 10 is an example environment 1000 wherein the environment 700 and the environment 800 can be integrated to enable payments at the point-of-sale using assets associated with user accounts in the peer-to-peer environment of FIG. 8. As illustrated, each of the components can communicate with one another via one or more networks 1002. In some examples, one or more APIs 1004 or other functional components can be used to facilitate such communication. In each described instance, the techniques for initiating and consummating BNPL and other types of loans may be implemented in the environment 1000 using the payment application 818 or the seller application 718.

In at least one example, the example environment 1000 can enable contactless payments, via integration of peer-to-peer payment, or other payment making, platform(s) and payment processing platform(s), are described herein. For the purpose of FIG. 10, the environment 700 can refer to a payment processing platform and the environment 800 can refer to a peer-to-peer payment, or payment making, platform. In an example, such an integration can enable a buyer to participate in a transaction via their own computing device instead of interacting with a seller device of a seller, such as the seller device 708(A) In such an example, the seller application 718, associated with a payment processing platform and executable by the seller device 708(A) of the seller, can present a Quick Response (QR) code, or other code that can be used to identify a transaction (e.g., a transaction code), in association with a transaction between the buyer and the seller. The QR code, or other transaction code, can be provided to the seller application 718 via an API associated with the peer-to-peer payment platform. In an example, the buyer can utilize their own computing device, such as the user device 808(A), to capture the QR code, or the other transaction code, and to provide an indication of the captured QR code, or other transaction code, to server(s) 702 or server(s) 802.

In some instances, scanning of the QR code can be used to initiate a BNPL loan or lending query, using the techniques described above. For instance, upon a user scanning a QR code associated with a transaction and/or with a seller, the servers 702 or the servers 802 may initiate a sequence of operations for enabling the user to request that a BNPL loan be provided to allow the user to pay for an item from a seller, to allow the user to acquire a BNPL loan for one or more items previously purchased by the user (e.g., a BNPL loan for a bundle of items), or the like.

Based at least in part on the integration of the peer-to-peer payment platform and the payment processing platform (e.g., via the API), the server(s) 702 or 802 associated with each can exchange communications with each other and with a payment application 818 associated with the peer-to-peer payment platform or the seller application 718 to process payment for the transaction using a peer-to-peer payment where the buyer is a first "peer" and the seller is a second "peer." In at least one example, the peer-to-peer payment platform can transfer funds from an account of the buyer, maintained by the peer-to-peer payment platform, to an account of the seller, maintained by the payment processing platform, thereby facilitating a contactless (peer-to-peer) payment for the transaction. That is, based at least in part on receiving an indication of which payment method a user (e.g., buyer or seller) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, buyer details, or the like to a computing device of the buyer, such as the user device 808(A), to enable a contactless (peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable buyers to "scan to pay," by using their computing devices to scan QR codes, or other transaction codes, encoded with data as described herein, to remit payments for transactions. In such a "scan to pay" example, a buyer computing device, such as the user device 808(A), can be specially configured as a buyer-facing device that can enable the buyer to view cart building in near real-time, interact with a transaction during cart building using the buyer computing device, authorize payment via the buyer computing device, apply coupons or other incentives via the buyer computing device, add gratuity, loyalty information, feedback, or the like via the buyer computing device, etc. In another example, sellers can "scan for payment" such that a buyer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the seller application 718 and the payment application 818, as described herein, can process a payment transaction by routing information input via the seller application to the payment application for completing a "frictionless" payment. This can be referred to as "in-application payment," In another example of "in-application payment," the payment application described herein can be created or modified via a software developer kit (SDK) to enable in-application payment.

Returning to the "scan to pay" examples described herein, QR codes, or other transaction codes, can be presented in association with a seller web page or ecommerce web page. In at least one example, techniques described herein can enable buyers to "scan to pay," by using their computing devices to scan or otherwise capture QR codes, or other transaction codes, encoded with data, as described herein, to remit payments for online/ecommerce transactions. In such a "scan to pay" example, a buyer computing device, such as the user device 808(A), can be specially configured as a buyer-facing device that can enable the buyer to view cart building in near real-time, interact with a transaction during cart building using the buyer computing device, authorize payment via the buyer computing device, apply coupons or other incentives via the buyer computing device, add gratuity, loyalty information, feedback, or the like via the buyer computing device, etc.

In an example, a buyer can desire to purchase items from a seller. When the buyer approaches the seller to check out, the seller (e.g., a worker associated therewith) can add indications of the items to a virtual cart via the seller application 718, associated with a payment processing platform, on the seller device 708(A). In an example, the seller can use the payment processing platform to process payments, and the payment processing platform can process payments for the seller, as well as other sellers. That is, the payment processing platform can be an aggregator. After adding the first item, or otherwise providing an indication to start a transaction, a display of the seller device 708(A) can present a QR code, or other transaction code, that can be associated with a peer-to-peer payment platform. The buyer can use a camera associated with the user device 808(A) to scan, or otherwise capture, the QR code. If the buyer is already associated with the peer-to-peer payment platform (e.g., has an existing account, previously onboarded, etc.), the peer-to-peer platform can provide an indication of the scanned QR code to the payment processing platform. This interaction—between the buyer computing device and the QR code—can trigger communications between the peer-to-peer payment platform and the payment processing platform (e.g., via an API) to facilitate a transfer of funds from a stored balance of the buyer, that is managed or maintained by the peer-to-peer payment platform, to a stored balance of the seller, that is managed or maintained by the payment processing platform. As such, the buyer can use such funds for contactless payment of the transaction. Such a payment can be structured as a peer-to-peer payment wherein the buyer is the first "peer" and the payment processing platform is the second "peer." The payment processing platform can deposit funds received from the peer-to-peer payment platform in an account of the seller to settle the transaction on behalf of the seller. In some examples, the payment processing platform can deposit funds into an account of the seller to settle the transaction prior to receiving funds from the peer-to-peer payment platform.

As an additional or alternative example, a buyer can desire to purchase items from a seller. When the buyer approaches the seller to check out, the seller (e.g., a worker associated therewith) can add indications of the items to a virtual cart via the seller application 718, associated with a payment processing platform, on the seller device 708(A). In an example, the seller can use the payment processing platform to process payments, and the payment processing platform can process payments for the seller, as well as other sellers. That is, the payment processing platform can be an aggregator. After adding the first item, or otherwise providing an indication to start a transaction, the seller application 718 can cause a text message with a resource locator (e.g., uniform resource locator (URL)) that can be associated with a peer-to-peer payment platform to be sent to the user device 808(A). The buyer can interact with the resource locator and, if the buyer is already associated with the peer-to-peer payment platform (e.g., has an existing account, previously onboarded, etc.), the peer-to-peer payment platform can provide an indication of the interaction with the resource locator to the payment processing platform. This interaction—between the buyer and the resource locator presented via the buyer computing device—can trigger communications between the peer-to-peer payment platform and the payment processing platform (e.g., via an API) to facilitate a transfer of funds from a stored balance of the buyer, that is managed or maintained by the peer-to-peer payment platform, to a stored balance of the seller, that is managed or maintained by the payment processing platform. As such, the buyer can use such funds for contactless payment of the transaction. As described above, such a payment can be structured as a peer-to-peer payment wherein the buyer is the first "peer" and the payment processing platform is the second "peer." The payment processing platform can deposit funds received from the peer-to-peer payment platform in an account of the seller to settle the transaction on behalf of the seller. In some examples, the payment processing platform can deposit funds into an account of the seller to settle the transaction prior to receiving funds from the peer-to-peer payment platform.

The same or similar techniques can be applicable in online or ecommerce selling channels as well. In such an example, a QR code, or other transaction code, can be presented via an online store/ecommerce web page of a seller. The buyer can use a camera associated with a buyer computing device, such as the user device 808(A), to scan, or otherwise capture, the QR code. If the buyer is already associated with the peer-to-peer payment platform (e.g., has an existing account, previously onboarded, etc.), the peer-to-peer platform can provide an indication of the scanned QR code to the payment processing platform. This interaction—between the buyer computing device and the QR code—can trigger communications between the peer-to-peer payment platform and the payment processing platform (e.g., via an API) to facilitate a transfer of funds from a stored balance of the buyer, that is managed or maintained by the peer-to-peer payment platform, to a stored balance of the seller, that is managed or maintained by the payment processing platform. As such, the buyer can use such funds for contactless payment of the transaction. Such a payment can be structured as a peer-to-peer payment wherein the buyer is the first "peer" and the payment processing platform is the second "peer," The payment processing platform can deposit funds received from the peer-to-peer payment platform in an account of the seller to settle the transaction on behalf of the seller. In some examples, the payment processing platform can deposit funds into an account of the seller to settle the transaction prior to receiving funds from the peer-to-peer payment platform.

As described above, techniques described herein offer improvements to conventional payment technologies. In an example, techniques described herein can enable transaction data to be sent from a seller application 718 of a seller device 708(A) at a brick-and-mortar store of a seller to a payment application 818 of a user device 808(A) of a buyer to enable the buyer to participate in a transaction via their own computing device. For instance, in a "scan to pay" example as described above, based at least in part on capturing the QR code, or other transaction code, via the user device 808(A), the payment processing platform can provide transaction data to the peer-to-peer payment platform for presentation via the payment application 818 on the user device 808(A). In some examples, the buyer can watch items being added to their cart (e.g., via a user interface presented via the payment application). As an item is added to a virtual cart by the seller—via the seller application 718 on the seller device 708(A) of the seller—the buyer can see the item in their virtual cart on their own computing device in near-real time. In another example, the peer-to-peer payment platform can analyze transaction data as it is received to determine whether an incentive (e.g., a discount, a loyalty reward, prioritized access or booking, etc.) is applicable to the transaction and can automatically apply the incentive or send a recommendation to the payment application 818 for presentation via a user interface associated therewith. In addition to enabling a buyer to participate in a transaction during cart building, techniques described herein can enable a buyer to complete a transaction, and in some examples, provide gratuity (i.e., a tip), feedback, loyalty information, or the like, via the user device 808(A) during or after payment of the transaction.

In some examples, based at least in part on capturing the QR code, or other transaction code, the payment processing platform can provide transaction data to the peer-to-peer payment platform for presentation via the payment application 818 on the computing device of the buyer, such as the user device 808(A), to enable the buyer to complete the transaction via their own computing device. In some examples, in response to receiving an indication that the QR code, or other transaction code, has been captured or otherwise interacted with via the buyer computing device, the peer-to-peer payment platform can determine that the buyer authorizes payment of the transaction using funds associated with a stored balance of the buyer that is managed or maintained by the peer-to-peer payment platform. Such authorization can be implicit such that the interaction with the transaction code can imply authorization of the buyer. In some examples, in response to receiving an indication that the QR code, or other transaction code, has been captured or otherwise interacted with via the buyer computing device, the peer-to-peer payment platform can request authorization to process payment for the transaction using the funds associated with the stored balance and the buyer can interact with the payment application to authorize the settlement of the transaction. A response to such a request can provide an express authorization of the buyer. In some examples, such an authorization (implicit or express) can be provided prior to a transaction being complete or initialization of a conventional payment flow. That is, in some examples, such an authorization can be provided during cart building (e.g., adding item(s) to a virtual cart) or prior to payment selection. In some examples, such an authorization can be provided after payment is complete (e.g., via another payment instrument). Based at least in part on receiving an authorization to use funds associated with the stored balance (e.g., implicitly or explicitly) of the buyer, the peer-to-peer payment platform can transfer funds from the stored balance of the buyer to the payment processing platform. In at least one example, the payment processing platform can deposit the funds, or a portion thereof, into a stored balance of the seller that is managed or maintained by the payment processing platform. That is, techniques described herein enable the peer-to-peer payment platform to transfer funds to the payment processing platform to settle payment of the transaction. In such an example, the payment processing platform can be a "peer" to the buyer in a peer-to-peer transaction.

In some examples, techniques described herein can enable the buyer to interact with the transaction after payment for the transaction has been settled. For example, in at least one example, the payment processing platform can cause a total amount of a transaction to be presented via a user interface associated with the payment application 818 such that the buyer can provide gratuity, feedback, loyalty information, or the like, via an interaction with the user interface. In some examples, because the buyer has already authorized payment via the peer-to-peer payment platform, if the buyer inputs a tip, the peer-to-peer payment platform can transfer additional funds, associated with the tip, to the payment processing platform. This pre-authorization (or maintained authorization) of sorts can enable faster, more efficient payment processing when the tip is received. Further, the buyer can provide feedback or loyalty information via the user interface presented by the payment application, which can be associated with the transaction.

As described above—and also below—techniques described herein enable contactless payments. That is, by integrating the payment processing platform with the peer-to-peer payment platform, sellers and buyers can participate in transactions via their own computing devices without needing to touch, or otherwise be in contact, with one another. By moving aspects of a transaction that are traditionally performed on a computing device of a seller to a computing device of a buyer, buyers can have more control over the transaction and can have more privacy. That is, buyers can monitor items that are added to their cart to ensure accuracy. Further, buyers can authorize payments, use rewards, claim incentives, add gratuity, or the like without being watched by the seller or other buyers.

In some examples, such as when the QR code, or other transaction code, is captured by the computing device of the buyer prior to a payment selection user interface being presented via the seller application 718, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in some examples, when a buyer adds a tip after payment for a transaction has been settled, in some examples, because the peer-to-peer payment platform has already been authorized, the peer-to-peer payment platform and the payment processing platform may not need to obtain another authorization to settle funds associated with the tip. That is, in such examples, fewer data transmissions are required and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 818 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a buyer can swipe a payment instrument (e.g., a credit card, a debit card, or the like) via a reader device associated with a seller device, dip a payment instrument into a reader device associated with a seller computing device, tap a payment instrument with a reader device associated with a seller computing device, or the like, to initiate the provisioning of transaction data to the buyer computing device. For example, based at least in part on detecting a dip, tap, swipe, or the like, the payment processing platform can associate a buyer with a transaction and provide at least a portion of transaction data associated with the transaction to a buyer computing device associated therewith. In some examples, the payment instrument can be associated with the peer-to-peer payment platform as described herein a debit card linked to a stored balance of a buyer) such that when the payment instrument is caused to interact with a payment reader, the payment processing platform can exchange communications with the peer-to-peer payment platform to authorize payment for a transaction or provision associated transaction data to a computing device of the buyer associated with the transaction.

Figure 11:
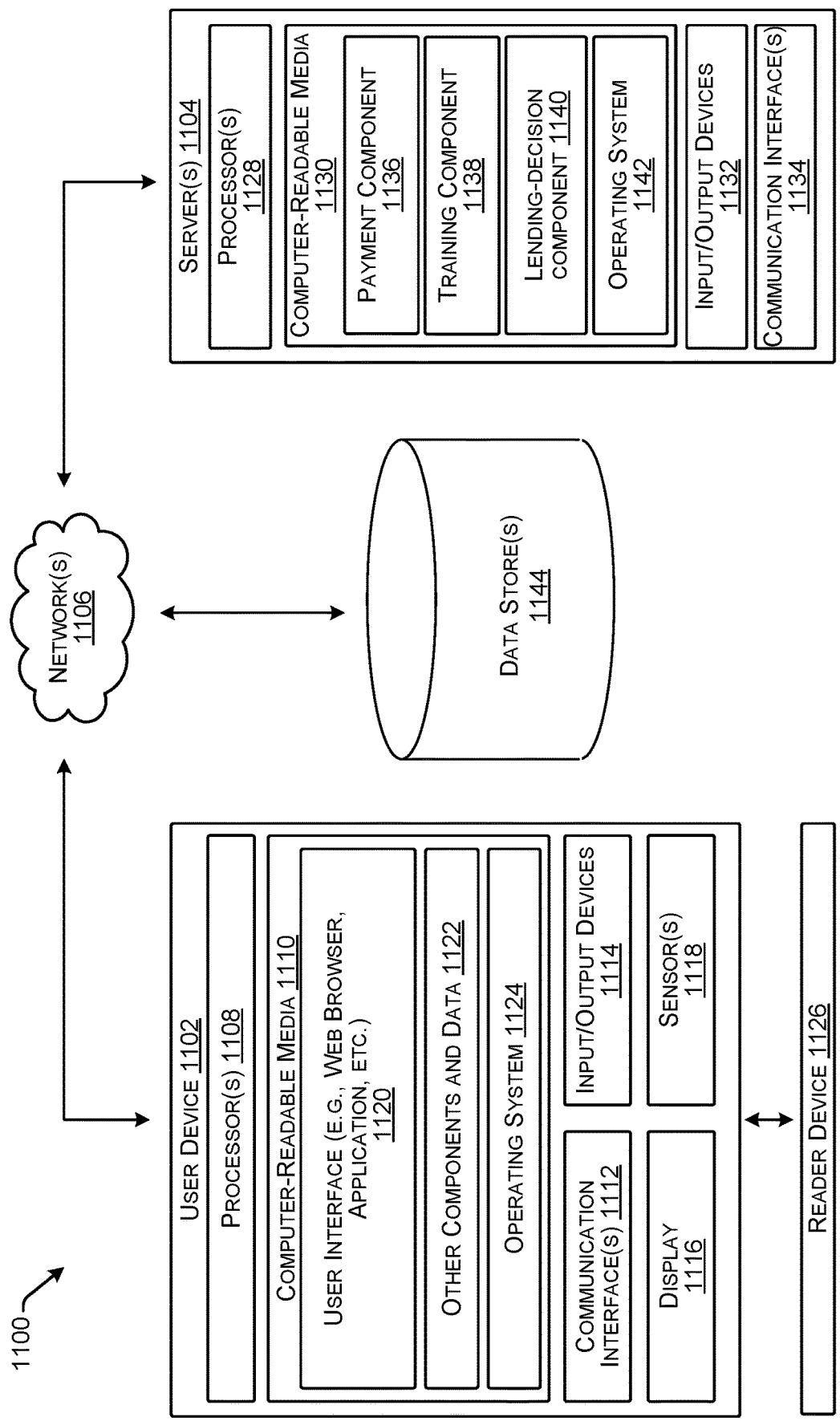
FIG. 11 provides additional details associated with individual components of the ecosystem(s) described above, according to an embodiment of the present subject matter.

FIG. 11 depicts an illustrative block diagram illustrating a system 1100 for performing techniques described herein. The system 1100 includes a user device 1102, that communicates with server computing device(s) (e.g., server(s) 1104) via network(s) 1106 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1102 is illustrated, in additional or alternate examples, the system 1100 can have multiple user devices, as described above with reference to FIG. 6.

In at least one example, the user device 1102 can be any suitable type of computing device, e.g., portable, semi-portable, semi-stationary, or stationary. Some examples of the user device 1102 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1102 can be any computing device capable of sending communications and performing the functions according to the techniques described herein. The user device 1102 can include devices, e.g., payment card readers, or components capable of accepting payments, as described below.

In the illustrated example, the user device 1102 includes one or more processors 1108, one or more computer-readable media 1110, one or more communication interface(s) 1112, one or more input/output (I/O) devices 1114, a display 1116, and sensor(s) 1118.

In at least one example, each processor 1108 can itself comprise one or more processors or processing cores. For example, the processor(s) 1108 can be implemented as one or more microprocessors, microcomputers, microcontrollers, digital signal processors, central processing units, state machines, logic circuitries, or any devices that manipulate signals based on operational instructions. In some examples, the processor(s) 1108 can be one or more hardware processors or logic circuits of any suitable type specifically programmed or configured to execute the algorithms and processes described herein. The processor(s) 1108 can be configured to fetch and execute computer-readable processor-executable instructions stored in the computer-readable media 1110.

Depending on the configuration of the user device 1102, the computer-readable media 1110 can be an example of tangible non-transitory computer storage media and can include volatile and nonvolatile memory or removable and non-removable media implemented in any type of technology for storage of information such as computer-readable processor-executable instructions, data structures, program components or other data. The computer-readable media 1110 can include, but is not limited to, RAM, ROM, EEPROM, flash memory, solid-state storage, magnetic disk storage, optical storage, or other computer-readable media technology. Further, in some examples, the user device 1102 can access external storage, such as RAID storage systems, storage arrays, network attached storage, storage area networks, cloud storage, or any other medium that can be used to store information and that can be accessed by the processor(s) 1108 directly or through another computing device or network. Accordingly, the computer-readable media 1110 can be computer storage media able to store instructions, components or components that can be executed by the processor(s) 1108. Further, when mentioned, non-transitory computer-readable media exclude media such as energy, carrier signals, electromagnetic waves, and signals per se.

The computer-readable media 1110 can be used to store and maintain any number of functional components that are executable by the processor(s) 1108. In some implementations, these functional components comprise instructions or programs that are executable by the processor(s) 1108 and that, when executed, implement operational logic for performing the actions and services attributed above to the user device 1102. Functional components stored in the computer-readable media 1110 can include a user interface 1120 to enable users to interact with the user device 1102, and thus the server(s) 1104 or other networked devices. In at least one example, the user interface 1120 can be presented via a web browser, or the like. In other examples, the user interface 1120 can be presented via an application, such as a payment application or desktop application, which can be provided by a service provider associated with the server(s) 1104, or which can be an otherwise dedicated application. In some examples, the user interface 1120 can be the interfaces described above, such as the GUIs 302, 402, or the like. In at least one example, a user can interact with the user interface via touch input, spoken input, gesture, or any other type of input. The word "input" is also used to describe "contextual" input that may not be directly provided by the user via the user interface 1120. For example, user's interactions with the user interface 1120 are analyzed using, e.g., natural language processing techniques, to determine context or intent of the user, which may be treated in a manner similar to "direct" user input.

Depending on the type of the user device 1102, the computer-readable media 1110 can also optionally include other functional components and data, such as other components and data 1122, which can include programs, drivers, etc., and the data used or generated by the functional components. In addition, the computer-readable media 1110 can also store data, data structures and the like, that are used by the functional components. Further, the user device 1102 can include many other logical, programmatic and physical components, of which those described are merely examples that are related to the discussion herein.

In at least one example, the computer-readable media 1110 can include additional functional components, such as an operating system 1124 for controlling and managing various functions of the user device 1102 and for enabling basic user interactions.

The communication interface(s) 1112 can include one or more interfaces and hardware components for enabling communication with various other devices, such as over the network(s) 1106 or directly. For example, communication interface(s) 1112 can enable communication through one or more network(s) 1106, which can include, but are not limited any type of network known in the art, such as a local area network or a wide area network, such as the Internet, and can include a wireless network, such as a cellular network, a cloud network, a local wireless network, such as Wi-Fi or close-range wireless communications, such as Bluetooth®, BLE, NFC, RFID, a wired network, or any other such network, or any combination thereof. Accordingly, network(s) 1106 can include both wired or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1102 can further include one or more input/output (I/O) devices 1114. The I/O devices 1114 can include speakers, a microphone, a camera, and various user controls (e.g., buttons, a joystick, a keyboard, a keypad, etc.), a haptic output device, and so forth. The I/O devices 1114 can also include attachments that leverage the accessories (audio-jack, USB-C, Bluetooth, etc.) to connect with the user device 1102.

In at least one example, user device 1102 can include a display 1116. Depending on the type of computing device(s) used as the user device 1102, the display 1116 can employ any suitable display technology. For example, the display 1116 can be a liquid crystal display, a plasma display, a light emitting diode display, an OLED (organic light-emitting diode) display, an electronic paper display, or any other suitable type of display able to present digital content thereon. In at least one example, the display 1116 can be an augmented reality display, a virtually reality display, or any other display able to present or project digital content. In some examples, the display 1116 can have a touch sensor associated with the display 1116 to provide a touchscreen display configured to receive touch inputs for enabling interaction with a graphic interface presented on the display 1116. Accordingly, implementations herein are not limited to any particular display technology. Alternatively, in some examples, the user device 1102 may not include the display 1116, and information can be presented by other means, such as aurally, haptically, etc.

In addition, the user device 1102 can include sensor(s) 1118. The sensor(s) 1118 can include a GPS device able to indicate location information. Further, the sensor(s) 1118 can include, but are not limited to, an accelerometer, gyroscope, compass, proximity sensor, camera, microphone, or a switch.

In some example, the GPS device can be used to identify a location of a user. In at least one example, the location of the user can be used by the service provider, described above, to provide one or more services. That is, in some examples, the service provider can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users or for sending users notifications regarding available appointments with seller(s) located proximate to the users. In at least one example, location can be used for taking payments from nearby buyers when they leave a geofence, or location can be used to initiate an action responsive to users enter a brick-and-mortar store of a seller. Location can be used in additional or alternative ways as well.

Additionally, the user device 1102 can include various other components that are not shown, examples of which include removable storage, a power source, such as a battery and power control unit, a barcode scanner, a printer, a cash drawer, and so forth.

In addition, in some examples, the user device 1102 can include, be connectable to, or otherwise be coupled to a reader device 1126, for reading payment instruments or identifiers associated with payment objects. In some examples, as described above, the reader device 1126 can plug in to a port in the user device 1102, such as a microphone port, a headphone port, an audio-jack, a data port, or other suitable port. In additional or alternative examples, the reader device 1126 can be coupled to the user device 1102 via another wired or wireless connection, such as via a Bluetooth®, BLE, and so on. The reader device 1126 can include a read head for reading a magnetic strip of a payment card, and further can include encryption technology for encrypting the information read from the magnetic strip. Additionally or alternatively, the reader device 1126 can be an EMV payment reader, which in some examples, can be embedded in the user device 1102. Moreover, numerous other types of readers can be employed with the user device 1102 herein, depending on the type and configuration of the user device 1102.

The reader device 1126 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1126 may include hardware implementation, such as slots, magnetic tracks, and rails with one or more sensors or electrical contacts to facilitate detection and acceptance of a payment instrument. That is, the reader device 1126 may include hardware implementations to enable the reader device 1126 to interact with a payment instrument via a swipe (i.e., a card-present transaction where a buyer slides a card having a magnetic strip through a payment reader that captures payment data contained in the magnetic strip), a dip (i.e., a card-present transaction where a buyer inserts a card having an embedded microchip (i.e., chip) into a payment reader first until the payment reader prompts the buyer to remove the card), or a tap (i.e., a card-present transaction where a buyer may tap or hover his or her electronic device such as a smart phone running a payment application over a payment reader to complete a transaction via short-range communication) to obtain payment data associated with a buyer. Additionally or optionally, the reader device 1126 may also include a biometric sensor to receive and process biometric characteristics and process them as payment instruments, given that such biometric characteristics are registered with the payment service system 100 and connected to a financial account with a bank server.

The reader device 1126 may include processing unit(s), computer-readable media, a reader chip, a transaction chip, a timer, a clock, a network interface, a power supply, and so on. The processing unit(s) of the reader device 1126 may execute one or more components or processes to cause the reader device 1126 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, or one or more operating systems. Depending on the exact configuration and type of the reader device 1126, the computer-readable media may include volatile memory (such as RAM), non-volatile memory (such as ROM, flash memory, miniature hard drive, memory card, or the like), or some combination thereof. In at least one example, the computer-readable media of the reader device 1126 may include at least one component for performing various functions as described herein.

The reader chip may perform functionalities to control the operations and processing of the reader device 1126. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock 1112, which may provide a clock signal indicating a time. Furthermore, the reader chip may perform functionality to control the network interface, which may interface with the network(s) 1106, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1126. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the buyer, an address of the buyer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the buyer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1102, which can be a POS terminal, and the reader device 1126 are shown as separate devices, in additional or alternative examples, the user device 1102 and the reader device 1126 can be part of a single device, which may be a battery-operated device. In such an example, components of both the user device 1102 and the reader device 1126 may be associated with the single device. In some examples, the reader device 1126 can have a display integrated therewith, which can be in addition to (or as an alternative of) the display 1116 associated with the user device 1102.

The server(s) 1104 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1104 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1104 can be located together or separately, and organized, for example, as virtual servers, server banks or server farms. The described functionality can be provided by the servers of a single seller or enterprise, or can be provided by the servers or services of multiple different buyers or enterprises.

In the illustrated example, the server(s) 1104 can include one or more processors 1128, one or more computer-readable media 1130, one or more I/O devices 1132, and one or more communication interfaces 1134. Each processor 1128 can be a single processing unit or a number of processing units, and can include single or multiple computing units or multiple processing cores. The processor(s) 1128 can be implemented as one or more microprocessors, microcomputers, microcontrollers, digital signal processors, central processing units, state machines, logic circuitries, or any devices that manipulate signals based on operational instructions. For example, the processor(s) 1128 can be one or more hardware processors or logic circuits of any suitable type specifically programmed or configured to execute the algorithms and processes described herein. The processor(s) 1128 can be configured to fetch and execute computer-readable instructions stored in the computer-readable media 1130, which can program the processor(s) 1128 to perform the functions described herein.

The computer-readable media 1130 can include volatile and nonvolatile memory or removable and non-removable media implemented in any type of technology for storage of information, such as computer-readable instructions, data structures, program components, or other data. Such computer-readable media 1130 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1104, the computer-readable media 1130 can be a type of computer-readable storage media or can be a tangible non-transitory media to the extent that when mentioned, non-transitory computer-readable media exclude media such as energy, carrier signals, electromagnetic waves, and signals per se.

The computer-readable media 1130 can be used to store any number of functional components that are executable by the processor(s) 1128. In many implementations, these functional components comprise instructions or programs that are executable by the processors 1128 and that, when executed, specifically configure the one or more processors 1128 to perform the actions attributed above to the service provider or payment processing service. Functional components stored in the computer-readable media 1130 can optionally include a payment component 1136, a training component 1138, a lending-decision component 1140, and one or more other components and data. The payment component 1136, the training component 1138, and the lending-decision component 1140 may correspond, respectively, to the components 118, 120, and 122 described above.

The seller component 1136 can be configured to receive transaction data from POS systems, such as the POS system 624 described above with reference to FIG. 6. The seller component 1136 can transmit requests (e.g., authorization, capture, settlement, etc.) to payment service server computing device(s) to facilitate POS transactions between sellers and buyers. The seller component 1136 can communicate the successes or failures of the POS transactions to the POS systems.

The training component 1138 can be configured to train models using machine-learning mechanisms. For example, a machine-learning mechanism can analyze training data to train a data model that generates an output, which can be a recommendation, a score, or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1102 or the server(s) 1104 for use at a time after the data models have been trained (e.g., at runtime).

The one or more other components and data can include programs, drivers, etc., and the data used or generated by the functional components. Further, the server(s) 1104 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality or avail service provider services in association with their own third-party applications. Additionally or alternatively, in some examples, the service provider can utilize a SDK to integrate third-party service provider functionality into its applications. That is, API(s) or SDK(s) can enable third-party developers to customize how their respective third-party applications interact with the service provider or vice versa.

The computer-readable media 1130 can additionally include an operating system 1142 for controlling and managing various functions of the server(s) 1104.

The communication interface(s) 1134 can include one or more interfaces and hardware components for enabling communication with various other devices, such as over the network(s) 1106 or directly. For example, communication interface(s) 1134 can enable communication through one or more network(s) 1106, which can include, but are not limited any type of network known in the art, such as a local area network or a wide area network, such as the Internet, and can include a wireless network, such as a cellular network, a local wireless network, such as Wi-Fi or close-range wireless communications, such as Bluetooth®, BLE, NFC, RFID, a wired network, or any other such network, or any combination thereof. Accordingly, network(s) 1102 can include both wired or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1104 can further be equipped with various I/O devices 1132. Such I/O devices 1132 can include a display, various user interface controls (e.g., buttons, joystick, keyboard, mouse, touch screen, biometric or sensory input devices, etc.), audio speakers, connection ports and so forth.

In at least one example, the system 1100 can include a datastore 1144 that can be configured to store data that is accessible, manageable, and updatable. In some examples, the datastore 1144 can be integrated with the user device 1102 or the server(s) 1104. In other examples, as shown in FIG. 11, the datastore 1144 can be located remotely from the server(s) 1104 and can be accessible to the server(s) 1104. The datastore 1144 can comprise multiple databases or servers connected locally or remotely via the network(s) 1106.

In at least one example, the datastore 1144 can store user profiles, which can include seller profiles, buyer profiles, and so on.

Seller profiles can store, or otherwise be associated with, data associated with sellers. For instance, a seller profile can store, or otherwise be associated with, information about a seller (e.g., name of the seller, geographic location of the seller, operating hours of the seller, employee information, etc.), a seller category classification (MCC), item(s) offered for sale by the seller, hardware (e.g., device type) used by the seller, transaction data associated with the seller (e.g., transactions conducted by the seller, payment data associated with the transactions, items associated with the transactions, descriptions of items associated with the transactions, itemized or total spends of each of the transactions, parties to the transactions, dates, times, or locations associated with the transactions, etc.), loan information associated with the seller (e.g., previous loans made to the seller, previous defaults on said loans, etc.), risk information associated with the seller (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, buyer service data, etc. The seller profile can securely store bank account information as provided by the seller. Further, the seller profile can store payment information associated with a payment instrument linked to a stored balance of the seller, such as a stored balance maintained in a ledger by the service provider.

Buyer profiles can store buyer data including, but not limited to, buyer information (e.g., name, phone number, address, banking information, etc.), buyer preferences (e.g., learned or buyer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, buyer service data, etc.

In at least one example, the account(s) 118, described above with reference to FIG. 1, can include or be associated with the seller profiles or buyer profiles described above.

Furthermore, in at least one example, the datastore 1144 can store inventory database(s) or catalog database(s). As described above, an inventory can store data associated with a quantity of each item that a seller has available to the seller. Furthermore, a catalog can store data associated with items that a seller has available for acquisition. The datastore 1144 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, payment applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. In some embodiments, one or more blocks of the process can be omitted entirely. Moreover, the methods can be combined in whole or in part with each other or with other methods.

EXAMPLE CLAUSES

1. A method implemented by one or more computing devices of a payment service, comprising: determining, by a training component of the one or more computing devices, signals associated with previously denied lending queries, wherein each signal is associated with a value of a risk metric and an indication of whether the signal increases or decreases a corresponding risk metric; training, by the training component and using the signals, a model to generate output signals for new lending queries, wherein each respective output signal indicates (i) that a new lending query is approved or (ii) that the new lending query is denied and a respective reason why the new lending query is denied; in response to receiving, from a payment application executing on a user device of a user of the payment service, a lending query associated with the user, applying, at a first time and by a lending-decision component of the one or more computing devices, the model to the lending query to obtain an indication that the lending query is denied and a reason for declining the lending query, wherein the lending query and an indication of a decision to decline the lending query are provided to the training component for updating the model; sending, by the lending-decision component, a notification on a user interface associated with the payment application that the lending query is denied and the reason to the payment application, wherein the notification includes an indication of one or more actionable recommendations for modifying a particular risk metric associated with a particular signal; monitoring, by the lending-decision component, interaction data associated with the user, wherein the interaction data indicates one or more interactions with the payment service and via the payment application after the lending query is denied; in response to receiving the interaction data, determining, at a second time and by the lending-decision component, that the user is approved for a loan from the payment service, wherein the determining is based at least in part on a modification to the particular risk metric, and wherein an indication of a decision to approve the loan is provided to the training component for updating the model; and in response to receiving an indication that the user intends to apply the loan to a purchase for an item, issuing, by the lending-decision component, the loan to the user, wherein the user is permitted to use funds associated with the loan for purchasing the item and repay the loan in one or more installments.

2. The method of clause 1, wherein the reason comprises at least one of a balance of the user is below a balance threshold, a number of payment activities of the user is below an activity threshold, a history using the payment application, or a credit history using the payment application is below a time threshold.

3. The method of clause 1, wherein the interaction data indicates an interaction with an actionable recommendation of the one or more actionable recommendations, and wherein the one or more actionable recommendations include increasing a balance of the user or conducting additional payment activities using the payment application.

4. One or more computing devices of a payment service, comprising: one or more processors; and one or more non-transitory computer-readable media storing instructions that, when executed by the one or more processors, cause the one or more processors to perform operations comprising: determining, at the payment service, signals associated with previously denied lending queries, wherein each signal is associated with a value of a risk metric and an indication of whether the signal increases or decreases a corresponding risk metric; training, at a training component of the payment service, a model to generate output signals for new lending queries, wherein each respective output signal indicates (i) that a new lending query is approved or (ii) that the new lending query is denied and one or more respective reasons why the new lending query is denied; receiving, at the payment service, a lending query from a user of the payment service, the lending query comprising a request to obtain funds for purchasing an item offered by a seller; applying, at the payment service, the model to the lending query to obtain an indication that the lending query is denied and a reason for declining the lending query, wherein the lending query and an indication of a decision to decline the lending query are provided to the training component for updating the model; sending, from the payment service and for presentation on a user device of a user, (i) adverse action data indicating that the lending query is denied and the reason for denying the lending query, and (ii) recommendation data indicating one or more actionable recommendations for modifying a particular risk metric associated with a particular signal; monitoring, at the payment service and after the lending query is denied, interaction data indicative of interactions of at least the user and a payment application, provided by the payment service, executing on the user device, wherein the interaction data indicates a modification to a particular risk metric; and determining, at the payment service, status of one or more additional lending queries based at least in part on the model and the interaction data, wherein the status of the one or more additional lending queries is provided for updating the model.

5. The one or more computing devices as recited in clause 4, wherein the lending query comprises a first lending query, the request comprises a first request, and the one or more non-transitory computer-readable media storing instructions that, when executed by the one or more processors, cause the one or more processors to perform operations comprising: receiving, at the payment service, a second lending query from the user, the second lending query comprising a second request to obtain funds for purchasing a bundle of multiple items offered by one or more sellers, wherein the bundle of multiple items includes the item; applying, at the payment service, the model to the second lending query to obtain an indication that the second lending query is approved; and sending, from the payment service and for presentation on the user device, an indication that the second lending query for obtaining funds for purchasing the bundle of multiple items has been approved.

6. The one or more computing devices as recited in clause 4, wherein the request comprises a first request and the one or more non-transitory computer-readable media storing instructions that, when executed by the one or more processors, cause the one or more processors to perform operations comprising: sending, for presentation on the user device, a recommendation that the user request a loan for a bundle of multiple items, wherein the recommendation includes the item in the bundle of multiple items; receiving, at the payment service and from the user device, a second request for the loan for the bundle of multiple items; and generating terms for the loan for the bundle of items at least partly in response to receiving the second request.

7. The one or more computing devices as recited in clause 4, wherein the lending query comprises a first lending query, the request comprises a first request and the one or more non-transitory computer-readable media storing instructions that, when executed by the one or more processors, cause the one or more processors to perform operations comprising: receiving, at the payment service, a second lending query from the user, the second lending query comprising a second request to obtain funds for an item previously purchased by the user; applying, at the payment service, the model to the second lending query to obtain an indication that the second lending query is approved; and sending, from the payment service and for presentation on the user device, an indication that the second lending query for obtaining funds for the item previously purchased has been approved.

8. The one or more computing devices as recited in clause 4, wherein receiving the lending query comprises at least one of receiving the lending query from an ecommerce web site of the seller, a profile of the seller presented via a payment application executing on the user device, a profile of the user presented via a payment application executing on the user device, in response to a scan of a quick-response (QR) code presented via a seller application executing on a seller device, or in response to an interaction with a buyer-facing user interface (UI) presented via seller application executing on a seller device.

9. The one or more computing devices as recited in clause 4, wherein the reason comprises a first reason, and the applying of the model to the lending query comprises: inputting data associated with the lending query into the model to receive, as output of the model, a risk score associated with the lending query; determining that the risk score does not satisfy a risk criteria; calculating, for each signal of multiple signals associated with the data, a significance score indicating a significance of the respective signal in the risk score; and grouping the multiple signals into at least a first group associated with the first reason for decline and a second group associated with a second reason for decline.

10. The one or more computing devices as recited in clause 9, wherein the applying of the model to the lending query further comprises: summing respective significance scores of signals of the first group to determine a first-group significance score; summing respective significance scores of signals of the second group to determine a second-group significance score; determining that that first-group significance score is greater than the second-group significance score; determining whether the first group is associated with increased risk or decreased risk; and generating, based at least in part on the first-group significance score being greater than the second-group significance score and on whether the first group is associated with increased risk or decreased risk, the adverse action data indicating that the lending query is denied based at least in part on the first reason.

11. The one or more computing devices as recited in clause 10, wherein the determining whether the first group is associated with increased risk or decreased risk comprises generating a partial-dependence (PD) plot to determine whether the first group is associated with increased risk or decreased risk.

12. The one or more computing devices as recited in clause 4, wherein the item comprises a first item, and the one or more non-transitory computer-readable media further store instructions that, when executed by the one or more processors, cause the one or more processors to perform operations comprising: in response to receiving the interaction data, determining that the user is approved for a loan from the payment service; and in response to receiving an indication that the user intends to apply the loan to a purchase for a second item, issuing the loan to the user, wherein the user is permitted to use funds associated with the loan for purchasing the second item and repay the loan in one or more installments.

13. The one or more computing devices of clause 12, wherein the interaction data indicates at least one of that the user has increased a balance of the user or that the user has conducted additional payment activities using the payment application.

14. The one or more computing devices of clause 4, wherein the reason comprises at least one of a low balance of the user at the payment application associated with the payment service, a low number of payment activities at the payment application, a short history using the payment application, or a short history of credit using the payment application.

15. The one or more computing devices of clause 4, wherein the item comprises one of multiple items being purchased by the user from the seller, and wherein lending query comprises a request to obtain funds for purchasing the item but not for purchasing each other item of the multiple items.

16. The one or more computing devices of clause 4, wherein the one or more non-transitory computer-readable media further store instructions that, when executed by the one or more processors, cause the one or more processors to perform operations comprising determining a context associated with the lending query, the context comprising at least one of a preference associated with the user, a preference associated with the seller, a merchant classification code (MCC) of the seller, one or more items available at the seller, one or more items in a cart of the user, a total cost of a transaction between the user and the seller, or whether the transaction is occurring online at a physical establishment of the seller.

17. One or more non-transitory computer-readable media storing instructions that, when executed by one or more processors of a payment service, cause the one or more processors to perform operations comprising: determining, at the payment service, signals associated with previously denied lending queries, wherein each signal is associated with a value of a risk metric and an indication of whether the signal increases or decreases a corresponding risk metric; training, at a training component of the payment service, a model to generate output signals for new lending queries, wherein each respective output signal indicates (i) that a new lending query is approved or (ii) that the new lending query is denied and one or more respective reasons why the new lending query is denied; receiving, at the payment service, a lending query from a user of the payment service, the lending query comprising a request to obtain funds for purchasing an item offered by a seller; applying, at the payment service, the model to the lending query to obtain an indication that the lending query is denied and a reason for declining the lending query, wherein the lending query and an indication of a decision to decline the lending query are provided to the training component for updating the model; sending, from the payment service and for presentation on a user device of a user, (i) adverse action data indicating that the lending query is denied and the reason for denying the lending query, and (ii) recommendation data indicating one or more actionable recommendations for modifying a particular risk metric associated with a particular signal; monitoring, at the payment service and after the lending query is denied, interaction data indicative of interactions of at least the user and a payment application, provided by the payment service, executing on the user device; and determining, at the payment service, one or more additional indications regarding one or more additional lending queries based at least in part on the model and the interaction data.

18. The one or more non-transitory computer-readable media as recited in clause 17, wherein the lending query comprises a first lending query, the request comprises a first request, and the one or more non-transitory computer-readable media storing instructions that, when executed by the one or more processors, cause the one or more processors to perform operations comprising: receiving, at the payment service, a second lending query from the user, the second lending query comprising a second request to obtain funds for purchasing a bundle of multiple items offered by one or more sellers; applying, at the payment service, the model to the second lending query to obtain an indication that the second lending query is approved; and sending, from the payment service and for presentation on the user device, an indication that the second lending query for obtaining funds for purchasing the bundle of multiple items has been approved.

19. The one or more non-transitory computer-readable media as recited in clause 17, wherein the request comprises a first request and the one or more non-transitory computer-readable media storing instructions that, when executed by the one or more processors, cause the one or more processors to perform operations comprising: sending, for presentation on the user device, a recommendation that the user request a loan for a bundle of multiple items, wherein the recommendation includes the item in the bundle of multiple items; receiving, at the payment service and from the user device, a second request for the loan for the bundle of multiple items; and generating terms for the loan for the bundle of items at least partly in response to receiving the second request.

20. The one or more non-transitory computer-readable media as recited in clause 17, wherein the lending query comprises a first lending query, the request comprises a first request and the one or more non-transitory computer-readable media storing instructions that, when executed by the one or more processors, cause the one or more processors to perform operations comprising: receiving, at the payment service, a second lending query from the user, the second lending query comprising a second request to obtain funds for an item previously purchased by the user; applying, at the payment service, the model to the second lending query to obtain an indication that the second lending query is approved; and sending, from the payment service and for presentation on the user device, an indication that the second lending query for obtaining funds for the item previously purchased has been approved.

We claim:
1. A method implemented by one or more computing devices of a payment service, comprising:
determining, by a training component of the one or more computing devices, signals associated with previously denied lending queries, wherein each signal is associ- ated with a value of a risk metric and an indication of whether the signal increases or decreases a corresponding risk metric;

training, by the training component and using the signals, a model to generate output signals for new lending queries, wherein each respective output signal indicates (i) that a new lending query is approved or (ii) that the new lending query is denied and a respective reason why the new lending query is denied;

in response to receiving, from a payment application executing on a user device of a user of the payment service, a lending query associated with the user, applying, at a first time and by a lending-decision component of the one or more computing devices, the model to the lending query to obtain an indication that the lending query is denied and a reason for declining the lending query, wherein the lending query and an indication of a decision to decline the lending query are provided to the training component for updating the model;

sending, by the lending-decision component, a notification on a user interface associated with the payment application that the lending query is denied and the reason to the payment application, wherein the notification includes an indication of one or more actionable recommendations for modifying a particular risk metric associated with a particular signal;

monitoring, by the lending-decision component, interaction data associated with the user, wherein the interaction data indicates one or more interactions with the payment service and via the payment application after the lending query is denied;

in response to receiving the interaction data, determining, at a second time and by the lending-decision component, that the user is approved for a loan from the payment service, wherein the determining is based at least in part on a modification to the particular risk metric, and wherein an indication of a decision to approve the loan is provided to the training component for updating the model; and in response to receiving an indication that the user intends to apply the loan to a purchase for an item, issuing, by the lending-decision component, the loan to the user, wherein the user is permitted to use funds associated with the loan for purchasing the item and repay the loan in one or more installments.

2. The method of claim 1, wherein the reason comprises at least one of a balance of the user is below a balance threshold, a number of payment activities of the user is below an activity threshold, a history using the payment application, or a credit history using the payment application is below a time threshold.

3. The method of claim 1, wherein the interaction data indicates an interaction with an actionable recommendation of the one or more actionable recommendations, and wherein the one or more actionable recommendations include increasing a balance of the user or conducting additional payment activities using the payment application.

4. One or more computing devices of a payment service, comprising:

one or more processors; and one or more non-transitory computer-readable media storing instructions that, when executed by the one or more processors, cause the one or more processors to perform operations comprising:

determining, at the payment service, signals associated with previously denied lending queries, wherein each signal is associated with a value of a risk metric and an indication of whether the signal increases or decreases a corresponding risk metric;

training, at a training component of the payment service, a model to generate output signals for new lending queries, wherein each respective output signal indicates (i) that a new lending query is approved or (ii) that the new lending query is denied and one or more respective reasons why the new lending query is denied;

receiving, at the payment service, a lending query from a user of the payment service, the lending query comprising a request to obtain funds for purchasing an item offered by a seller;

applying, at the payment service, the model to the lending query to obtain an indication that the lending query is denied and a reason for declining the lending query, wherein the lending query and an indication of a decision to decline the lending query are provided to the training component for updating the model;

sending, from the payment service and for presentation on a user device of the user, (i) adverse action data indicating that the lending query is denied and the reason for denying the lending query, and (ii) recommendation data indicating one or more actionable recommendations for modifying a particular risk metric associated with a particular signal;

monitoring, at the payment service and after the lending query is denied, interaction data indicative of interactions of at least the user and a payment application, provided by the payment service, executing on the user device, wherein the interaction data indicates a modification to a particular risk metric; and determining, at the payment service, status of one or more additional lending queries based at least in part on the model and the interaction data, wherein the status of the one or more additional lending queries is provided for updating the model.

5. The one or more computing devices as recited in claim 4, wherein the lending query comprises a first lending query, the request comprises a first request, and the one or more non-transitory computer-readable media storing instructions that, when executed by the one or more processors, cause the one or more processors to perform operations comprising:

receiving, at the payment service, a second lending query from the user, the second lending query comprising a second request to obtain funds for purchasing a bundle of multiple items offered by one or more sellers, wherein the bundle of multiple items includes the item;

applying, at the payment service, the model to the second lending query to obtain an indication that the second lending query is approved; and sending, from the payment service and for presentation on the user device, an indication that the second lending query for obtaining funds for purchasing the bundle of multiple items has been approved.

6. The one or more computing devices as recited in claim 4, wherein the request comprises a first request and the one or more non-transitory computer-readable media storing instructions that, when executed by the one or more processors, cause the one or more processors to perform operations comprising:

sending, for presentation on the user device, a recommendation that the user request a loan for a bundle of multiple items, wherein the recommendation includes the item in the bundle of multiple items;

receiving, at the payment service and from the user device, a second request for the loan for the bundle of multiple items; and generating terms for the loan for the bundle of items at least partly in response to receiving the second request.

7. The one or more computing devices as recited in claim 4, wherein the lending query comprises a first lending query, the request comprises a first request and the one or more non-transitory computer-readable media storing instructions that, when executed by the one or more processors, cause the one or more processors to perform operations comprising:

receiving, at the payment service, a second lending query from the user, the second lending query comprising a second request to obtain funds for an item previously purchased by the user;

applying, at the payment service, the model to the second lending query to obtain an indication that the second lending query is approved; and sending, from the payment service and for presentation on the user device, an indication that the second lending query for obtaining funds for the item previously purchased has been approved.

8. The one or more computing devices as recited in claim 4, wherein receiving the lending query comprises at least one of receiving the lending query from an ecommerce website of the seller, a profile of the seller presented via a payment application executing on the user device, a profile of the user presented via a payment application executing on the user device, in response to a scan of a quick-response (QR) code presented via a seller application executing on a seller device, or in response to an interaction with a buyer-facing user interface (UI) presented via seller application executing on a seller device.

9. The one or more computing devices as recited in claim 4, wherein the reason comprises a first reason, and the applying of the model to the lending query comprises:

inputting data associated with the lending query into the model to receive, as output of the model, a risk score associated with the lending query;

determining that the risk score does not satisfy a risk criteria;

calculating, for each signal of multiple signals associated with the data, a significance score indicating a significance of the respective signal in the risk score; and grouping the multiple signals into at least a first group associated with the first reason for decline and a second group associated with a second reason for decline.

10. The one or more computing devices as recited in claim 9, wherein the applying of the model to the lending query further comprises:

summing respective significance scores of signals of the first group to determine a first-group significance score;

summing respective significance scores of signals of the second group to determine a second-group significance score;

determining that that first-group significance score is greater than the second-group significance score;

determining whether the first group is associated with increased risk or decreased risk; and generating, based at least in part on the first-group significance score being greater than the second-group significance score and on whether the first group is associated with increased risk or decreased risk, the adverse action data indicating that the lending query is denied based at least in part on the first reason.

11. The one or more computing devices as recited in claim 10, wherein the determining whether the first group is associated with increased risk or decreased risk comprises generating a partial-dependence (PD) plot to determine whether the first group is associated with increased risk or decreased risk.

12. The one or more computing devices as recited in claim 4, wherein the item comprises a first item, and the one or more non-transitory computer-readable media further store instructions that, when executed by the one or more processors, cause the one or more processors to perform operations comprising:

in response to receiving the interaction data, determining that the user is approved for a loan from the payment service; and in response to receiving an indication that the user intends to apply the loan to a purchase for a second item, issuing the loan to the user, wherein the user is permitted to use funds associated with the loan for purchasing the second item and repay the loan in one or more installments.

13. The one or more computing devices of claim 12, wherein the interaction data indicates at least one of that the user has increased a balance of the user or that the user has conducted additional payment activities using the payment application.

14. The one or more computing devices of claim 4, wherein the reason comprises at least one of a low balance of the user at the payment application associated with the payment service, a low number of payment activities at the payment application, a short history using the payment application, or a short history of credit using the payment application.

15. The one or more computing devices of claim 4, wherein the item comprises one of multiple items being purchased by the user from the seller, and wherein lending query comprises a request to obtain funds for purchasing the item but not for purchasing each other item of the multiple items.

16. The one or more computing devices of claim 4, wherein the one or more non-transitory computer-readable media further store instructions that, when executed by the one or more processors, cause the one or more processors to perform operations comprising determining a context associated with the lending query, the context comprising at least one of a preference associated with the user, a preference associated with the seller, a merchant classification code (MCC) of the seller, one or more items available at the seller, one or more items in a cart of the user, a total cost of a transaction between the user and the seller, or whether the transaction is occurring online at a physical establishment of the seller.

17. One or more non-transitory computer-readable media storing instructions that, when executed by one or more processors of a payment service, cause the one or more processors to perform operations comprising:

determining, at the payment service, signals associated with previously denied lending queries, wherein each signal is associated with a value of a risk metric and an indication of whether the signal increases or decreases a corresponding risk metric;

training, at a training component of the payment service, a model to generate output signals for new lending queries, wherein each respective output signal indicates (i) that a new lending query is approved or (ii) that the new lending query is denied and one or more respective reasons why the new lending query is denied;

receiving, at the payment service, a lending query from a user of the payment service, the lending query comprising a request to obtain funds for purchasing an item offered by a seller;

applying, at the payment service, the model to the lending query to obtain an indication that the lending query is denied and a reason for declining the lending query, wherein the lending query and an indication of a decision to decline the lending query are provided to the training component for updating the model;

sending, from the payment service and for presentation on a user device of the user, (i) adverse action data indicating that the lending query is denied and the reason for denying the lending query, and (ii) recommendation data indicating one or more actionable recommendations for modifying a particular risk metric associated with a particular signal;

monitoring, at the payment service and after the lending query is denied, interaction data indicative of interactions of at least the user and a payment application, provided by the payment service, executing on the user device; and determining, at the payment service, one or more additional indications regarding one or more additional lending queries based at least in part on the model and the interaction data.

18. The one or more non-transitory computer-readable media as recited in claim 17, wherein the lending query comprises a first lending query, the request comprises a first request, and the one or more non-transitory computer-readable media storing instructions that, when executed by the one or more processors, cause the one or more processors to perform operations comprising:

receiving, at the payment service, a second lending query from the user, the second lending query comprising a second request to obtain funds for purchasing a bundle of multiple items offered by one or more sellers;

applying, at the payment service, the model to the second lending query to obtain an indication that the second lending query is approved; and sending, from the payment service and for presentation on the user device, an indication that the second lending query for obtaining funds for purchasing the bundle of multiple items has been approved.

19. The one or more non-transitory computer-readable media as recited in claim 17, wherein the request comprises a first request and the one or more non-transitory computer-readable media storing instructions that, when executed by the one or more processors, cause the one or more processors to perform operations comprising:

sending, for presentation on the user device, a recommendation that the user request a loan for a bundle of multiple items, wherein the recommendation includes the item in the bundle of multiple items;

receiving, at the payment service and from the user device, a second request for the loan for the bundle of multiple items; and generating terms for the loan for the bundle of items at least partly in response to receiving the second request.

20. The one or more non-transitory computer-readable media as recited in claim 17, wherein the lending query comprises a first lending query, the request comprises a first request and the one or more non-transitory computer-readable media storing instructions that, when executed by the one or more processors, cause the one or more processors to perform operations comprising:

receiving, at the payment service, a second lending query from the user, the second lending query comprising a second request to obtain funds for an item previously purchased by the user;

applying, at the payment service, the model to the second lending query to obtain an indication that the second lending query is approved; and sending, from the payment service and for presentation on the user device, an indication that the second lending query for obtaining funds for the item previously purchased has been approved.

* * * * *